July 17, 1934.  F. L. FULLER  1,966,623
COMBINED SORTING AND ACCOUNTING MACHINE
Filed Oct. 21, 1930  26 Sheets-Sheet 1

July 17, 1934.  F. L. FULLER  1,966,623
COMBINED SORTING AND ACCOUNTING MACHINE
Filed Oct. 21, 1930   26 Sheets-Sheet 2

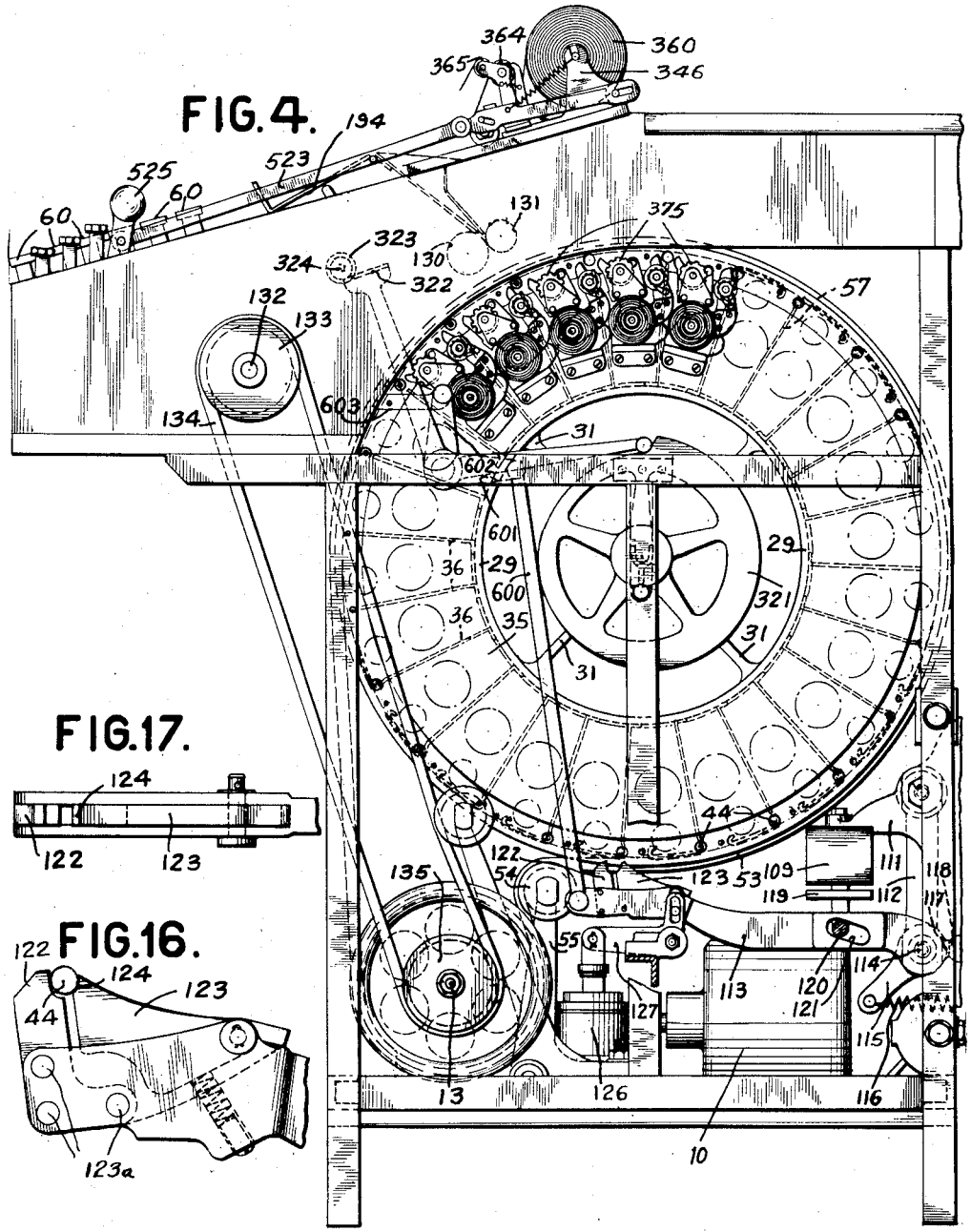

July 17, 1934.　　　F. L. FULLER　　　1,966,623
COMBINED SORTING AND ACCOUNTING MACHINE
Filed Oct. 21, 1930　　　26 Sheets-Sheet 4
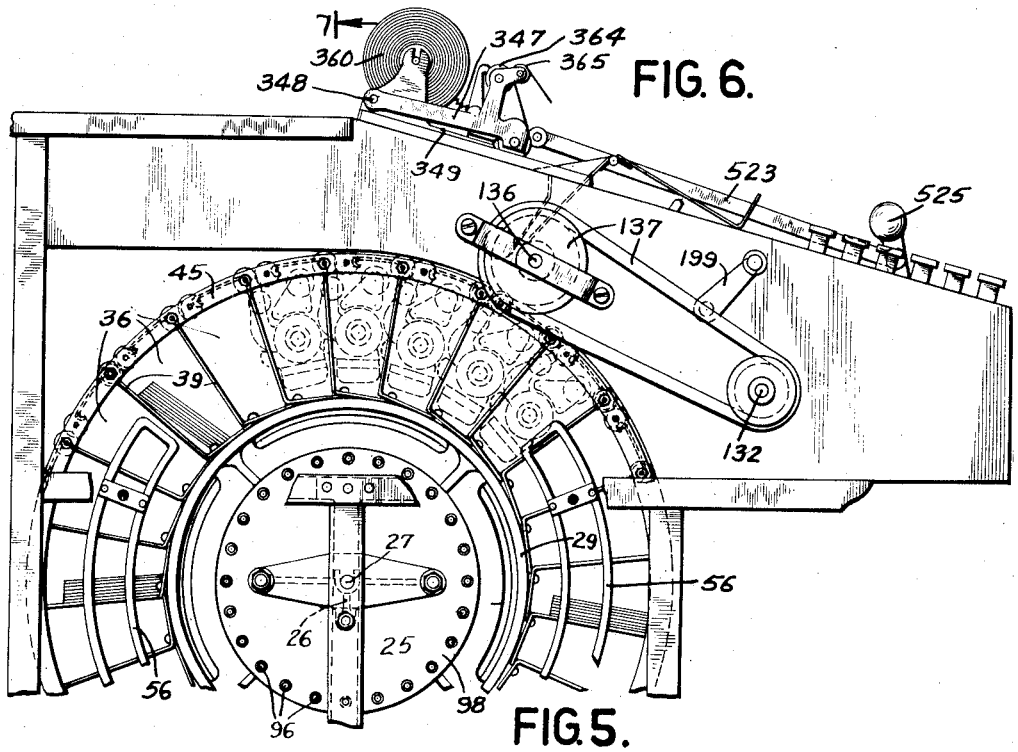
FIG. 6.
FIG. 5.
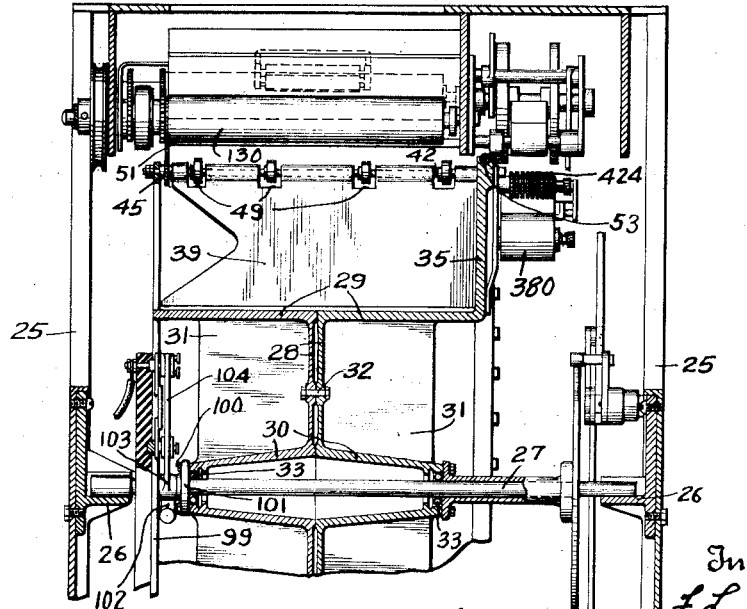
Inventor
F. L. Fuller
By his Attorney
W M Wilson

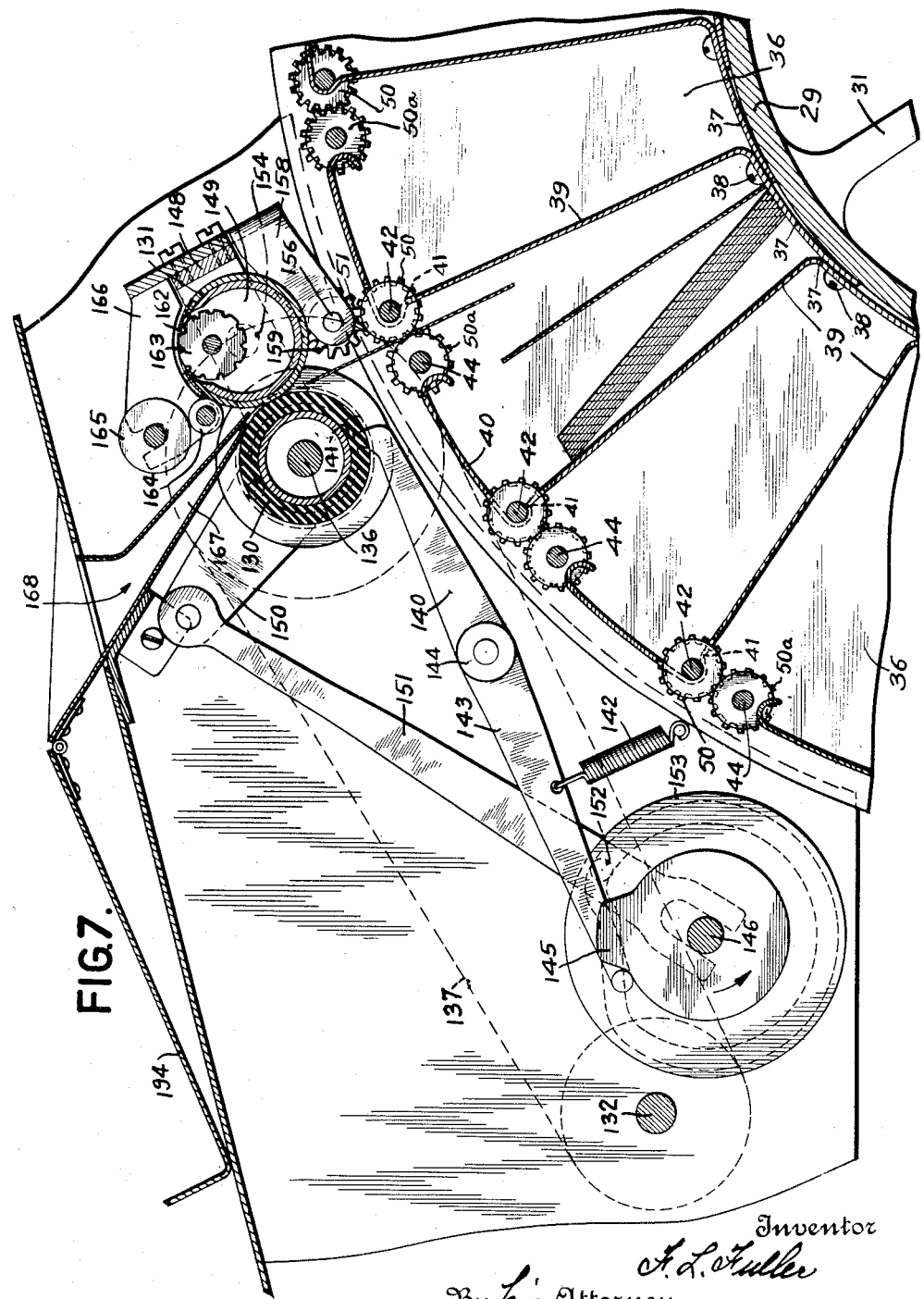

July 17, 1934. F. L. FULLER 1,966,623
COMBINED SORTING AND ACCOUNTING MACHINE
Filed Oct. 21, 1930 26 Sheets-Sheet 6
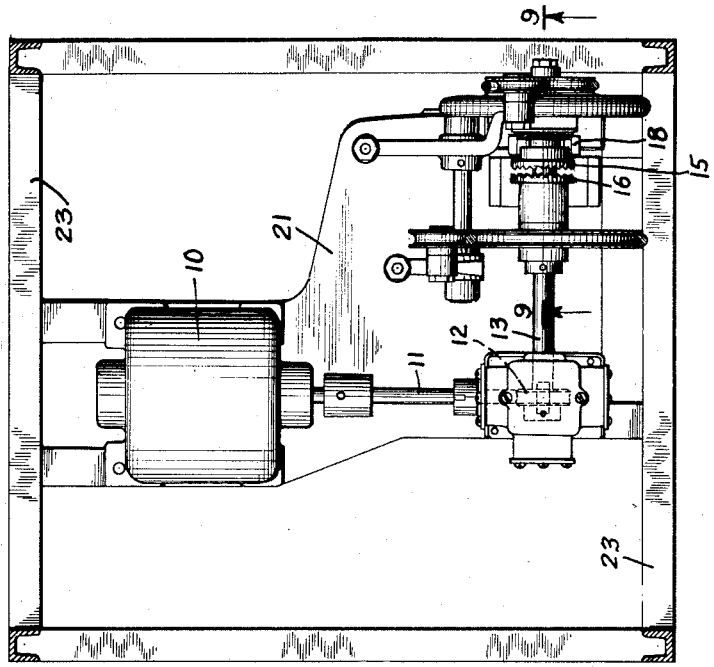
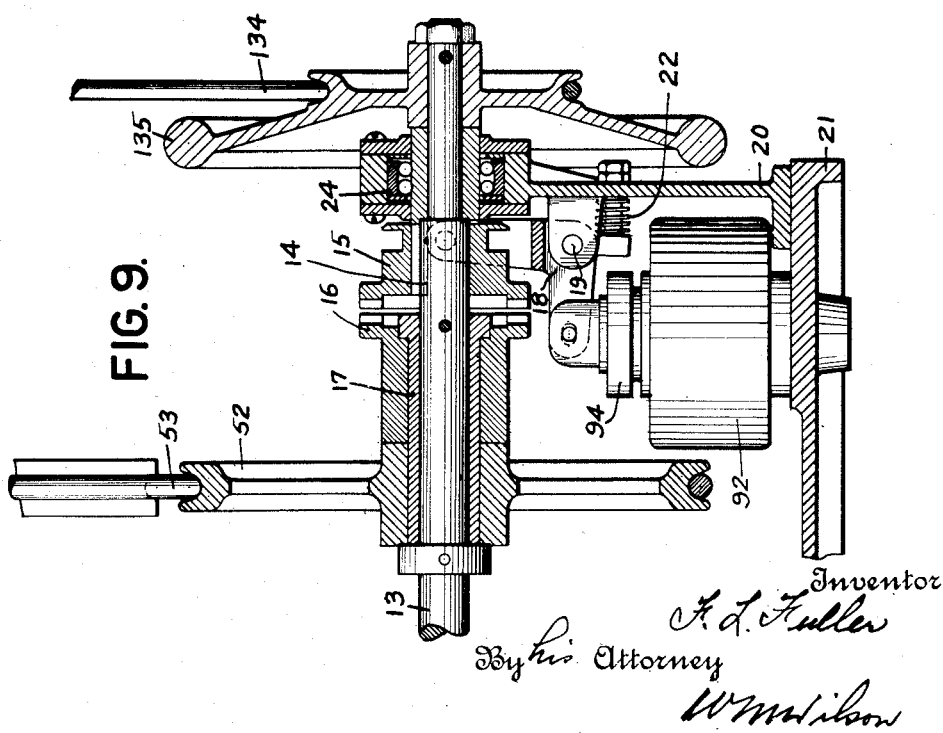
Inventor
F. L. Fuller
By his Attorney
W. M. Wilson July 17, 1934.    F. L. FULLER    1,966,623
COMBINED SORTING AND ACCOUNTING MACHINE
Filed Oct. 21, 1930    26 Sheets-Sheet 7
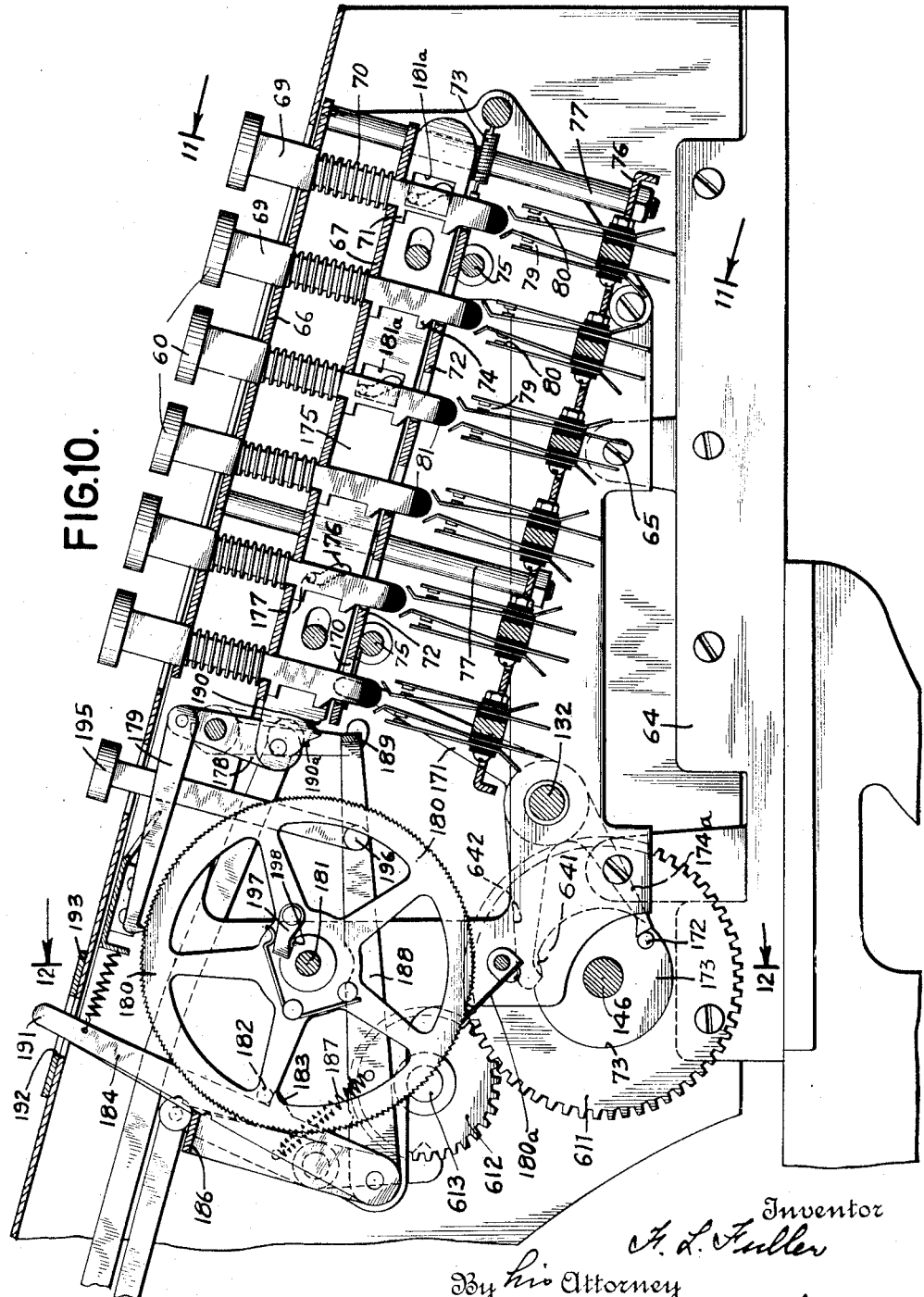

July 17, 1934.  F. L. FULLER  1,966,623
COMBINED SORTING AND ACCOUNTING MACHINE
Filed Oct. 21, 1930  26 Sheets-Sheet 8

July 17, 1934.  F. L. FULLER  1,966,623
COMBINED SORTING AND ACCOUNTING MACHINE
Filed Oct. 21, 1930   26 Sheets-Sheet 9
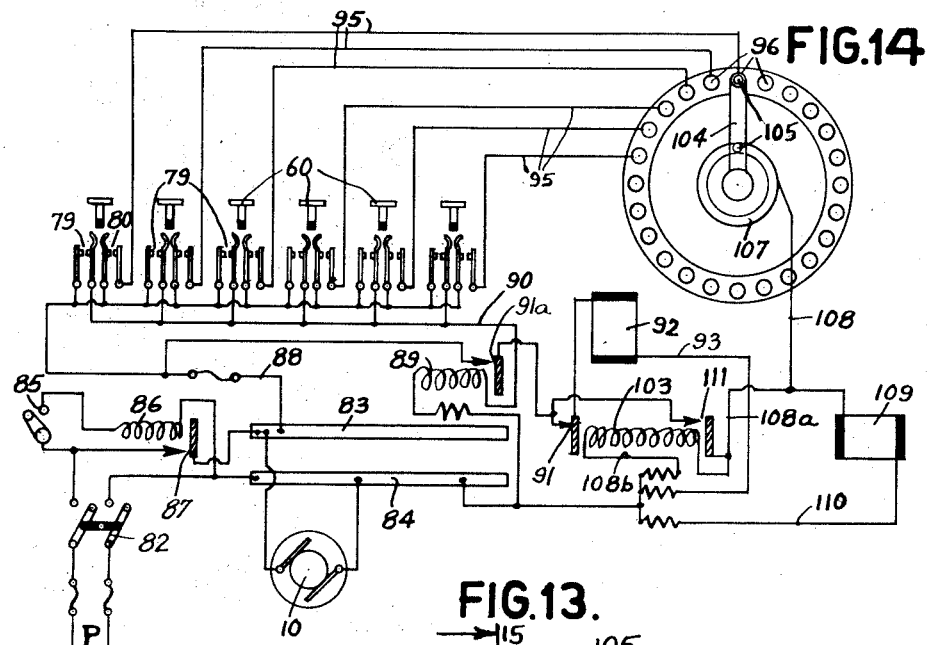
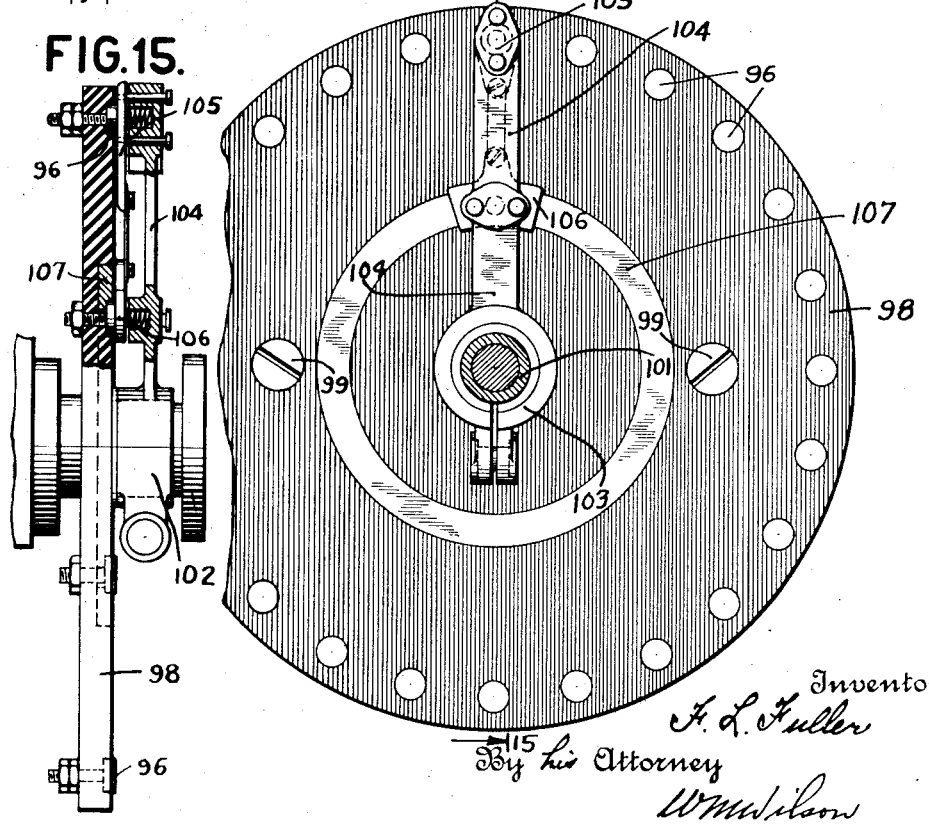
Inventor
F. L. Fuller
By his Attorney
W M Wilson July 17, 1934.   F. L. FULLER   1,966,623
COMBINED SORTING AND ACCOUNTING MACHINE
Filed Oct. 21, 1930   26 Sheets-Sheet 10
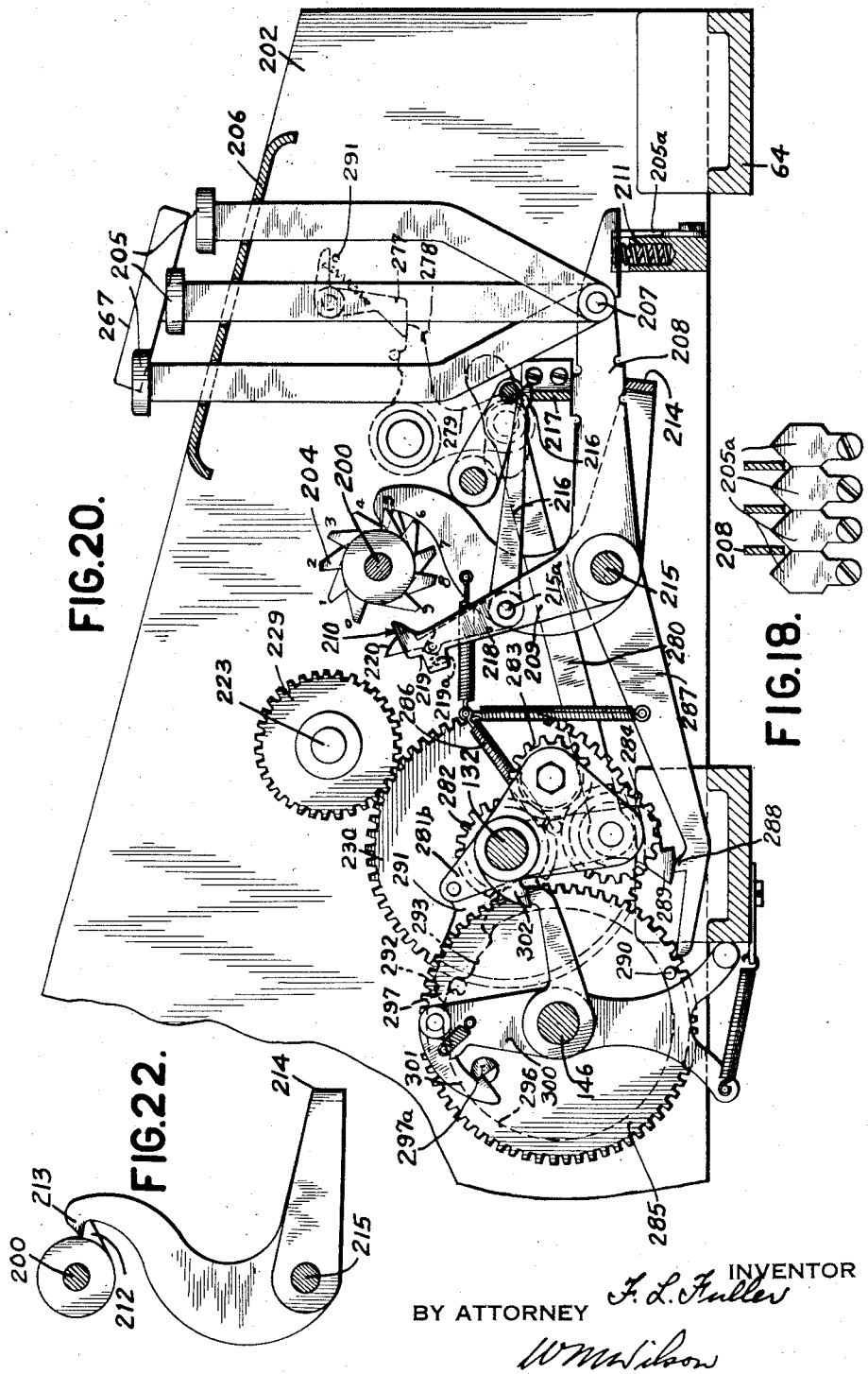

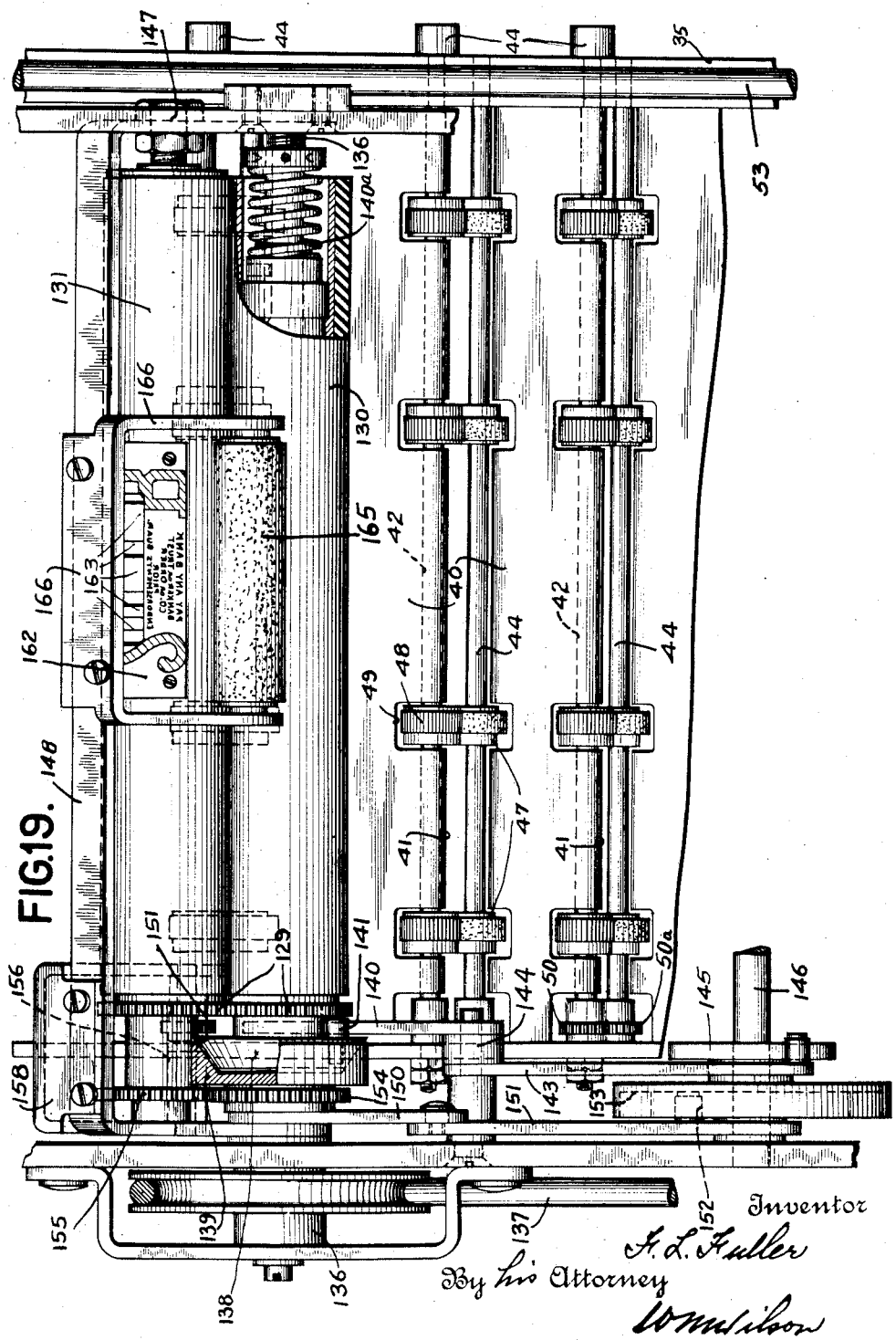

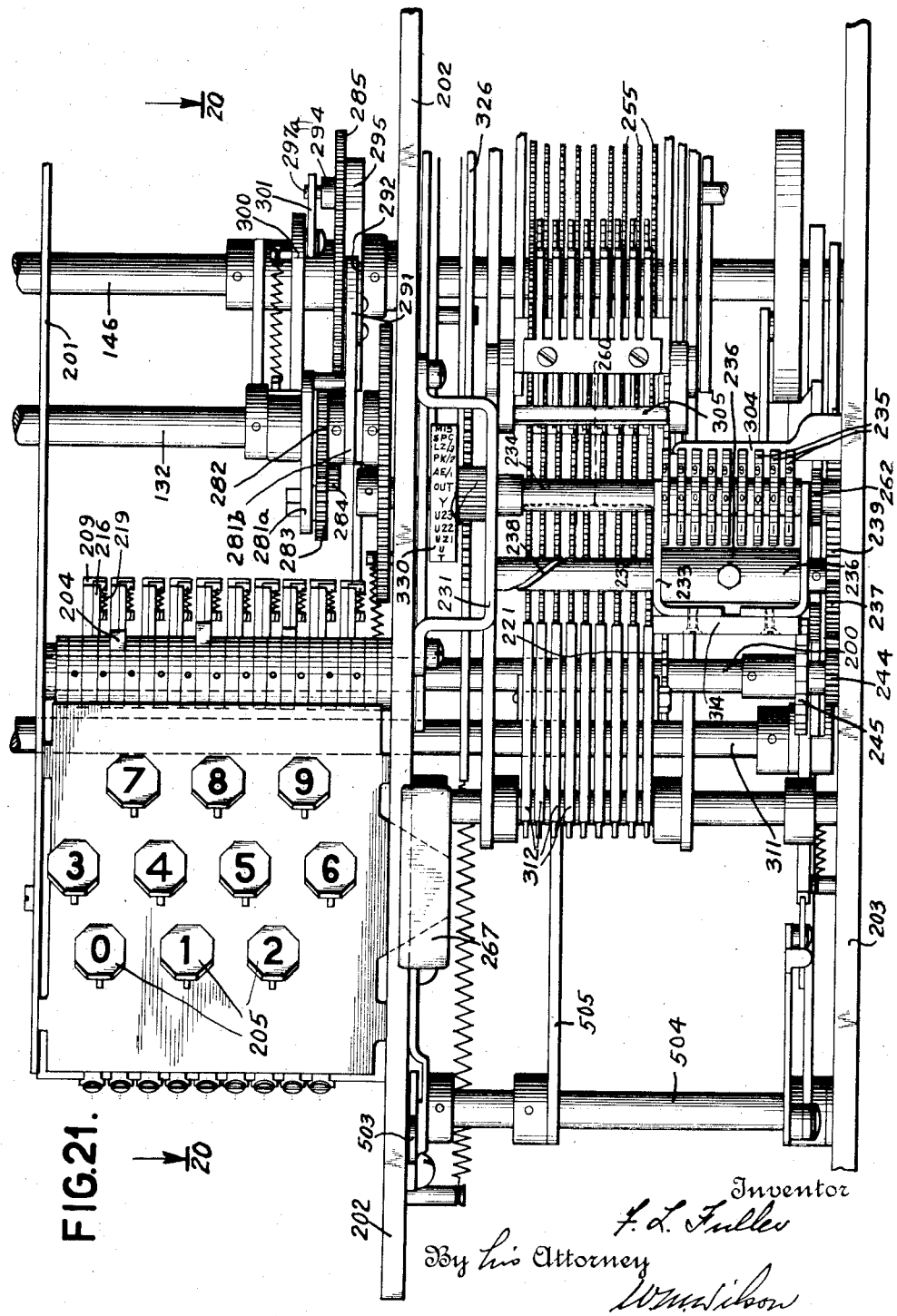

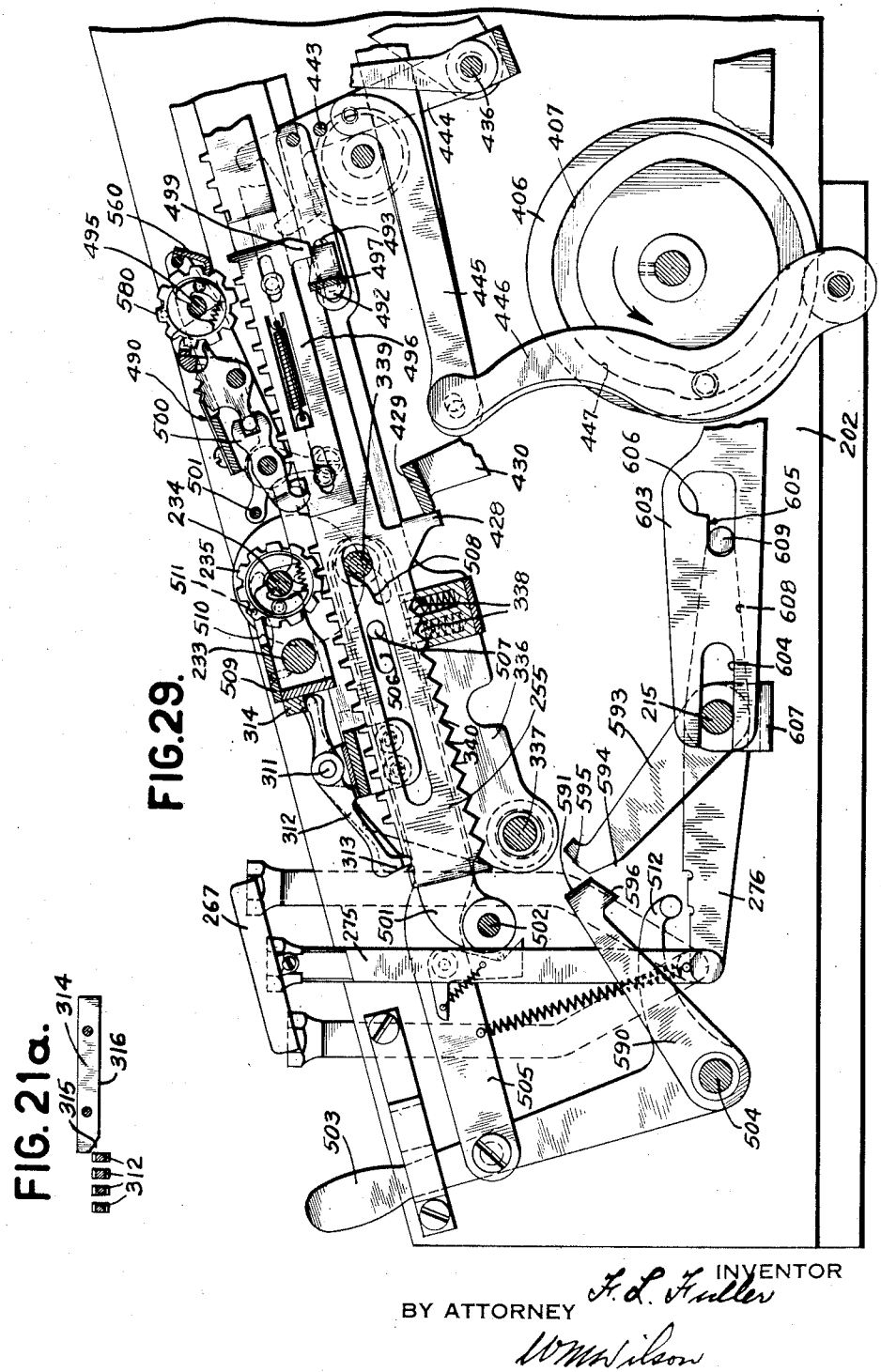

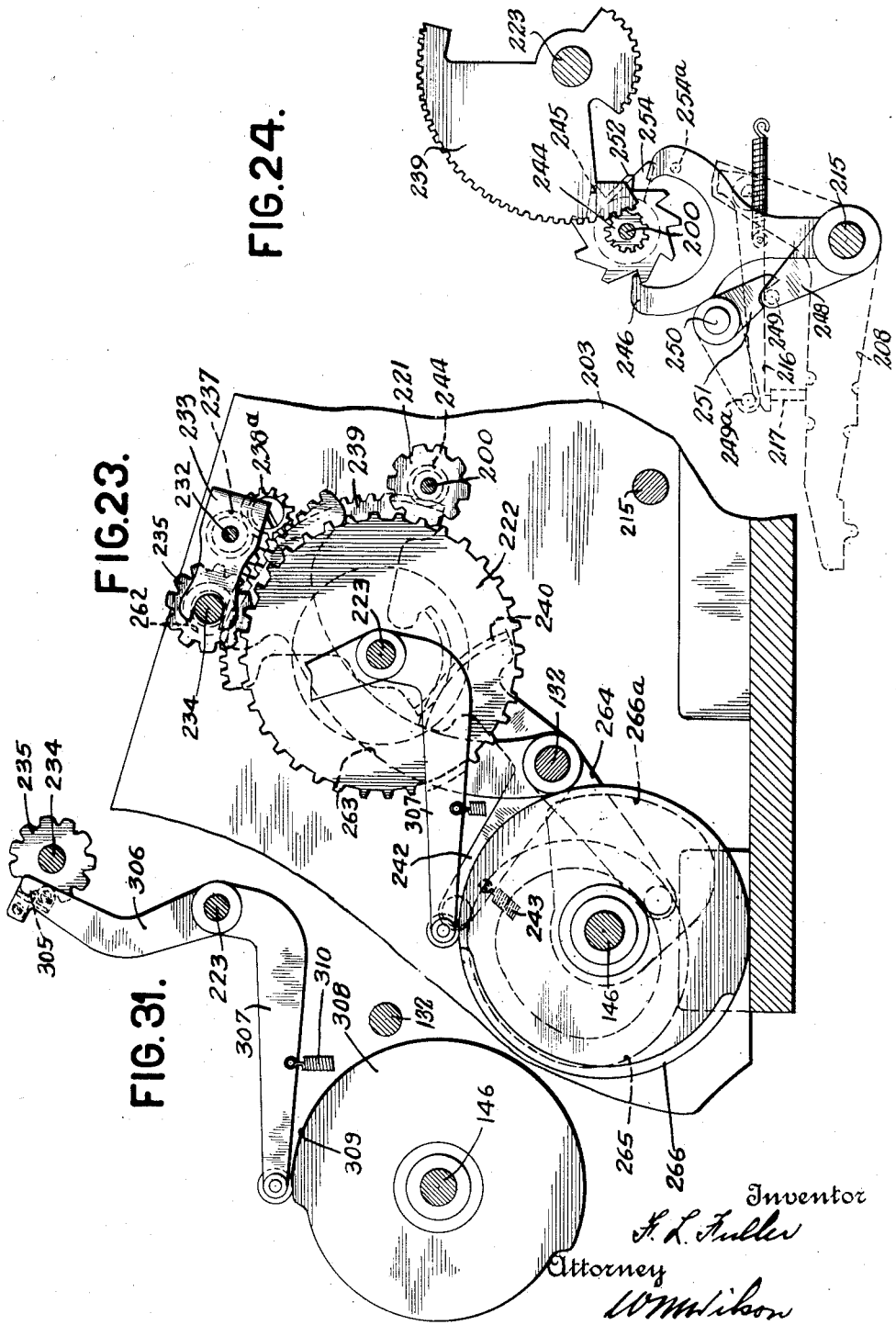

July 17, 1934.   F. L. FULLER   1,966,623
COMBINED SORTING AND ACCOUNTING MACHINE
Filed Oct. 21, 1930   26 Sheets-Sheet 15
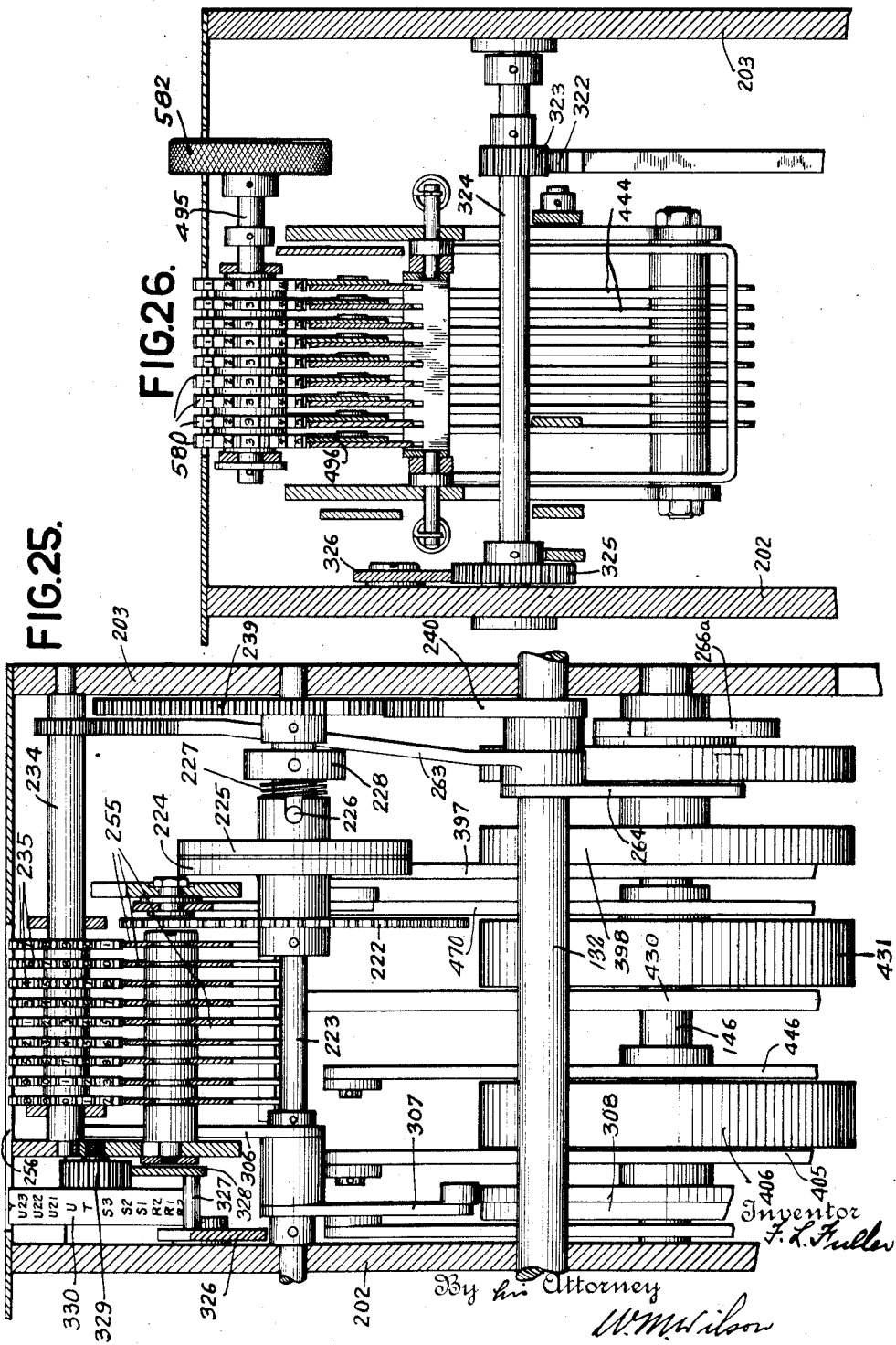

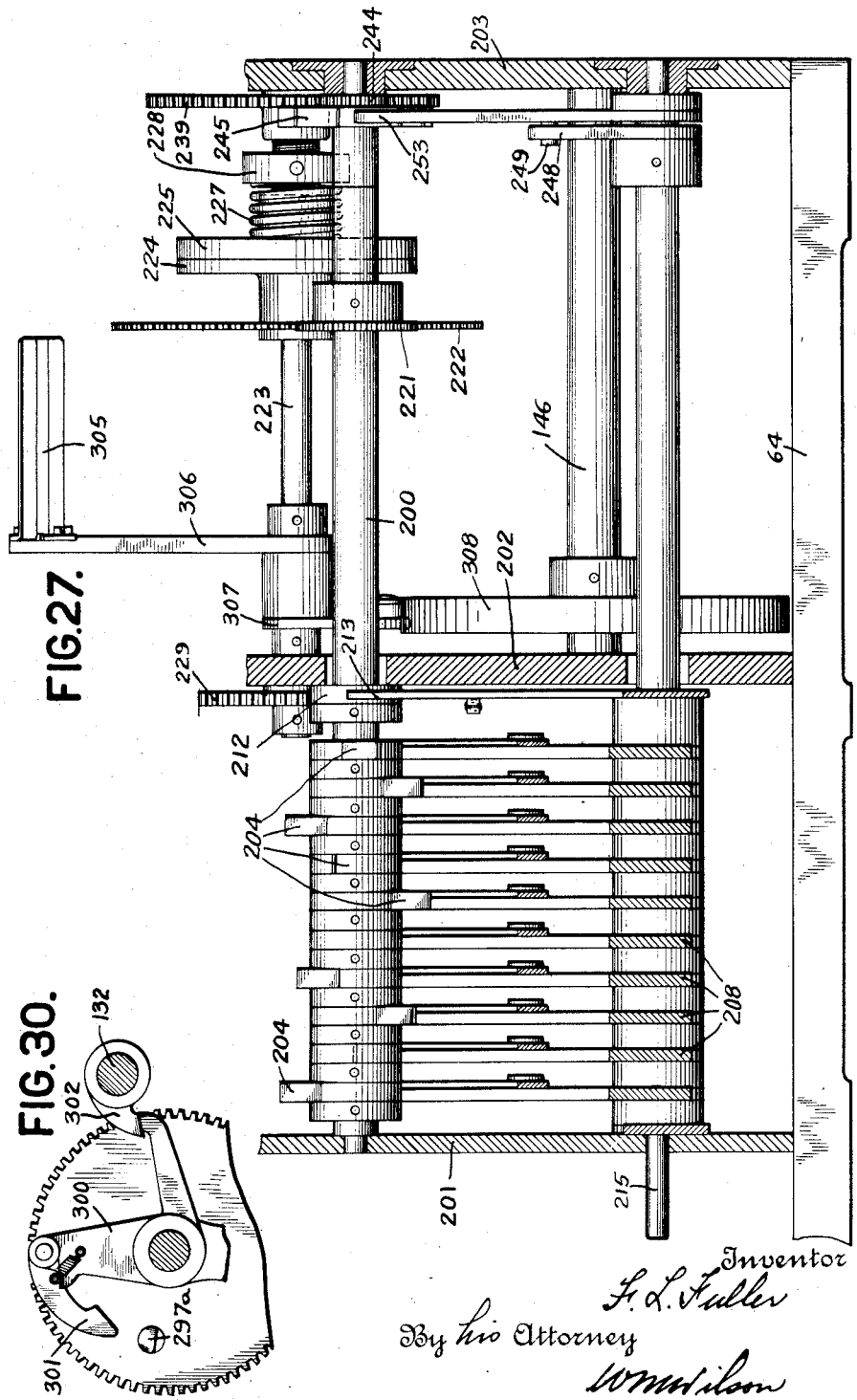

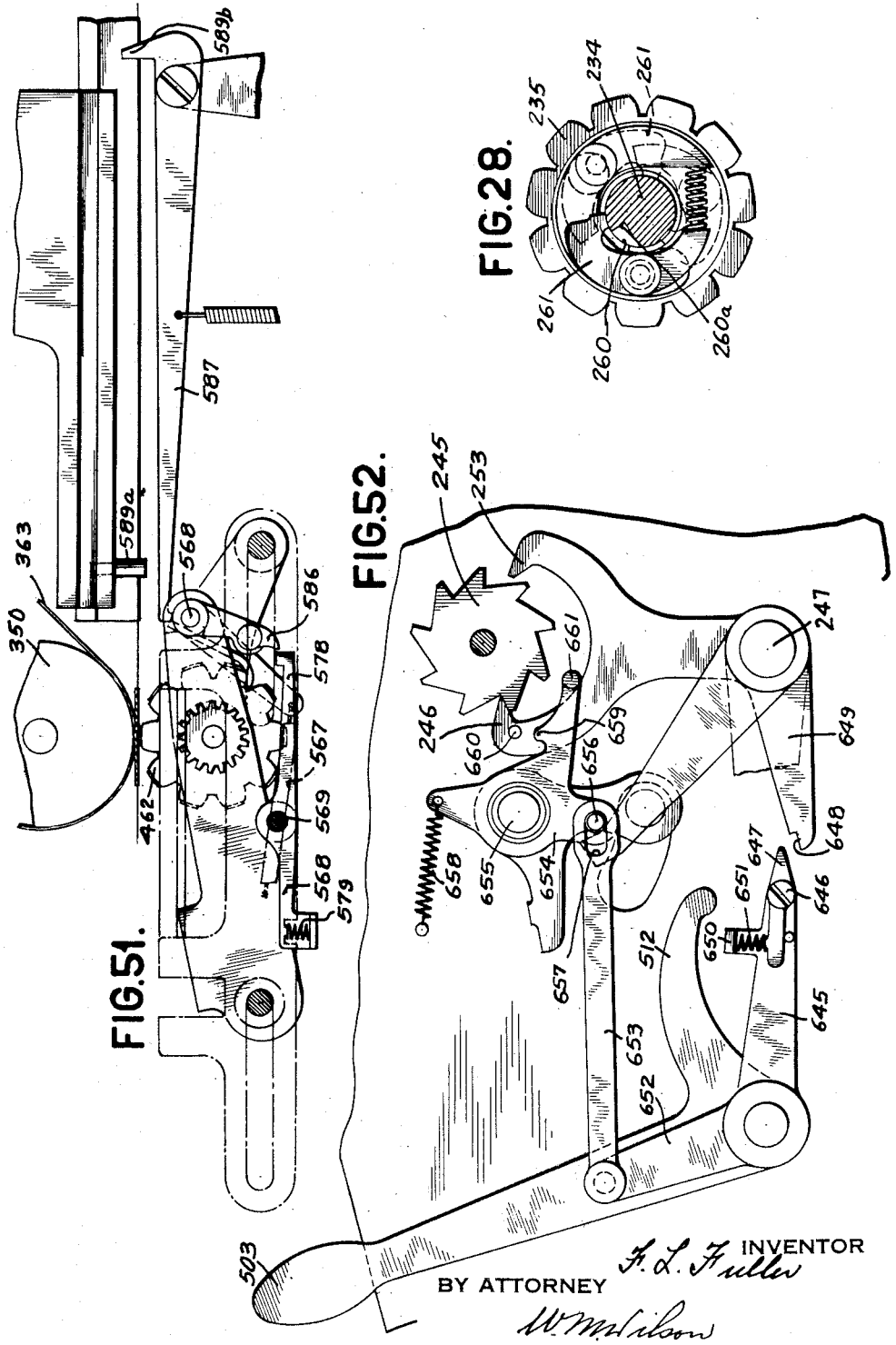

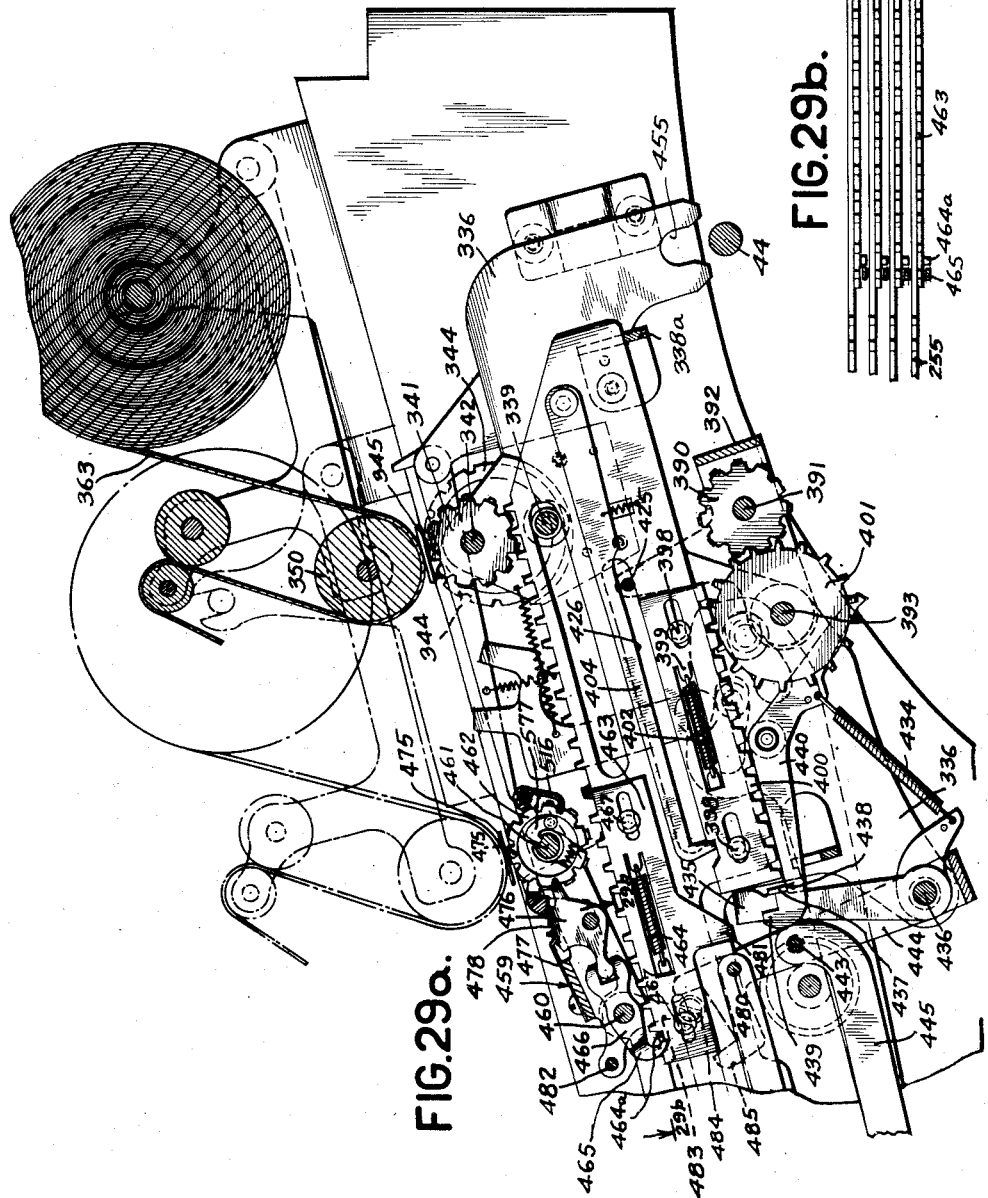

July 17, 1934.   F. L. FULLER   1,966,623
COMBINED SORTING AND ACCOUNTING MACHINE
Filed Oct. 21, 1930   26 Sheets-Sheet 19
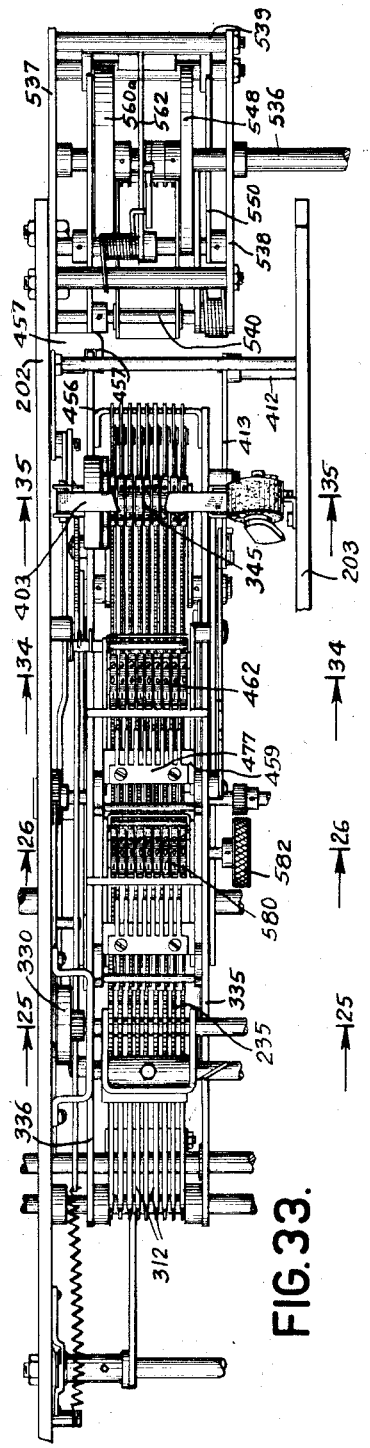
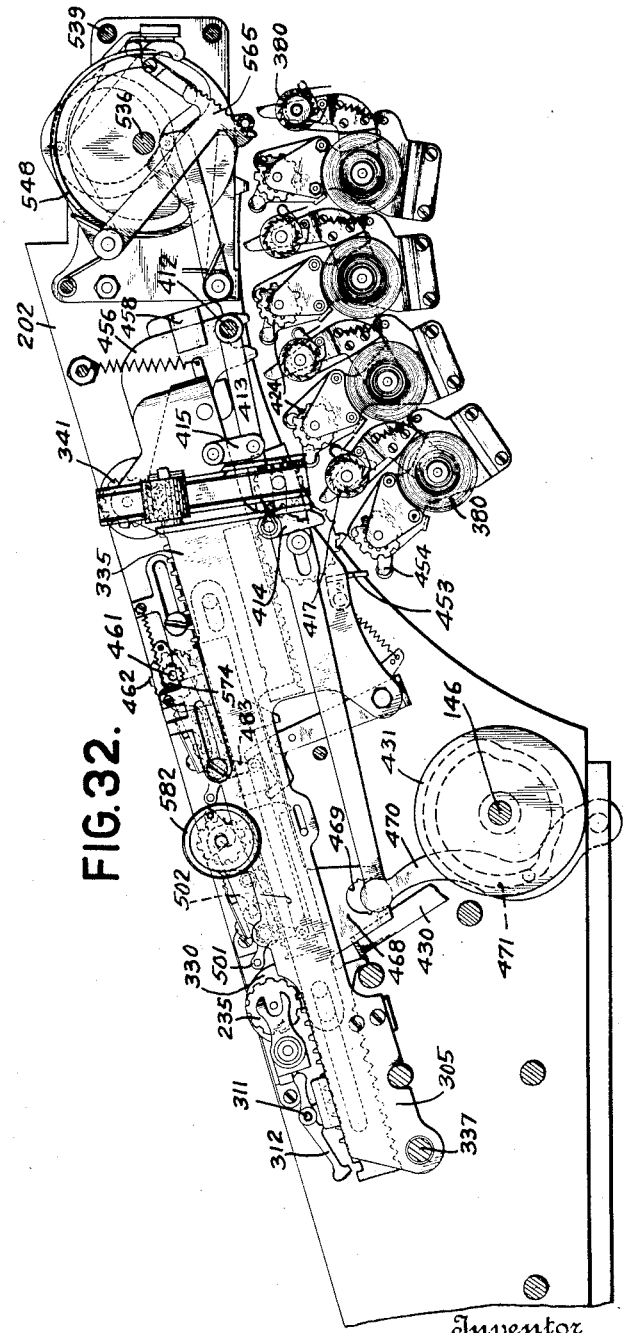

July 17, 1934.  F. L. FULLER  1,966,623
COMBINED SORTING AND ACCOUNTING MACHINE
Filed Oct. 21, 1930   26 Sheets-Sheet 20
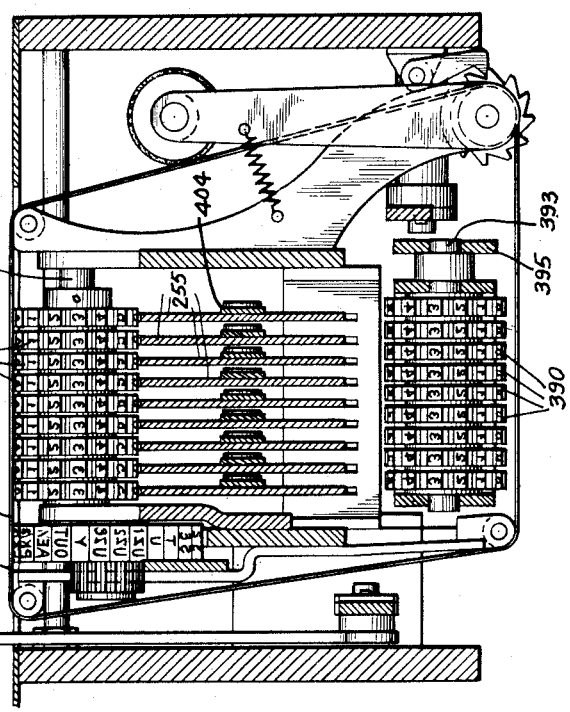
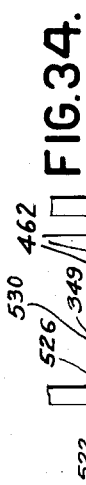
Inventor
F. L. Fuller
By his Attorney
W. M. Wilson

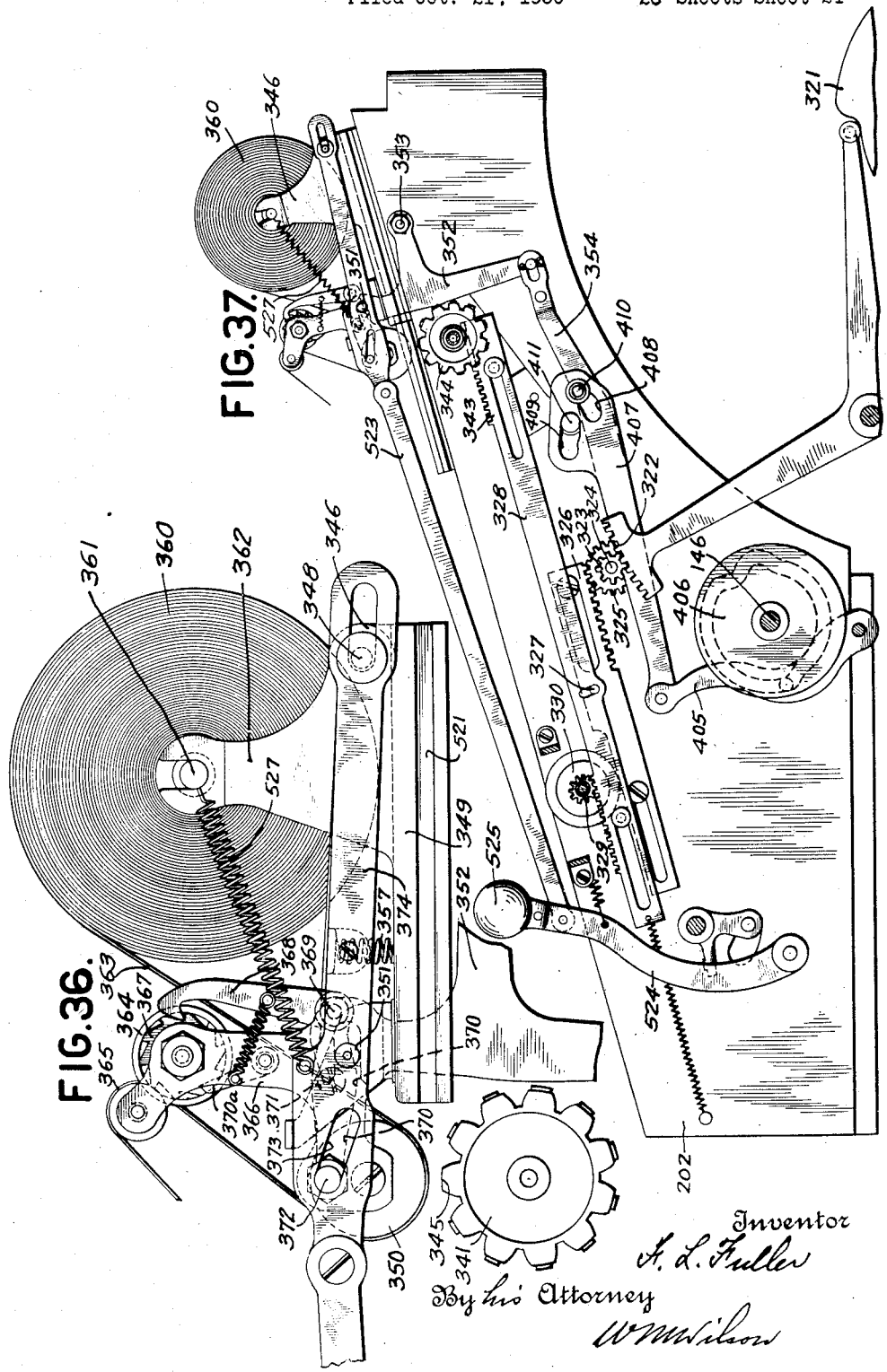

July 17, 1934.　　　　F. L. FULLER　　　　1,966,623
COMBINED SORTING AND ACCOUNTING MACHINE
Filed Oct. 21, 1930　　26 Sheets-Sheet 22
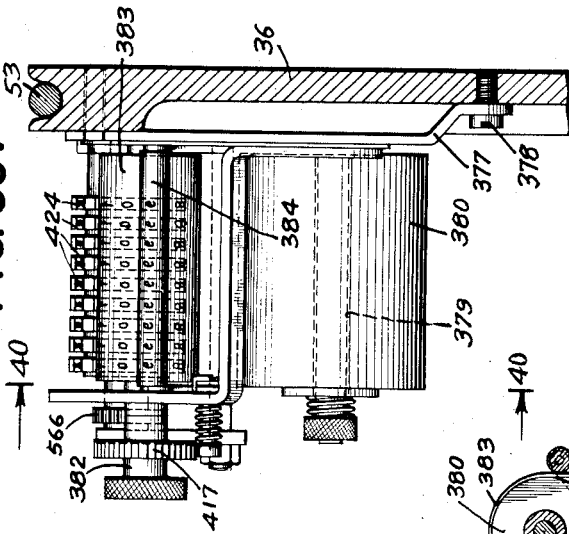
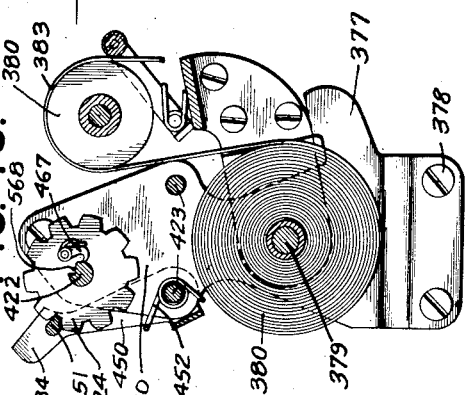
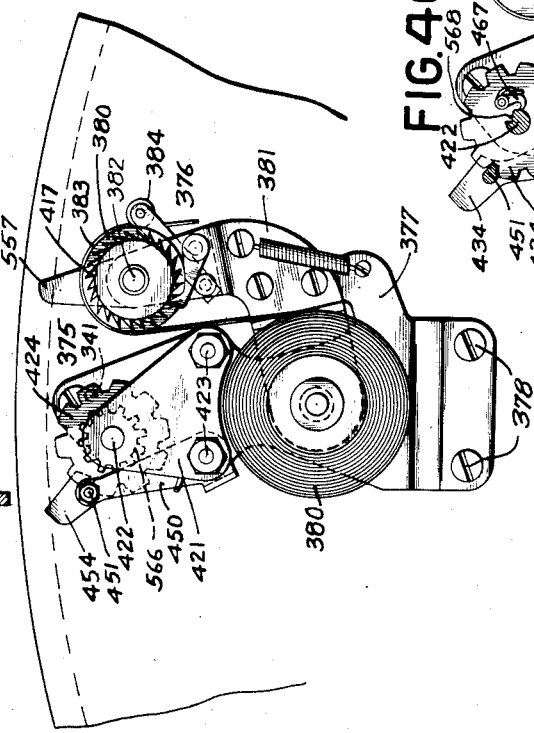

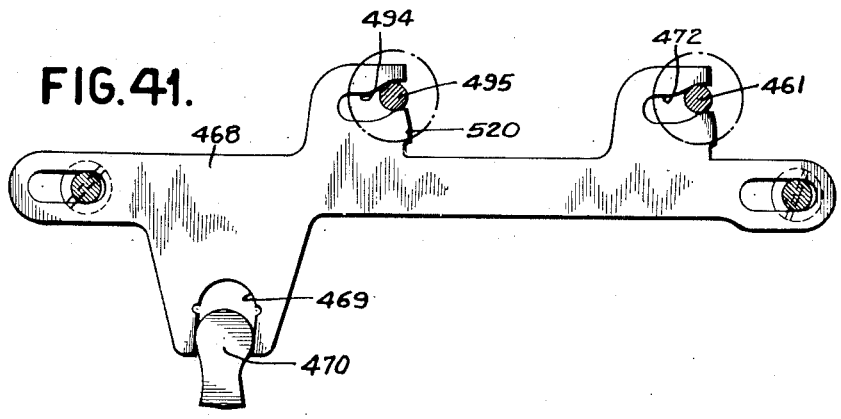
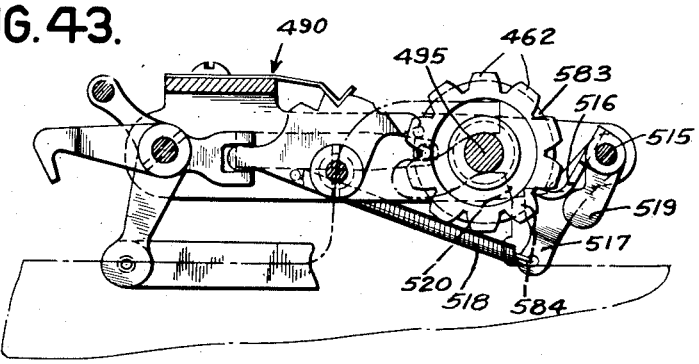
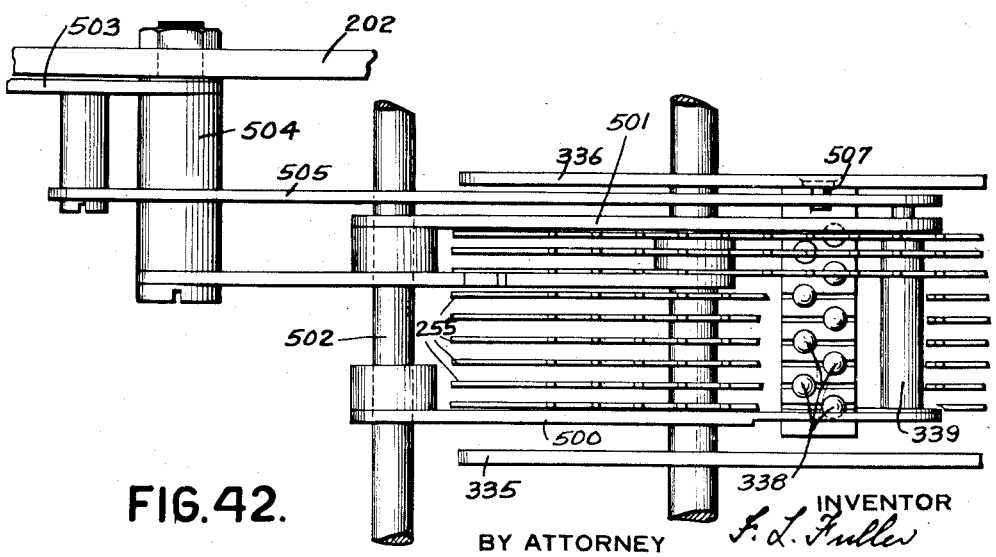

July 17, 1934.    F. L. FULLER    1,966,623
COMBINED SORTING AND ACCOUNTING MACHINE
Filed Oct. 21, 1930    26 Sheets-Sheet 25
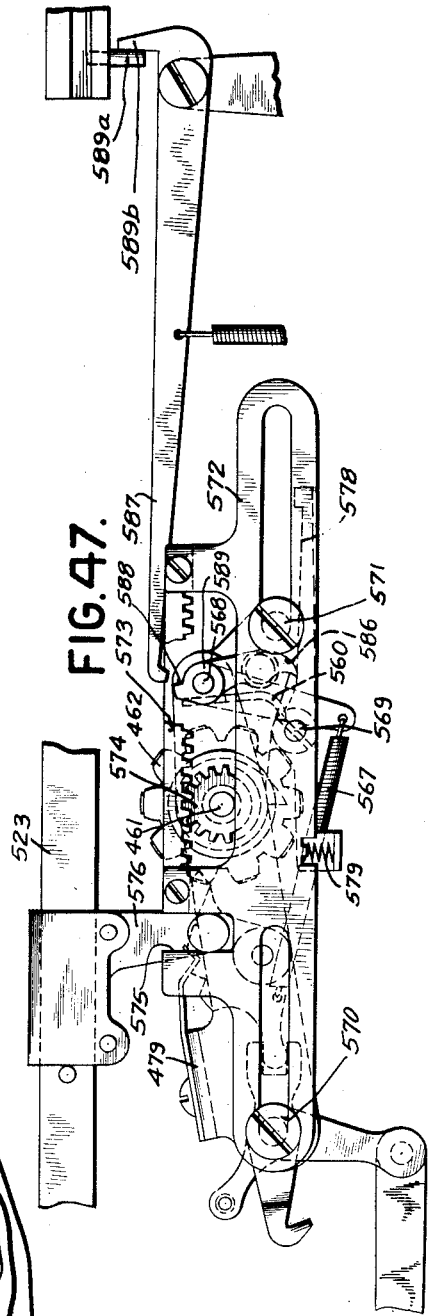
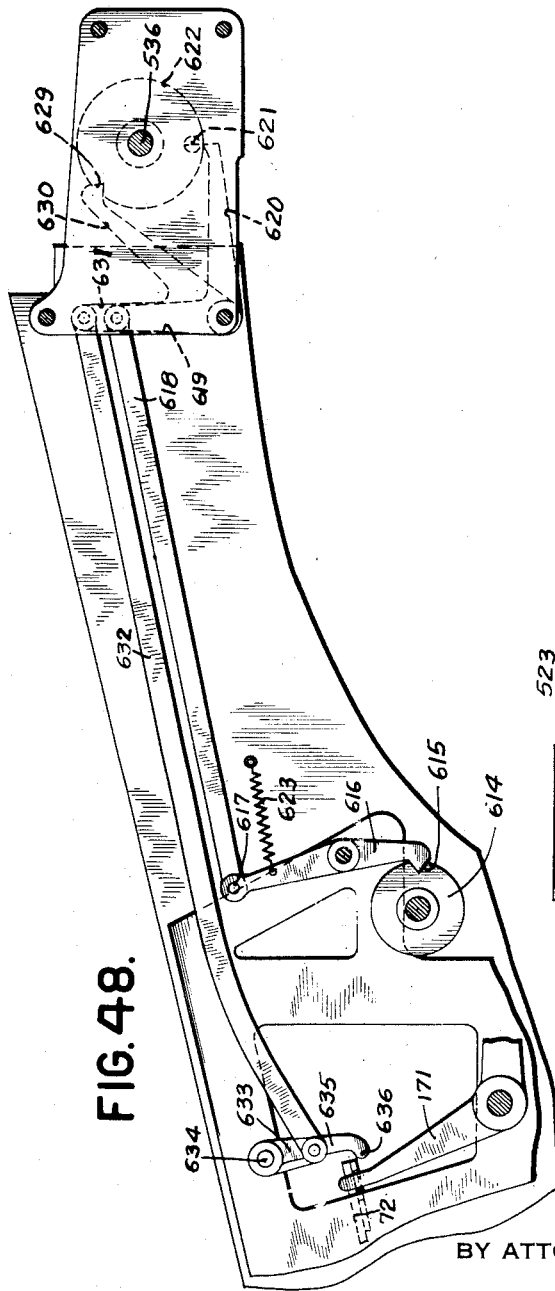
INVENTOR
F. L. Fuller
BY ATTORNEY July 17, 1934.  F. L. FULLER  1,966,623
COMBINED SORTING AND ACCOUNTING MACHINE
Filed Oct. 21, 1930   26 Sheets-Sheet 26

INVENTOR
F. L. Fuller
BY ATTORNEY
W. M. Wilson

Patented July 17, 1934

1,966,623

UNITED STATES PATENT OFFICE

1,966,623

COMBINED SORTING AND ACCOUNTING MACHINE

Frederick Lincoln Fuller, West Orange, N. J., assignor, by mesne assignments, to International Business Machines Corporation, New York, N. Y., a corporation of New York Application October 21, 1930, Serial No. 490,155

88 Claims. (Cl. 235—58)

This invention relates to combined adding and sorting machines, particularly of the type in which provision is made for not only sorting papers of different classifications such as checks, for example, but for adding the amounts represented by the checks or sorted papers. An extended feature of the machine provides not only for listing and totaling the amounts on the checks to give an itemized list and a total of all checks of same classification on a separate strip but for listing on a supplemental strip the amounts of the checks arranged in exactly the same sequence in which they are sorted as well as to give a grand total of the amounts of all the checks.

The present machine, however, is so arranged that it may be utilized separately as an adding, a sorting or an endorsing machine and while in the preferred employment of the machine the combined functions are preferably utilized to gain all the benefits, the invention is not limited to the combination as many of the features are applicable singly to machines of the separate and distinct types.

The machine embodying the various features thus described has been designed particularly for use in banks and by the inclusion of the sorting and adding functions is able to effect to a great extent a considerable saving in labor now required in the accounting and distribution systems of the check departments of banks and clearing houses.

To more clearly perceive one of the outstanding benefits that accrue from the present machine a brief description will now be given of the "block" system now in vogue in a majority of banking institutions.

The receiving teller, in accepting deposits, receives a considerable number of checks as well as currency. The deposits received are listed separately by the customer upon a "deposit ticket" which is checked for accuracy. The teller makes out a slip for the currency received. The total of such slips subtracted from the totals represented by the series of deposit tickets gives the sum represented by the checks received. A series of such checks constitute a "block".

The checks in sequence, as they are listed on the series of deposit tickets are then sorted into general classifications which operation brings the checks out of sequence with respect to their listings on the "deposit tickets". Each group of checks of the same classification is then, by a separate operation, listed by an adding machine and a total obtained. A grand total of a series of such "group" totals must "prove" with the grand total of all deposit tickets and if they do not correspond the checks of the same classification are first compared with the listings on the adding tape. If the entries on the tape are found correct and a discrepancy still obtains a detailed comparison between the amounts listed on the deposit tickets and the amounts listed on the adding machine tapes is required.

While the first comparison is tedious the last comparison is still more laborious and difficult since by the sorting operation, the amount of checks represented on the adding machine tapes have been brought out of sequence with the listings on the deposit tickets.

By the employment of the present machine a "block" of checks may be sorted into twenty four different classifications. As a check is sorted the amount represented on the check is also printed upon a strip associated with the compartment selected. The total of such amounts may also be printed upon the strip to give a total of the checks of the same classification. When such listings are effected upon the individual classification strips, there is also listed upon a "control strip" the amount indicated on each check sorted and these listings are made in exactly the same sequential arrangement as on the deposit tickets. A total of the item listings given by the machine must agree with the total derived from the deposit tickets and if a discrepancy is observed a comparison between the listings on the deposit tickets and those on the control strip is required. An error will readily be noted by the preservation of the listings in the original sequence.

The correction may be required on either the deposit ticket, designating an error by the customer and failure to check by the teller, or on the control tape which indicates an error made by the machine operator alone in entering the wrong amount.

The required correction upon the individual classification strip is then made, and since all totals are now in agreement the checks may be forwarded for disposition according to the manner in which they are sorted.

With respect to the machine as to its combined functions it is the main object of the present invention to devise a machine capable of sorting a promiscuous group of slips or checks of different classifications and listing upon a sheet in precisely the same sequence as sorted the amounts represented upon the checks.

It is a further object to include an individual totalizer for entering therein the amounts on the checks of the same classification as the checks are sorted, listing each check separately with the totals thereof, so that for every compartment receiving a series of checks of the same classification there will be provided a strip which separately lists each check and gives a total thereof.

Considering the strip upon which the items are listed in the same sequence as the checks are sorted, it is a further object to enter such items in a totalizer as an incident to sorting and from the totalizer print upon this strip the total represented thereon.

A still further object is the provision of means for resetting the individual and main totalizers, with the removal of the checks in groups as an incident to a subsequent sorting and adding operation.

Additional objects, with respect to the combined features, include; an endorsing mechanism which effects endorsement in ink upon the rear face of each check as it is fed to the selected receiving compartment; the provision of various interlocks and locks for preventing the disarrangement of the machine if two or more parts intended to be individually operated are operated together, either accidentally or intentionally; a general arrangement of the machine to provide for sorting and adding operations in a manner which facilitates the operations required so as to effect a saving in both labor and time over the systems previously employed; and a general arrangement of the machine which facilitates the operations of the machine and which is carried out by placing the manually controlled devices within easy access by the operator.

With respect to the machine employed as a sorting machine alone, it is the main object of the invention to provide a sorting receptacle of the rotary type with radially arranged compartments, any one of which may be selected for reception of the checks or slips to be sorted by merely depressing the related key. In the preferred form of construction this is carried out by causing a power drive of the drum when any selected key is operated and by the provision of a novel form of electrical control, stopping the drum at the desired position.

A further object of the invention consists in the provision of a new form of electrical control for determining the differential rotation and position of the drum. This is preferably carried out by a commutator structure consisting of a series of concentrically arranged electrical contacts any one of which is rendered effective by the depression of the related key. As the drum is set into operation by depression of the key, a brush revolving with the drum passes over the contacts and when it engages the one previously rendered effective by the depressed key, a stop arm is shifted to effect a stopping of the drum.

A further object of the invention relates to the drum stopping device and is so arranged that it will permit high speed of rotation of the drum but will quickly stop the drum at the desired position and with a minimum of shock to the various parts of the machine. This is preferably carried out by so arranging the arm when it contacts with the drum to stop its rotation that it will be carried along with the drum against the tension of a suitably selected spring. When the drum has been brought to rest in its rotary movement the spring will gradually draw the arm and, likewise the drum back against a stationary stop accurately defining and aligning the position of the drum.

To further carry out the requirements of quiet and shockless operation a special form of shock absorbing devices is provided for the drum stopping device.

A still further object of the invention constituting the sorting machine consists in the particular arrangement employed for forming the series of compartments. The compartments are preferably formed of suitably bent strips in an overlapping arrangement, the outer portion of each being bent concentrically so as to form a cover for the related compartment.

A still further object of the invention is to provide a construction whereby the tops of the compartments will not only prevent dropping out of the checks deposited therein when the compartment is being turned but also provide a passage means whereby the checks may be readily fed into the compartment but unable to fall out through the passage means. This arrangement is preferably provided for by equipping each compartment with a series of feeding rollers which when rotated oppositely will feed the check to the selected compartment but effectively prevents passage of the check between the feeding rollers when the checks fall by gravity toward the rollers during the turning of the drum.

A still further object of the invention, with respect to check feeding operations, is to provide a set of main feeding rollers which are adapted to feed a check inserted therebetween to the rollers which are related to the receiving compartments.

A still further object of the invention consists in the provision of means whereby the main feeding rollers carry an electro-type for endorsing upon the rear face of the check as well as a series of printing wheels variably adjusted for printing dates and other variable data upon the check.

A still further object of the machine consists in the provision of a manual control over the driving of the check endorsing and compartment feeding rollers which permits the desired driving movement of such rollers to effect the endorsing and check feeding operations.

A still further object of the invention is the provision of means for calling the operator's attention when a predetermined number of operations of a compartment selecting key has been reached. Since a key is employed for each check feeding operation, it will be obvious that this indirectly informs the operator that a predetermined number of checks have been fed to the related compartment. This object is preferably carried out by the provision of a counting device, one for each compartment selecting key. At the termination of a predetermined number of operations of the related key, the key will be automatically locked, this condition giving the necessary information to the operator. By the provision of a supplemental manually operated device, the counting device may be shifted an additional extent which unlocks the key previously locked and brings the counting device to its normal position in readiness for the commencement of a new counting operation.

Further but relatively important objects in connection with the invention as a sorting machine consists in; details of construction whereby the sorted checks may be readily withdrawn from the compartments; the general arrangement of the compartment selecting keyboard making it readily accessible to the operator of the machine;

a motor bar control which sets into operation the endorsing and check feeding mechanisms and causes the automatic release of the previously depressed compartment key so that the keyboard is again in position for a subsequent compartment selecting operation; a flexible keyboard arrangement whereby if an undesired compartment has been selected in error, the desired compartment may be selected for operation by merely depressing the proper key which automatically effects the release of the key depressed in error and brings the desired compartment in registration with the check feeding and endorsing mechanism.

Considering the portion of the machine employed for the purpose of accumulating and printing the amounts represented on the checks sorted and other functions, it is the main object of the invention to provide means for each compartment to effect the listings of the amounts represented upon checks entered in that compartment upon a paper strip together with the total thereof. To carry out this object the drum having the check receiving compartments is provided with a series of totalizers and a series of record strip printing mechanisms, there being a combined totalizer and record strip for each compartment. When a compartment is brought to position for operation by depression of the related key there will be entered in the related totalizer the amount upon the check as well as printed upon the associated record strip.

It is a still further object of the invention to provide in the adding machine a novel form of differential mechanism controlled by 10 keys which informs the operator the amount to be entered as set up by the key depressed. Since the amounts are set up on indicating wheels prior to the entry on the totalizers, the operator is able to check the amount to be entered for errors.

In connection with the 10 key controlled setting up devices, an object of the invention is to provide under control of the differential mechanism a power driven master wheel associated with the series of item indicating wheels. The master wheel is preferably power driven and is driven differentially under control of the key depressed to set up successively upon the series of indicating wheels the amount to be entered as represented on a check. The provision of the power driven master wheel eliminates the manual exertion usually required in 10 key controlled setting up devices greatly increasing the speed of operation of the machine.

In connection with the adding mechanism which is under control of the item indicating wheels, it is an object of the invention to provide a series of adding slides which are positively and differentially positioned by the zeroizing of the item indicating wheels to thereby add in the selected totalizer as well as the main totalizer the amount previously set up on the indicating wheels.

In connection with the printing mechanism of the machine there has also been included several sets of item printing wheels, one set adapted to print upon the selected individual record strip and the other set upon the "control strip."

In connection with the printing mechanism it is a further object of the invention to provide a zero elimination and zero insertion mechanism which is simple in operation and far less complicated in construction than the type perviously utilized. This object is carried out by providing each type carrier with a blank space which is normally at the printing line. When an amount is set up on the indicating wheels the depression of the "0" key controls a single step of movement of the wheel and the corresponding slide and the type carrier is thereby turned to bring a zero to the printing line. Since the type carriers have their blank spaces normally at the printing line in the unused denominational orders, it will be obvious that all orders to the left of the highest significant figure will not result in printing any character. A zero, however, will be printed for those orders in which the corresponding character has been set up by depression of the related "0" key.

It is a further object of the invention to provide for the correct entries of amounts in the totalizers by the control slides while permitting the employment of the zero elimination device operating in the manner just described. This object is attained by causing the differentially positioned slides to directly set up the sets of item type carriers and having separate rack sections slidably mounted on the slides and having a lost motion connection with respect to the slide. After the printing wheels have been differentially adjusted by the slides and which are given one step of movement greater than the number of units represented by the number to be entered in the totalizer, the lost motion connection is rendered effective so that upon restoration of the slides with their rack sections the totalizers will be actuated by the rack sections a units movement less than that imparted to the slides in their movement of restoration.

It is a still further object of the invention to correlate with the independently movable rack sections a novel form of transfer mechanism which permits the rack sections to be given an additional units movement or commensurate with that imparted to the slides when restored. Normally, this extra step of movement is prevented, but when a higher order wheel passes through zero the rack section of the next higher order is permitted to move an additional step with the slide after having lost a step thereby adding the required unit to the higher order wheel.

In connection with the printing devices of the machine, it is a further object of the invention to provide for printing of the items both upon the selected record strip and upon the main control strip. As to the latter, this function is obtained by rocking a platen to force the control strip against one of the sets of differentially adjusted item type carriers. For printing upon the selected record strip carried by the sorting drum the second set of item type carriers are carried by a rocking frame which, when depressed forces the supplemental set of item type carriers against the selected record strip.

In order to inform the operator which compartment totalizer, and record strip are in position for operation a special character reading wheel positioned by the drum is provided for informing the operator of this fact. Special character printing wheels are provided one for each set of item printing wheels to print with the items the classification of the check bearing that item.

It is a further object of the invention, with respect to total printing operations performed in connection with the control strip, to provide a novel form of printing mechanism which is capable of effecting an impression directly from the main or grand totalizer to print a grand total on the control strip.

In the preferred form this comprises a shiftable printer frame having its platen normally in operative relationship with respect to one of the sets of item printing type wheels. When it is desired to print a total the printing frame is shifted by a lever so that the platen will now be correlated with the printing wheels of the main totalizer and by an over-movement of the lever an impression effected therefrom upon the control strip.

It is a still further object of the invention to eliminate the number of manual operations required for placing the machine in condition for a subsequent machine operation by providing a mechanism which automatically resets the main or grand totalizer after a total printing has been effected therefrom.

In connection with total printing upon the individual record strips and resetting of the individual totalizers it is a still further object of the invention to provide a common control mechanism associated with the series of totalizers and record strips to effect the various functions required. The mechanism for accomplishing a total printing operation from the individual totalizers upon the associated record strip and thereafter automatically resetting the totalizer is placed under control of a handle which is merely turned a single revolution to effect both of these functions. Selection of the totalizers and resetting of the totalizers for printing and resetting is under control of the same keys which select these elements for adding and printing operations.

It is a further object of the invention whereby when the item wheels are incorrectly set up due to the depression of one or more of the keys in error, that the incorrectly represented amount will not be entered in the various totalizers and printed upon the printing strips.

For the attainment of the object, one of the forms of mechanism described permits the shifting of the slides as a group out of operative engagement with the item indicating wheels so that these wheels may be subsequently zeroized without effecting the movement of the slides and the position of the totaling elements or printing wheels.

A modification of the error key mechanism which incidentally is the preferred construction permits a slight step of movement of the group of item indicating wheels so that they are shifted out of engagement with the slides. Thereafter when the adding machine is caused to go through its cycle of operation these wheels in being turned to zero will have no effect upon the slides so that no amount will be entered in the totalizers or set up upon the printing wheels.

A still further object of the invention is the provision of means whereby operation of the error key directly sets the adding mechanism in an ineffective operation, eliminating the necessity of the depression of the motor bar.

A still further object of the invention in connection with the machine as separate machines or as a combination is the provision of a novel form of clutch device which effects the clutching of a constantly rotating shaft with the driving shaft of the machine to effect the adding endorsing check feeding and other operations. The driving shaft is thereby set into operation to perform the desired functions by merely depressing a motor bar and by the provision of a "non-repeat device" retention of the motor bar in its depressed position will not effect a second operation of the driving shaft. For a second operation it is necessary that the manual pressure upon the motor bar be released and the motor bar be again depressed.

Other objects subordinate to those just enumerated will appear as the necessity of their accomplishment is developed during the course of the succeeding description of the preferred but illustrative embodiment of the invention.

In the drawings:

Fig. 4 is a view in side elevation of the right side of the assembled machine, portions of the casing having been removed to more clearly illustrate the rotatable drum and the associated stop devices;

Fig. 5 is a central sectional view of the drum showing the manner in which the drum is assembled to form the sorting compartments;

Fig. 6 is a view in side elevation of the upper portion of the assembled machine;

Fig. 7 is a sectional view taken on the line 7—7 of Fig. 6;

Fig. 8 is a plan view of the base of the machine showing in detail the main driving motor, the speed reduction mechanism and the associated clutch and control devices;

Fig. 9 is an enlarged sectional view taken on the line 9—9 of Fig. 8;

Fig. 10 is a longitudinal sectional view in side elevation taken through the keyboard section associated with the compartment selecting devices. This view also illustrates the mechanism for limiting the number of effective operations of each of the compartment selecting keys;

Fig. 13 is a front view in elevation of the commutator and associated brush devices for controlling the selection of the compartments of the sorting drum;

Fig. 14 is a diagram showing the wiring of the electrical instrumentalities of the machine;

Fig. 15 is a sectional view taken on the line 15—15 of Fig. 13;

Fig. 16 is an enlarged view of the end of the drum stopping arm;

Fig. 17 is a plan view of the parts shown in Fig. 16;

Fig. 18 is a detail view illustrating the single key locking mechanism for the adding keys;

Fig. 19 is a plan view of the check feeding and endorsing devices;

Figure 1:
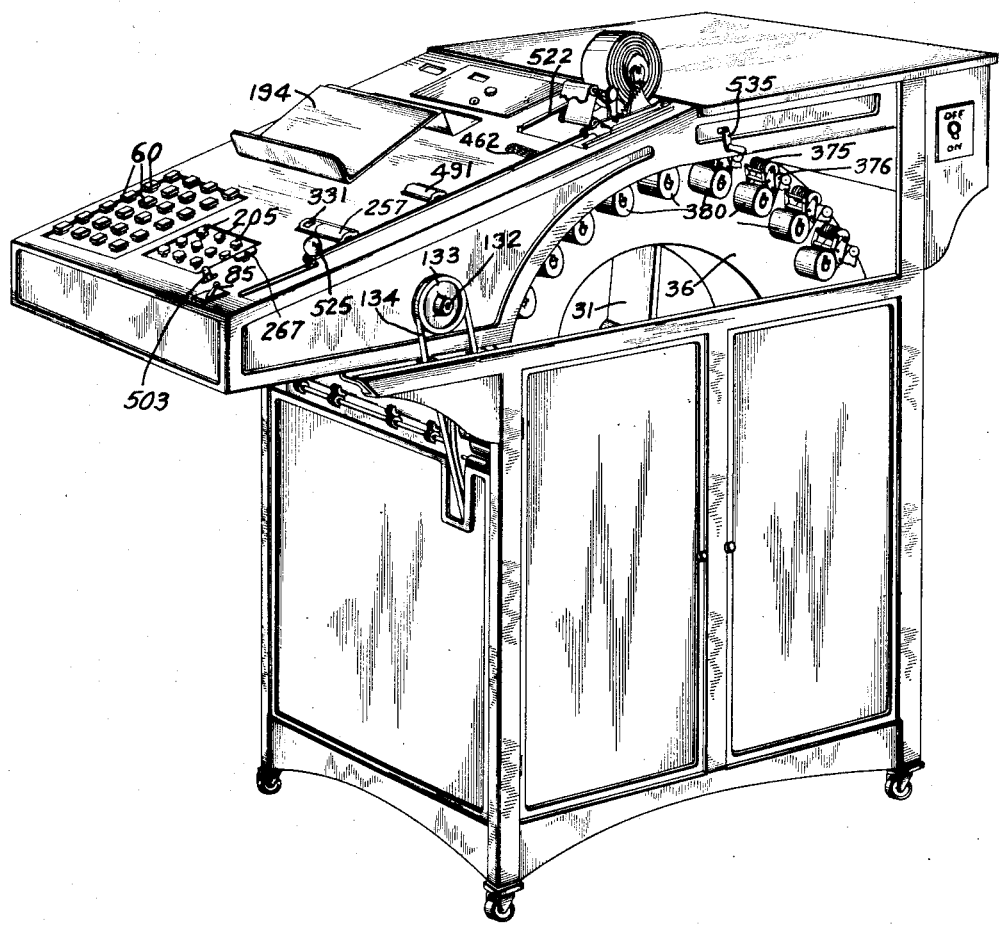
Fig. 1 is a perspective view of the assembled machine looking at its right side.
Figure 44:
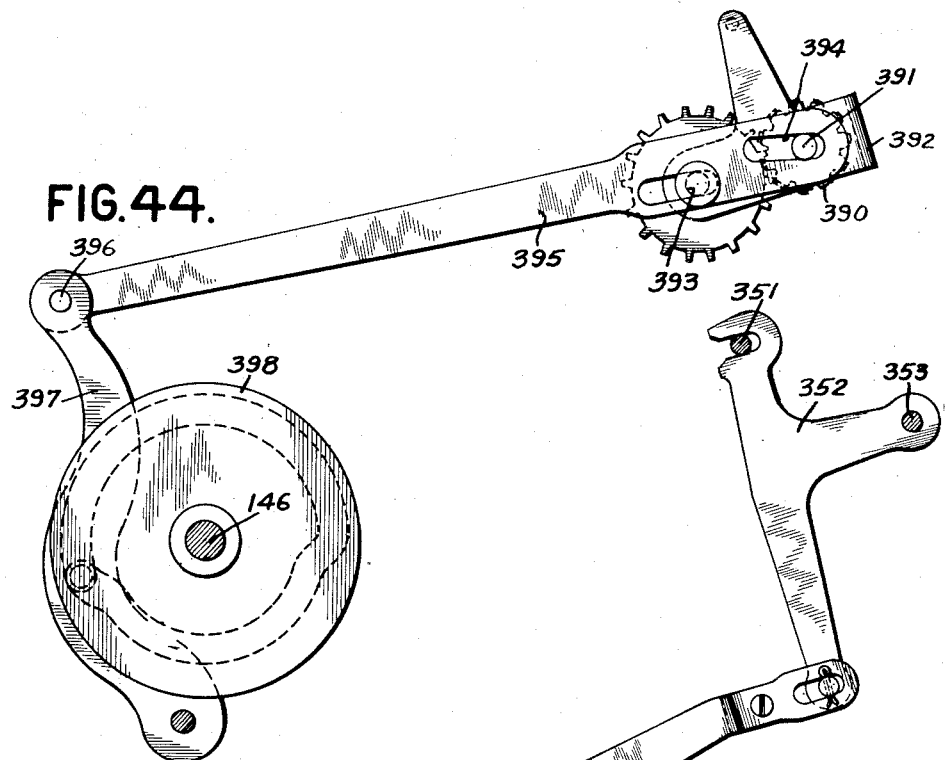
Figures 45, 46:
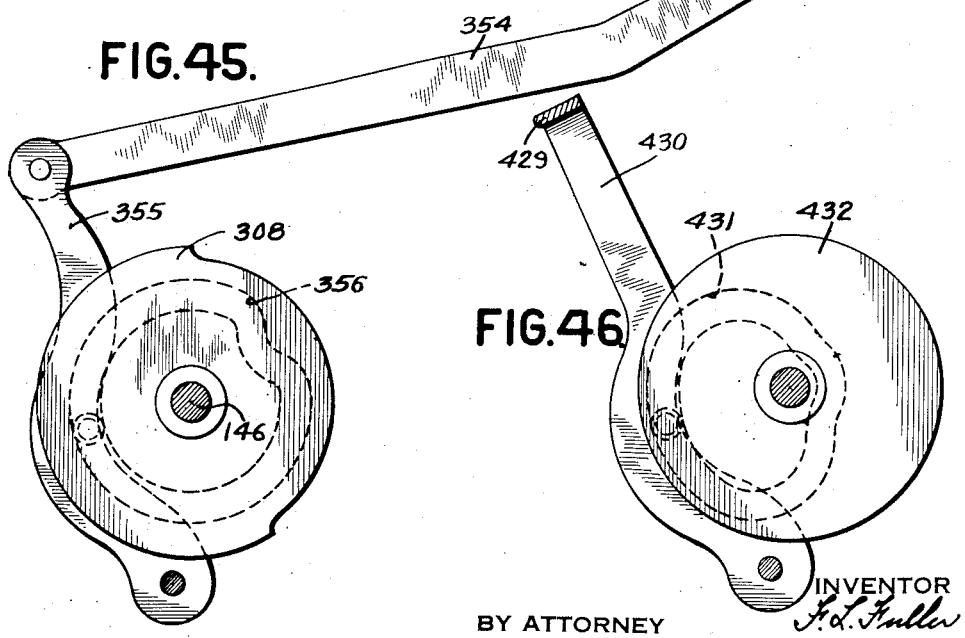
Figure 50:
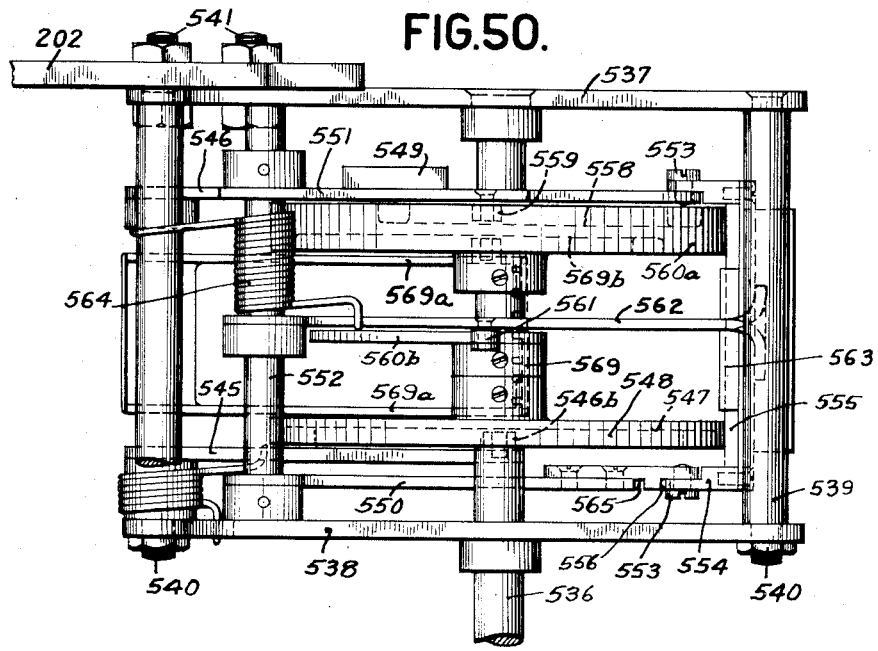
Figure 49:
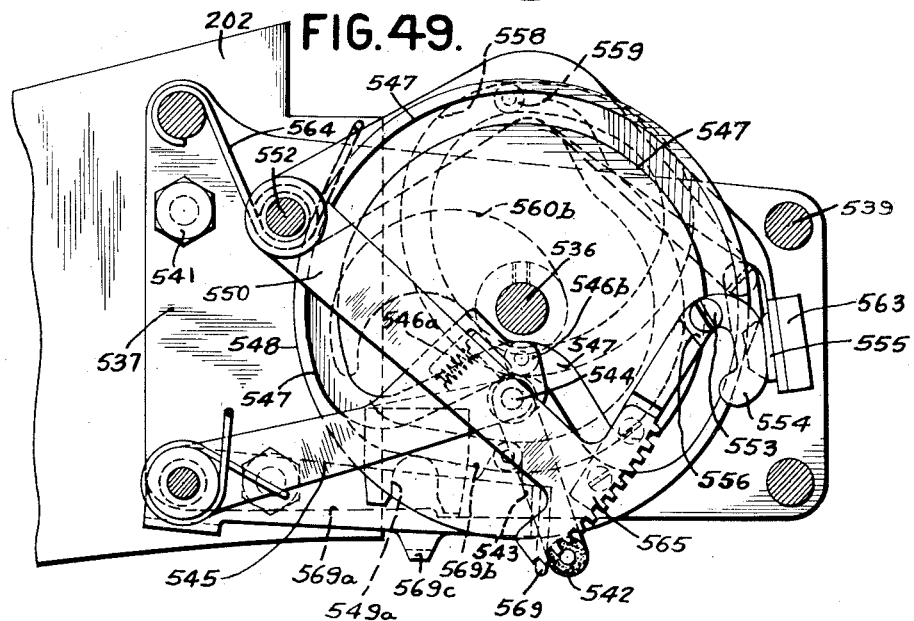

Fig. 20 is a sectional view taken on the line 20—20 of Fig. 21. This view illustrates in detail the association of the ten keys of the adding mechanism with their related differential controlling devices. Also in this figure is shown the preferred form of motor clutch and control;

Fig. 21 is a plan view of the forward end of the adding mechanism showing the arrangement of the ten controlling keys, the item wheel carriage and item wheels controlled by the keys and their relation with the totalizer operating devices;

Fig. 21a is a detail of the locking devices for the controlling slides;

Fig. 22 is a detail view in side elevation showing how the differentially positioned controlling shaft is normally locked against operation;

Fig. 23 is a detail view showing the relation of the main operating device and the connections controlled thereby for effecting the restoration of the differentially adjusted item wheels and the shifting of the item wheel carriage to its normal position;

Fig. 24 is a view in side elevation of the escapement devices associated with the item wheel carriage and the manner in which the adding keys control the escapement devices;

Fig. 25 is a cross sectional view taken on the line 25—25 of Fig. 33;

Fig. 26 is a cross sectional view taken on the line 26—26 of Fig. 33;

Fig. 27 is a longitudinal sectional view and shows particularly the association of the shaft which carries the differential stop devices and the controlling keys;

Fig. 28 (sheet 26) is a detail view illustrating one of the item representing wheels in relation with its associated resetting device;

Figs. 29 and 29a taken together show a longitudinal sectional view taken through the adding section of the machine showing among other things one of the main operating slides and its relation to the various grand totalizers and the manner in which the slide is effective to enter an amount in one of the selected totalizers;

Fig. 29b is a detail view of parts of the transfer and operating devices taken on the line 29b of Fig. 29;

Fig. 30 is a detail view showing the preferred construction whereby the main operating shaft is normalized at the termination of the adding cycle;

Fig. 31 is a detail view illustrating the locking bar associated with the differentially adjusted item representing wheels and the means by which the locking bar is shifted to unlocking position when adding operations are effected;

Fig. 32 is a view of one side of the adding section of the machine;

Fig. 33 is a plan view of the adding section of the machine;

Fig. 34 is a cross sectional view taken on the line 34—34 of Fig. 33;

Fig. 35 is a cross sectional view taken on the line 35—35 of Fig. 33;

Fig. 36 is a view in side elevation of the printer associated with the item printing devices showing the manner in which the platen is operated to effect the impression therefrom as well as the preferred construction for effecting paper spacing operations;

Fig. 37 is a longitudinal section of the machine, the adding frame having been removed to show more clearly the manner in which the special character printing and reading wheels are differentially positioned under control of the sorting drum to designate its position of adjustment;

Fig. 38 is a view in side elevation illustrating one of the combined totalizers and record strips by means of which an entry may be effected in the totalizer, the amount printed upon the record strip and the total represented by the totalizer also printed upon the strip;

Fig. 39 is a front view of the combined totalizer and record strip illustrated in Fig. 38;

Fig. 40 is a sectional view taken on the line 40—40 of Fig. 39;

Fig. 41 is a detail view in side elevation showing the totalizer engaging slide and its association with the multiple grand totalizers;

Fig. 42 is a plan view of the error key lever and its controlling connections whereby the main operating racks are ineffective for adding operations at selected operations of the machine;

Fig. 43 is a longitudinal sectional view of the grand reading totalizer showing the associated locking devices for the totalizer elements and the means by which they are rendered effective when the frame is shifted as an incident to an adding operation;

Figs. 44, 45 and 46 are detail views in side elevation of several of the operating cams;

Fig. 47 is a view in side elevation of the grand printing totalizer resetting device and associated controlling devices for the totalizer locking bar;

Fig. 48 is a view in side elevation illustrating in detail the interlocks between the main driving shaft, the compartment selecting keys and the handle which is operated for effecting a total printing and resetting operation from one of the selected totalizers;

Fig. 49 is a view in side elevation illustrating in detail the preferred form whereby a total may be printed from a selected totalizer and subsequently zeroized;

Fig. 50 is a plan view of the parts shown in Fig. 49;

Fig. 51 is a detail view of the parts associated with the totalizer locking devices and showing the means whereby the locking devices are disabled under control of the printer for permitting restoration of the totalizer elements to zero;

Fig. 52 is a modification of the mechanism controlled by the error key lever for permitting the adding mechanism to go through a cycle of operation which is ineffective with respect to the totalizers.

*Prime mover*

The power to drive the various mechanisms of the machine is derived from a motor 10 running constantly when the machine is in operation. From Fig. 8 it will be observed that the motor 10 drives a shaft 11, and through a reduction gear mechanism 12 a shaft 13 is also driven. By the provision of a spline 14 the shiftable element 15 of a clutch device has a constant driving engagement with the shaft 13. A companion clutch element 16 is loosely mounted on a sleeve 17 pinned to the shaft 13.

A driving engagement between clutch elements 15 and 16 is effected by the shifting of the vertical arm of a bell crank 18 pivoted at 19 to a bracket 20 secured to a base plate 21. The companion clutch elements are normally separated by means of a spring 22 acting on bell crank 18.

Base plate 21 is secured to a pair of oppositely arranged cross members 23 and provides the mounting at the lower part of the machine for the motor 10, reduction gear 12, and by bracket 20 a support for the outer end of the shaft 13, the shaft being suitably mounted in a ball bearing assembly 24.

*Sorting drum*

Referring particularly to Fig. 5, it will be observed that secured to vertical supporting or frame members 25 are bearing brackets 26 in which is journalled a rod 27. This rod is the support or axis about which the assembled sorting drum rotates. The particular manner in which the drum is constructed to form sorting compartments is preferably as follows:

The drum is comprised of a pair of symmetrical castings (Fig. 5) preferably of aluminum or other material of a low specific gravity, each of which comprises an annular plate 28, the outer concentric edge having an integral ring portion 29 substantially parallel to the rod 27 and extending completely around. The inner concentric edge of the plate 28 is provided with an integral conically shaped bearing portion 30. Radial ribs 31 (see also Fig. 4) extend between the portions 29 and 30 to give rigidity to the casting. Two such sections are joined together by fastening means such as screws 32. The smaller end of each bearing portion 30 is supported by ball bearing assemblies 33 surrounding rod 27 to lessen friction by the rotation of the drum.

As shown more clearly in Figs. 4 and 5 the right casting (Fig. 5) differs from the left only in the provision of an integral annular plate 35 providing at one end a closure for the series of compartments 36 and to which plate is secured other devices to be referred to and described in detail hereinafter. Upon the outer rings 29 are secured a plurality of adjacently mounted bent plates preferably of aluminum to reduce the weight and comprising (as shown in Fig. 7) concentric base portions 37 preferably overlapping each other and fastened to the rings 29 by screws 38. This overlapping arrangement makes the portions 37 the bottoms of the compartments and gives a plane bottom as contrasted to one which would be afforded by the unfinished joined rings 29.

Figure 3:
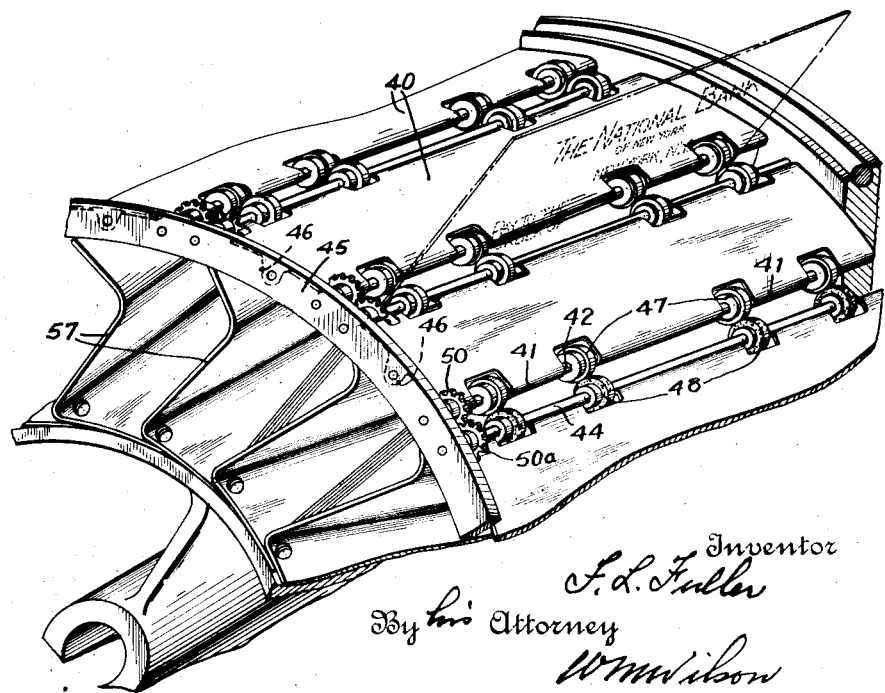
Fig. 3 is a perspective view of a portion of the drum showing how the outer ends of the compartments are closed and the manner in which checks may be inserted by the feeding rollers to the selected compartments.

Portions 37 have integral upwardly extending radial plates 39 forming the side walls of the compartments and they extend the width of the drum. Plates 39 are also formed over concentrically with respect to the center of the drum as indicated at 40 while the angle portion between 39 and 40 is formed with semi-circular portions 41 to receive a shaft 42. The end of each plate 40 is curved in front of a shaft 44. A pair of such shafts 42—44 form the journalling means for the feeding rollers and such shafts are journalled at their ends in the end wall plate 35 (Figs. 4 and 19) and at their opposite ends in an annular ring 45 (Figs. 3 and 19). The plates 40 at their ends have tabs 46 (Fig. 3) secured to the ring 45 thus holding the latter in place.

As is best shown in Fig. 19 the shaft 42 has loosely mounted thereon a plurality of feeding rollers 47, preferably of brass and with smooth peripheries. The shaft 44 has secured thereto a plurality of knurled feeding rollers 48 preferably of rubber and in immediate feeding engagement with associated rollers 47. The radial portions 39 (as well as portions 41) are suitably cutaway at 49 (Fig. 5) to receive the plurality of sets of rollers and by this arrangement the bottom (when the compartment is below) is suitably closed to prevent dropping out of the checks by the concentric plates 40 and the coacting sets of rollers 47—48, while entrance of a check to the compartment (when it is above) may be effected by insertion of a check between such pairs of rollers and then suitably rotating them. To this end on shaft 42 there is loosely mounted a pinion 50 geared to a pinion 50a secured to shaft 44 the pinion 50 having a driving engagement with a pinion 51 (Fig. 7) at the proper time so as to drive the feeding rollers of the compartment selected to receive and feed a check or paper thereto. The particular means whereby this is effected will be described more in detail hereinafter.

To prevent checks from falling out by shifting edgewise guide rails 56 (Fig. 6) are secured to the frame work while the diagonally shaped notches 57 (Fig. 2) in the plates 39 permit the checks to be easily withdrawn from the uppermost compartments.

To rotate the drum through the clutch device there is integral with the clutch element 16 a grooved driving wheel 52 (Figs. 4 and 9) receiving an endless belt 53 passing around the edge of plate 35 which is suitably grooved to receive the belt. The belt is kept tensioned by a pulley 54 carried by spring urged arm 55 (Fig. 4).

*Compartment selection by keys*

Figure 11:
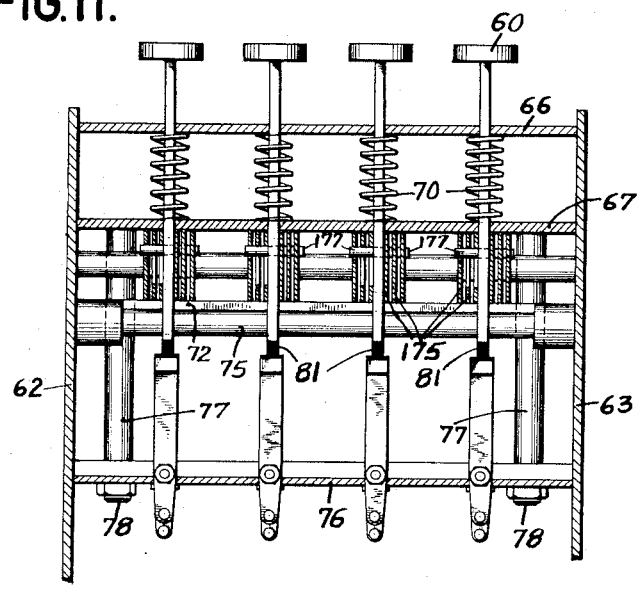
Fig. 11 is a cross sectional view taken on the line 11—11 of Fig. 10.

The drum, of course, is rotated differentially whenever a compartment not in position is to be selected to receive a check and such rotation is under the control of a series of compartment selecting keys 60 (Fig. 2) there being one for each compartment and preferably grouped in banks. In the instant case 24 compartments are provided and correspondingly there are four banks of six keys each which in aggregate provide a keyboard of 24 keys mounted in an aperture of an inclined plate 61 for access by the operator of the machine. The key caps carry suitable indicia to designate the compartment that may be selected and are lettered according to the classification numbers, letters, etc. of the checks, vouchers, etc. to be sorted. The keyboard comprises a separate unit detachable from the machine for assembly and inspection purposes. As is best shown in Figs. 10 and 11 it comprises a pair of side plates 62 and 63 secured to a base plate 64 by screws 65 said screws passing into integral brackets extending upwardly from the base plate to thus hold the framework.

Secured to and between the plates 62 and 63 are a pair of plates comprising an upper guide plate 66 and a lower guide plate 67. Both of these are provided with a series of guide slots in which the upper and intermediate portions of the keys are received as best shown in Fig. 10. The enlarged head 69 of each key 60 bears against a related compression spring 70 fitting around the reduced stem of the key, the lower portion of the spring bearing against the lowermost guide plate 67. In this manner each spring is capable of restoring its related key 60 to its normal position, the latter being maintained by virtue of a lug 71 engaging beneath the plate 67. Each key is also received by a slot in a detent plate 72 the latter being urged to its normal position by means of a spring 73 and plate 72 may be shifted towards the left by means of an inclined lug 74 on the lower end of each key 60. When a key is depressed the coaction of the inclined lug 74 with the slot in the detent plate 72 will shift the same against the action of the spring 73 said guide plate being shiftably guided by pairs of guiding rollers 75 provided for the purpose of reducing frictional resistance. When the cam lug 74 during the depression of the key 60 has passed beneath the detent plate the same will be urged by the spring 73 to its normal position so that upon a restoration of the key the lug 74 will coact with the underside of the detent plate to hold the key in depressed position. As will be described more in detail hereinafter means are also provided for operating the detent plate to release the depressed key at the end of the machine operation.

It is also pointed out that the detent plate 72 is common to the several banks of keys 60 so that depression of a key in one bank will shift the detent plate sufficiently to release a key depressed in either the same or another bank.

Located beneath the lower ends of the keys is a contact unit carried by a plate 76 spaced apart from the intermediate plate 67 by sleeves 77 in which pass the fastening means 78. The plate 76 carries several banks of contact units each of which comprises two sets of contacts 79 and 80. The intermediate blades of the sets of contacts are adapted to be engaged by insulated portions 81 secured to the lowermost end of the keys so that upon a full depression of a compartment selecting key contacts 79 and contacts 80 will be closed and remain closed by virtue of the previously mentioned locking of the key in depressed position.

Electrical controls

The purpose of these contacts will be more apparent from the wiring diagram illustrated in Fig. 14. The diagram, incidentally, shows the motor connections and connections to the other electrical instrumentalities. In the wiring diagram reference character P indicates a power line adapted to be extended by means of a switch 82 to the bus bars 83 and 84. When said switch is shifted to the left, the lowermost bar 84 will be connected to the corresponding line side. When, however, a switch 85, positioned upon the keyboard for manipulation by the operator is shifted (see Fig. 1 also) the magnet 86 of a relay will be energized resulting in closing contacts 87 to thus connect the bus bar 83 to the corresponding side of the power line. This will set the motor 10 in continuous operation until either switch 82 or 85 is opened.

Contacts 79, when closed by depression of any of the related keys 60 will result in the energization of a magnet 92 which controls the main clutch device (Fig. 9) to effect a rotation of the drum. As will be observed in Fig. 14 one blade of contacts 79 is connected to the bus bar 83 by means of a wire 88. The other blade of the set in question is in series with the relay magnet 89 by means of a wire connection 90, the other side of said magnet being connected to the bus bar 84. From the above, it will be apparent that the depression of any of the keys 60 in the several banks will cause energization of the relay magnet 89 to attract an armature thereby closing contacts 91a which extend a circuit from the wire 88 through the closed contacts 91a and then through the normally closed contacts 91 of a supplemental relay to one side of the clutch magnet 92. The other side of the magnet is connected by a wire 93 to the bus bar 84. Thus depression of any key 60 energizes clutch magnet 92.

Referring particularly to Fig. 9, it will be observed that when the magnet 92 is energized an armature 94 is attracted resulting in rocking the bell crank 18 in a counterclockwise direction thereby effecting a clutch connection between the companion clutch elements 15 and 16. This causes rotation of the drive wheel 52 and through the endless belt connection previously described effects a rotation of the drum.

In addition to starting the rotation of the drum, the keys control the differential rotation of the drum in order that when the selected compartment is at the proper position at which to feed the check the drum will be stopped in its rotation and locked in place. The means whereby this is effected comprises the supplementary set of contacts 80 and, considering an individual set, it will be noted that one side thereof is connected to the bus bar 83 and the other blade of the same set by means of a wire 95 to a contact point 96. Considering a full complement of keys it will be observed that the associated contact plate of each of the various sets of contacts 80 is connected to its related contact point 96 so that depression of a key 60 extends the circuit from the bus bar 83 to the corresponding contact point 96.

The series of contact points 96 with a lever 104 comprise a commutator structure the mechanical details of which are shown in Figs. 13 and 15. The series of contact points 96 is carried by a disk of insulating material 98 fixed by screws 99 to the left bracket 26. By means of screws 100 (Fig. 5) a flanged cylinder 101 is made an extension of the left hand bearing of the drum and by means of a split hub clamp 102 a commutator lever 104 (Fig. 13) is secured to the cylinder 101 and thus rotates with the drum. A contact 105 carried by the lever 104 passes over contacts 96 to engage therewith electrically, while a spring urged contact 106 also carried by the lever 104 is in constant engagement with a ring 107 connected by a wire 108 (Fig. 14) to one side of magnet 109 the other side being connected to the bus bar 84 by a wire 110.

The circuit from wire 108 or lever 104 also divides so that by wire 108a the magnet 103 of a relay (which controls contacts 91 and 111) is extended to the bus bar 84.

It will be apparent that if a key is depressed the contact 96 operatively related thereto will extend the circuit from bus bar 83 to this point and since the drum is now placed in rotation lever 104 will move correspondingly until it engages the contact point 96 related to the depressed key. This, will, by the circuit connections just explained, cause magnet 109 to be energized. The latter has control over the devices which effect stopping of the drum in its rotation. It will be noted that energization of magnet 103 will cause opening of contacts 91 to deenergize magnet 92. The deenergization of the latter will permit the clutch devices to be separated thereby rendering ineffective the motor drive for the drum.

Drum stopping devices

In general, this comprises an arm which is normally in ineffective position but is rendered effective whenever the magnet 109 is energized to engage a portion of the drum to stop its rotation.

As best shown in Figs. 4, 16 and 17 pivoted to the framework structure 111 is a depending arm 112 to which is pivoted at 114 a lock arm 113, the arm 112 having an extension 115 to which is secured a spring 116. Contact between an extension 117 of lock arm 113 and a fixed projection 118 determines the normal position of arm 112 under control of spring 116.

Magnet 109 has a retractible core piece 119 the lower end having a pin 120 in engagement with an inclined slot 121 in arm 113.

The free end of arm 113 has secured thereto an extension 122 by rivets 123a so that when arm 113 is projected upwardly it is placed in the path of one of a series of extensions which in the present instance comprises the extensions of the shafts 44.

It will be obvious that when magnet 109 is energized at the proper time the pin 120 engaging slot 121 will elevate arm 113 bringing the upward extension 122 in front of some particular shaft 44 thus acting as an obstruction the drum in its rotation. The contact of shaft 44 with the extension 122 will tend by the momentum of the drum to shift arm 113 to the left as viewed in Fig. 4, and as it is now held in its upward position due to the elevation of pin 120 by continued energization of magnet 109, the incline of the slot 121 will cause arm 113 to be elevated still further, so that the extension 122 always retains its position in front of shaft 44 as the latter moves in a concentric path. The speed of rotation of the drum and the tension of spring 116 is so selected that arm 113 is never shifted to the left to its extreme position so that pin 120 never strikes the end of slot 121. The drum having been thus stopped by the arm 113 the latter with the drum are retracted by spring 116 until a position defined by contacts of elements 117—118 is obtained. This position brings the various devices to be operated, as well as to bring the compartment to receive a check in the proper position, the drum being held locked in this position until the magnet 109 is later deenergized by the release of the depressed key and which does not occur until the final operation of the machine at which time a check has been deposited in the selected compartment.

To prevent retrograde movement of the drum when stopped there is pivoted in a slot in the arm 113 a spring urged check arm 123 having an extension 124 receiving one end of the shaft 44. The free end of the arm 123 is depressed by a shaft 44 when the arm 113 is upward and extension 124 snaps upwardly when the shaft clears the arm. Since the shaft 44 is now firmly engaged between parts 122 and 124 it will be seen that a positive lock or retainer for the drum in both directions is provided as long as arm 113 is held upwardly.

To reduce the momentum of the drum when stopped in its rotation a compression device 126 of any suitable form may be provided. In the present machine when a shaft 44 engages the extension 122 the arm 113 will be shifted to the left but this is effected against the action of the compression device 126, through an interconnecting bell crank 127. This causes a gradual stopping of the drum in its rotation and eliminates the possibility of injury to the parts by shock if a sudden stop was effected.

*Check feeding devices*

In the preferred construction when a compartment has been selected to receive a check the latter is fed to the compartment feeding rollers by suitable feeding means which, in the instant case, comprise a pair of feeding rollers 130, 131 (Fig. 7) between which the check or paper has been previously inserted.

The driving devices for driving the feeding rollers receive their power from a shaft 132 (Fig. 6) which extends completely through the upper controlling section of the machine the right end of the shaft having a pulley 133 (Fig. 4) having a belt connection 134 to a pulley 135 secured to the constantly rotating shaft 13 (see also Fig. 9).

Figure 2:
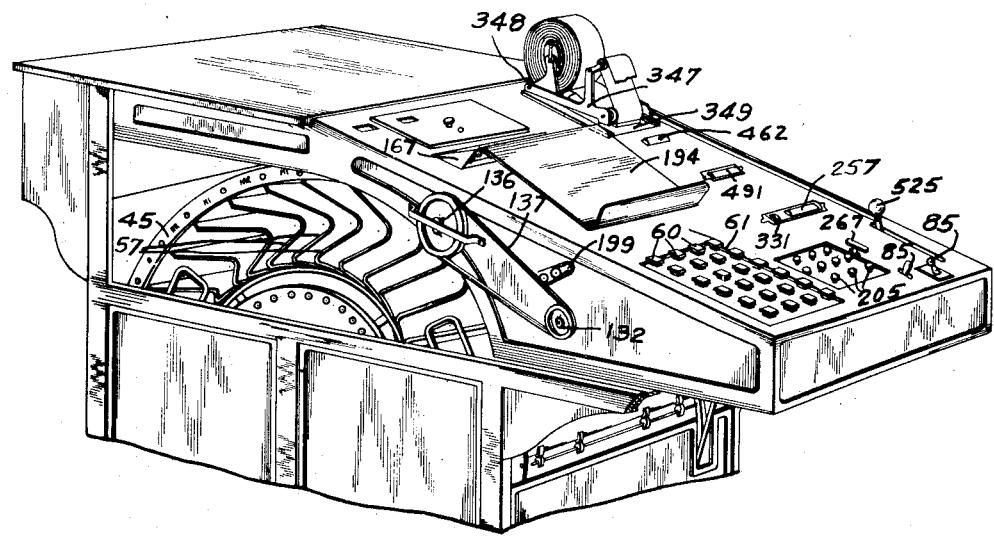
Fig. 2 is a perspective view of the upper part of the assembled machine looking at the left side thereof. This view illustrates, the keyboard arrangement of the various controlling devices and the arrangement of the compartments for receiving the checks deposited therein.

As shown in Fig. 2 the shaft 132 drives a shaft 136 through a belt and pulley arrangement 137. Loosely mounted upon shaft 136 is the lower feeding roller 130 (Fig. 19) operatively engaged by intermeshing gears 129 with the upper roller 131 that is, the rollers have a positive driving engagement to feed a check inserted therein when the rollers are oppositely rotated. For driving the feeding roller 130 by the shaft 136 a friction drive comprising a conical shaped disk 138 secured to the roller 130 and an internally recessed flange member 139 secured to shaft 136 is provided. A coil spring 140a is provided to give the required amount of friction between the elements 138—139 to drive the roller 130. While shaft 136 and, therefore, element 139 are constantly rotating, the lower roller is locked against movement by a lock arm 140 (Fig. 7) normally engaging a stud 141 secured to disk 138, this action being maintained by a spring 142. When a check is in position to be fed the arm 140 is rocked to bring its extremity away from the path of the stud to permit the frictional drive of the pair of feeding rollers, this being preferably effected by rocking an arm 143 secured to the arm 140 by a sleeve 144 (Fig. 7) the arm 143 having a stud in engagement with the periphery of a profile cam 145 secured to shaft 146. When certain operations, particularly in connection with the adding mechanism have been effected, this shaft is operated so that the initial rotation of the cam 145 in the arrow direction (Fig. 7) will unlock the feeding roller to cause an opposite rotation of rollers 130—131. At the final operation of the machine the arm 140 is restored by spring 142 to again contact with the stud 141 to stop the feeding movement. The above mechanism provides for an invariable operation of the feeding rollers.

The upper feeding roller 131 is journalled by shaft 154 in a yoke shaped frame comprising a side plate 147 (Fig. 19) a cross member 148 (Fig. 7) and a side plate 149, both of said plates being mounted upon the shaft 136. Pinned to the plate 149 is an upwardly extending arm 150 to which is articulated a link 151 bifurcated to receive the shaft 146 but having a roller 152 engaging the race of a box cam 153 secured to shaft 146.

Secured to the clutch element 139 is a gear 154 in continuous engagement with a gear 155 secured to a stub shaft 156. This shaft is carried by a bail shaped frame 158 (Fig. 7) secured to the cross member 148 to receive like movements of the latter. Pinned to the shaft 156 which, it will be observed, constantly rotates, is the roller driving pinion 51.

Under the action of cam 153 the frame members 148 and 158 are initially rocked about shaft 136, roller 131 rolling slightly over roller 130. Movement of frame 158 downwardly causes the pinion 51 to engage one of the pinions 50 to thereby rotate the selected sets of feeding rollers 47 and 48 to receive the check or paper issuing from the rollers 130, 131 which are simultaneously driven thereby transferring the check to the selected compartment. At the termination of such feeding movement the frames are restored and pinion 51 is elevated to give the necessary clearance and permit a subsequent rotation of the drum to select another compartment.

When the drum is stopped, the checks already in the compartment have a tendency to lie or are shifted to lie in an inclined manner against the left wall (as shown in Fig. 7) and thus the checks already within the compartment permit an unobstructed entrance of a new check to the compartment.

Certain adjuncts may be provided to print upon the back of the check fed any desired matter, such as the endorsement. Such devices in the present instance comprise an electro type plate 162 secured to the periphery of the roller 131. The plate is preferably apertured to receive a series of adjustable printing wheels 163 suitably pivoted in a recess in the roller 131. The latter feature is carried out in essentially the same manner as indicated in the patent to H. Cook, No. 483,511 and provides for printing of dates, etc.

Inking of the printing members may be effected by an inking roller 164, in constant engagement with a felt supply inking roller 165 these inking devices being suitably carried by a yoke frame 166 secured by screws to the cross member 148.

For facilitating the entry of checks for reception by rollers an inclined chute 167 is provided and in which a check is inserted. The weight of the checks is usually sufficient to insure that they pass in the "bite" of rollers 130 or 131 but in case they are crumpled, forcible entry may be required and to this end the upper portion of chute 167 is flared at 168 to permit entry of the fingers of the operator's hand when depositing a check in said chute.

Key release mechanism

At this point there will be described the means for releasing the keys. Detent plate 72 (Fig. 10) and a plate secured beneath has a slot 170 which is received by the upper end of one arm of a bell crank 171. This slot in the normal position of bell crank 171 permits free movement of detent plate by depression of the keys.

The lower arm 174a of the bell crank is restored to normal position by a pin 172 on a disk 173 secured to the operating shaft 146 driven during adding operations. Coaction of pin 172 to shift arm 174a shifts the detent plate 72 to its normal position. This movement releases the detent plate from the depressed key which is restored to its normal position by its spring 70.

In connection with the release of the keys it was previously pointed out that the circuit through magnet 109 (Fig. 14) is closed by the contact of brush 105 with a point 96. Now, when the depressed key 60 is released opening of contacts 79 will cause magnet 89 to be deenergized, so that contacts 91a will open. As the contacts 111 also open, since relay magnet 103 is deenergized by opening of contacts 80, the circuit to magnet 109 from bus bar 84 to bus bar 83 is open at two points (91a and 111) resulting in its deenergization. Such an arrangement provides for a minimum of sparking at the key controlled contacts 79 and 80 and permits it to take place at the relay contacts.

Devices for limiting number of checks fed in a compartment

It will be observed that the selection of a compartment requires a depression of a key 60 each time, this being particularly true since the drum is released for free rotation in either direction when a key 60 is released. This rotation is primarily effected by the unbalanced condition or state of the drum. It will be thus observed that the drum does not usually stay in the selected position and the feeding of a second check in the same compartment usually necessitates the successive depression of the same key. For this reason devices are employed to inform the operator when the same key has been depressed a certain number of times, which correspond to an equal number of checks in the compartment. By suitable indicating means the operator will thus know that a certain compartment has received a limited number of checks and that this compartment requires emptying.

Associated with each key is a slidably mounted plate 175 having a cam slot 176 in engagement with a stud 177 on the related key. When a key is depressed the related plate 175 is shifted toward the left to rock a related bell crank 178 and by a pawl 179 engaging the notched teeth of a disk 180 will give a units movement thereto. When the key is released the reverse action of pawl 179 will not affect the positioned disk as detent plates 180a retain them in position. The studs 177 (Fig. 11) are of different lengths to coact with its related cam plate and where such studs extend through plates 175 which are not to be operated, apertures 181a (Fig. 10) are provided for such plates.

Successive operations of the same key will bring the related counter disk 180 around until a stud 182 (Fig. 10) thereon engages a cam edge 183 of a lever 184.

Figure 12:
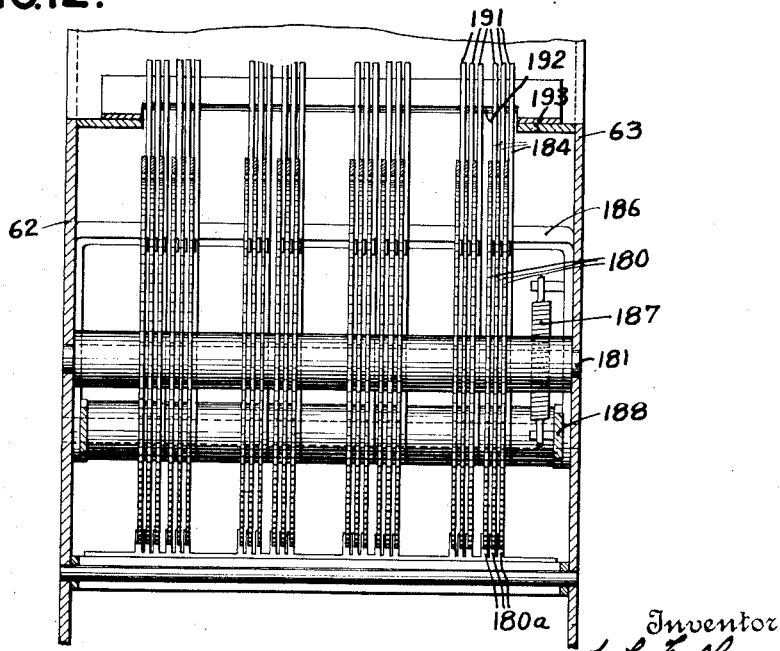
Fig. 12 is a cross sectional view in side elevation taken on the line 12—12 of Fig. 10.

There is, of course, a series of such disks 180 one for each key (as shown in Fig. 12) so that the depression of any one will shift a bail 186 extending across the series of levers 184 and by tensioning slightly a normally untensioned spring 187 will elevate one arm 188 of a bail member 189. This will then pass in front of the diagonal edge 190a of the unoperated plates 175 and a diagonal notch 190 of the operated plate thereby locking all the keys against depression and retaining the one just depressed even though the detent plate 72 is subsequently operated for key release. This depressed condition of the key will be apparent to the operator and by the position of extension 191 of the shifted lever 184 he will also know which key is locked and, correspondingly which compartment is full.

The extensions 191 are shiftable in slots 192 (Figs. 10 and 12) in a cover plate 193 lettered like the keys to give the desired information. Access to such levers and other operating devices is afforded by elevation of a hinged cover 194 (Fig. 1).

If a certain key, say #10 is locked down, the operator knows by position of related lever 184 that the #10 compartment is filled. The checks or papers, are then withdrawn and thereafter a key 195 is depressed. This is pivoted to arm 188 of bail 189 at 196 and when key 195 is depressed shifts the latter to unlock the series of plates 175 to permit release of the locked key by depression of another key and also tensions spring 187. When key #10 is now restored to normal by depression of some other key it is again depressed alternately with some other key (the operator holding key 195 down) as many times as is necessary so that the related counter 180 will be given an additional movement. This immediately brings pin 182 above the cam 183 releasing the related lever 184 so that it is restored to normal by the bail 186 through the spring 187 when it was tensioned by depression of key 195.

The parts are now again at normal being ready to start a new count for the previously locked key 60.

It is desirable to reset the variously positioned disks at the termination of a sorting operation and to this end each disk 180 has a pawl 197 in operative engagement with the groove 198 of the support shaft 181. When the handle 199 (Fig. 6) secured to shaft 181 is turned the shoulder of the groove will encounter the variously positioned pawls 197 to restore all the disks 180 to normal starting position. This particular expedient is well known in the art and for this reason is briefly explained herein.

Adding mechanism

The machine also includes an adding machine 150 preferably, of the ten key type, for totalizing the amounts represented upon the checks to be sorted. Individual totalizers, one for each compartment, give the totals of all the checks fed into the related compartment while a grand totalizer effects a total summation of the individual totalizers. In addition to this there is a supplemental grand totalizer, which is provided reset less frequently and, preferably, gives the grand total of the totals of the grand totalizer.

The ten key adding structure is intended to indicate to the operator the amount to be entered prior to the totalizing operation in order that incorrect entries may be rectified at the will of the operator.

*Item wheel set up devices*

For the present, the manner in which the preferred structure sets up the item representing wheels will be considered.

Secured to a shaft 200 (Figs. 20, 21 and 27) journalled in the adding machine frames 201, 202 and 203 which are secured to the base 64 are a series of ten spirally arranged stop fingers 204 one for each of the ten keys 205. The keys 205 (Fig. 20) are slidably mounted in a guide plate 206 and at their lower ends each has a pivot connection 207 to one arm 208 of a bell crank mounted on shaft 215 the other arm 209 extending upwardly so that when shifted by the depression of a key 205 a stop shoulder 210 will be placed in the path of the related stop finger 204. The keys 205 and related bell cranks 208—209 are suitably spaced apart as shown in Fig. 27 so that each key is cooperatively related with its associated stop finger 204. The keys are held upward to normal positions by springs 211 located beneath extensions of the arms 208.

For the purpose of preventing operation of more than one key at a time pendants 205a (Fig. 18) of the usual form are provided. When the pendants are crowded by depression of a key the shifted pendants lock the remaining keys.

The shaft 200, in its normal positions, has its stop fingers so located that the extent of movement of the shaft in a counterclockwise direction (Fig. 20) is dependent upon which arm 209 is projected, and in the case of the "0" key the arm will be thrust directly beneath a finger 204 which will, when the shaft 200 is released for rotation, permit a units movement of the shaft as determined by coaction of the "0" finger 204 with the arm 209 projected by the "0" key. In the case of the "1" key the related stop finger will permit a movement of two units of shaft 200 in a counterclockwise rotation, and similarly the remaining keys control the differential positioning of the shaft 200 which, in the present instance, is a unit more than the value of the key depressed.

As will be described hereinafter shaft 200 is normally urged for rotation but is normally locked by the provision of a stop finger 212 (Fig. 22) secured to shaft 200. A hooked member 213 normally cooperates with stop finger 212 but is drawn out of such engagement by the operation of a spring urged bail 214 underlying all of the arms 208 of the ten keys and is operated by the downward movement of any one. Bail 214 is secured to shaft 215 and the hooked member 213 is integral with one of the side plates of the bail.

Pivoted at 215a (Fig. 20) to each arm is a bell crank comprising a detent arm 216 having a hooked extension adapted to engage a stationary bar 217 when the key is initially depressed to thereby hold the key depressed but such action occurs before shaft 200 is released by disengagement of hook 213 from finger 212. Inserted between the upward arm 219 of the bell crank and a lug of the related arm 209 is a compression spring 219a. The upper extension of arm 219 has a cam edge 220 and since each finger 204 is of sufficient width to engage both cam edge 220 and stop finger 210 (see Fig. 21) it will be observed that when the key is locked in depressed position and shaft 200 rotated the effective finger 204 will contact the part of the cam edge 220 near the stop shoulder 210 to shift the hook of arm 216 out of engagement with the bar 217 to release the key. This occurs just shortly before the time the stop finger 204 coacts with the stop shoulder 210. The cam edge 220 is so proportioned that when engaged by a finger 204 the arm 216 will be freed from bar 217 but, however, spring 211 does not act quickly enough to restore the arm 209 so that in operation the finger 204 coacts with the stop shoulder 210 determining the stopped position of shaft 200. The key is now free to be released either by relieving pressure on the key cap by the removal of operator's finger or subsequently by spring 211 alone, if the operator has previously removed his finger before the shaft 200 is stopped.

The prime purpose of the latch mechanism and associated devices is to insure that the particular arm 209 operated will be held until engaged by the related stop finger 204 and then automatically released. When the key is released the shaft 200 will again be free to rotate since the operated arm 209 has been shifted away from finger 204. When restoration of bail 214 has been effected by elevation of the depressed key and has placed the hooked arm 213 in the path of the finger 212, shaft 200 will be stopped when the finger 212 again contacts arm 213. The series of stop fingers 204 is now in normal position (Fig. 20) ready to determine the subsequent differential positioning of shaft 200.

Shaft 200, as will be seen in Figs. 21 and 27, extends through frame member 202 and has secured thereto a pinion 221 in mesh with a gear or master wheel 222 (Figs. 25 and 27) loose on a shaft 223 and rotatable with one element 224 of a friction drive, the other element 225 having a pin connection 226 to the constantly rotating shaft 223. The desired amount of friction is provided by a spring 227 (Fig. 25) which is regulated by a collar 228, adjustable on shaft 223 by any suitable means such as a screw thread. To the shaft 223 is secured a pinion 229 (Fig. 20) in mesh with a gear 230 secured to the constantly running shaft 132.

It will be observed that the master wheel 222 and the shaft 200 geared thereto are urged to rotate by power but are released for such rotation by depression of any key. The shaft 200 is then stopped in its differential position by the stop devices and then rotated supplementally to its normal position.

The above described differential rotation of the master wheel 222 under control of the keys is utilized to set up numeral wheels indicating the key depressed so that upon completion of a series of key operations the numeral wheels will represent by their characters the keys previously depressed.

Journalled between side plate 203 and a bracket 231 secured to side plate 202 (Figs. 21 and 22) is a shaft 232 carrying a yoke or item wheel carriage 233, the side arms being forked to receive a shaft 234 (see Fig. 23). Between the side arms of the carriage and assembled on the shaft 234 is a series of item wheels 235, each toothed and carrying characters at the extremities of the teeth to indicate the value of the key depressed. A units movement of a wheel by a depression of a zero key brings the "0" character to view and correspondingly other characters are brought to view by depression of certain keys.

Between the side arms of the item wheel carriage is a sleeve 236 received by shaft 232 and in which sleeve is inserted a screw stud having its lower end in engagement with a spiral groove 238 formed in the periphery of shaft 232. By reason of the above arrangement steps of rotation of shaft 232 will cause the item wheel carriage and item wheels to be shifted in increments.

When the machine is at normal the first item wheel 235 (see Fig. 21) is in mesh with the master wheel 222 so that this wheel may be the first to be set up to represent the value of the first key depressed. When this operation has been completed the carriage will then be shifted an increment to bring the adjusted wheel out of position of engagement with the master wheel to permit the shaft 200 to be given its subsequent rotation during the release of the depressed key.

The worm screw shaft 232 is urged to rotate by suitable spring means now to be described. In mesh with a pinion 237 (Fig. 23) secured to one end of shaft 232 is an idler pinion 238a pivoted to side frame 203 and in mesh with the upper teeth of a double rack segment 239 loose on shaft 223. The lower teeth are in mesh with a segment 240 loose on the shaft 132 and having an arm 242 normally urged downwardly by a spring 243 to turn worm screw shaft 232 in a clockwise direction (Fig. 23) to shift the item wheel carriage to the left (Fig. 21). In mesh with the upper teeth of segment 239 is a pinion 244 secured to which is a toothed escapement wheel 245, both being loosely mounted on a reduced portion of shaft 200 (see also Fig. 27).

One tooth 246 (Fig. 24) of a double pallet escapement lever normally engages a tooth of the escapement wheel 245 to prevent rotation of shaft 232 as urged by spring 243. The escapement lever is loosely mounted on the shaft 215 but to said shaft there is fixed an arm 248 carrying a pin 249. Mounted over the series of arms 216 (Fig. 20) is a rod 249a of a yoke secured to a rock shaft 250 to which is pinned an arm 251 overlying the pin 249. The action of the parts is such that after the shaft 200, and, therefore, the first item wheel 235 through the master wheel 222 is differentially rotated, elevation of one of the arms 216 will elevate rod 249a to depress arm 251. This results in rocking the hooked end 246 out of engagement with one of the teeth of escapement wheel 245. The latter then rotates slightly until one of the teeth designated by 252 engages the top of hooked portion 253 of the escapement lever. This permits a step of rotation of shaft 232 sufficient to shift the carriage 233 (Fig. 21) to bring the item wheel just adjusted out of engagement with the master wheel 222.

The shaft 200 subsequently rotates supplementally to its normal position which is also effected during the elevation of the key depressed. At this time an arm 254 (Fig. 24) secured to shaft 200 whips around and strikes a pin 254a attached to the escapement lever so that the cam end of arm 254 cams the escapement lever to the right. The escapement wheel will now turn clockwise and a second half step of movement of the item wheel carriage is thereby effected since the hooked end 246 has now been shifted to the right (Fig. 24) bringing it in the path of the tooth of wheel 245 just below the one previously engaged.

This second shift of the item wheel carriage shifts the wheel just set differentially to mesh with the first of a series of racks 255 (Fig. 21).

In this manner a depression of a key sets up an item wheel, the first one being shifted to mesh with the first rack, the depression of the second key resulting in differentially setting the second item wheel and shifting the first wheel (previously set) into mesh with the second rack, and the wheel just set differentially in mesh with the first rack.

At the end of a setting up operation the item wheels 235 will represent a number to be added, corresponding to the keys depressed, and verification of this amount is ascertained by reading the series of wheels 235 which have been shifted so as to be visible through a window or slot 256 (Fig. 25). The figures are preferably magnified by a magnifying glass 257 (Fig. 1) to be readable by the operator.

*Differential adjustment of racks*

The wheels 235 besides indicating to the operator of the machine the values of the keys previously depressed also control the differential positioning of the series of racks 255. Referring to Figs. 21 and 28 is will be observed that the shaft 234 has a longitudinal groove 260 adapted to coact with the series of resetting pawls 261 one of which is secured to the side of each item representing wheel 235 and pivotally mounted within an annular recess. When a wheel 235 is adjusted and then shifted it is operatively engaged with the groove. The normal relation of a wheel at home position with the groove is as shown in Fig. 28 wherein it will be observed that one of a series of pawls 261 rests upon the periphery of the shaft 234. When an item wheel has been positioned by the differential mechanism it will be rotated about shaft 234 in a clockwise direction. When the shaft 234 is then rotated the related pawl assuming the dotted line position (see Fig. 28) in a counterclockwise direction it will be apparent that the radial wall 260a of the groove 260 coacting with the ends of variously positioned pawls 261 will pick up the wheels to restore them to their normal positions and such restoration will require as many units of movement as a wheel has been previously rotated.

A restoring operation of shaft 234 is effected by mechanism now to be described. Secured to the end of shaft 234 is a pinion 262 (Figs. 21 and 23) in continuous driving engagement with teeth formed at the upper end of a segment arm 263 loosely mounted upon the supporting shaft 132. Attached to the segment 263 and depending below shaft 132 is an arm 264 provided with a roller engaging the race 265 of a box cam 266 secured to the shaft 146.

It will be remembered that this shaft is given a single revolution when the adding operations are to be performed during which operation it will be observed that segment 263 will rock drive shaft 234 first in a counterclockwise direction so that by means of the groove therein return the item wheels 235 to their normal positions. Each item wheel 235 is in the form of a pinion the teeth of which are in mesh with the teeth of a related rack 255. As an item wheel is returned to normal the rack 255 it is in mesh with will be shifted rearwardly an amount commensurate with the value indicated on that particular wheel. After the item wheels are restored to zero to adjust the racks 255 differentially the differentially adjusted item wheels are then shifted to the right (Fig. 21) by a shifting movement of the item wheel carriage in the same direction.

During differential setting operations of the wheels it will be observed that the spring 243 (Fig. 23) will cause the arm 242 to approach the shaft 146 more or less and to an extent dependent upon the number of item wheels adjusted, or in other words, proportional to the denominations of the amount to be entered. A restoration of arm 242 will cause the restoration of the item wheel carriage by a reversal of he same mechanism employed to shift the same when the item wheels are successively adjusted. When the shaft 146 is rotated as an incident to adding operations a profile cam 266a will coact with the roller secured to arm 242 and elevate the same, this operation being effected after the shaft 234 has been turned to zeroize the adjusted item wheels. The result of the elevation of arm 242 causes shaft 232 to be turned to shift by its spiral groove the item wheel carriage to the right. During this operation it will be observed that escapement wheel 245 (Fig. 24) will be turned counterclockwise, the teeth of the escapement lever functioning as a ratchet for the wheel.

When the item wheel carriage is at its normal position (see Fig. 21) the shaft 234 is then rotated by the box cam 265 so as to be brought to its normal starting position.

Motor bar control

The performance of the operations just described and others are under control of motor bar 267 depressible by the operator to effect the clutching of the constantly running shaft 132 (Fig. 20) with the shaft 146 which performs the functions incidental to the adding operations. The preferred form of clutch mechanism will now be described in detail.

The motor bar 267 is operable exteriorly of the machine (see Fig. 1) and is carried by a stem 275 (Fig. 29) slidably mounted at its upper end and pivoted at its lower end to an arm 276. The stem carries a pawl 277 the lower end of which is adapted to engage one arm 278 (Fig. 20) of a bell crank, the vertical arm 279 being pivoted to a link 280 which is secured to the lower end of a pinion carrying frame comprising parallel plates 281a and 281b both loosely mounted on shaft 132 (see Figs. 20 and 21). Secured to the constantly running shaft 132 is a pinion 282 in mesh with an idler pinion 283 pivotally mounted on the frame plate 281a. Pinion 283 is in constant mesh with a broader pinion 284 also pivotally mounted on plate 281a. The pinion 284 when rocked into mesh is sufficiently broad to mesh with and drive a pinion 285 secured to the cam carrying shaft 146.

A spring 286 (Fig. 20) connected to the frame 281a—281b retracts the latter so a normal disengagement is effected between pinions 284 and 285. When the motor bar is depressed pawl 27 rocks bell crank 278—279 to shift the link 280 so that when the pinion carrying frame is rocked sufficiently to effect a driving engagement between pinions 284—285 a lug 288 of a spring urged latch arm 287 will spring behind a projection 289 of frame plate 281. Shaft 146 will now be driven to effect the various functions described. Towards the end of a complete revolution a pin 290 secured to gear 285 will coact with a tail of the latch arm 287 permitting spring 286 to restore the frame to effect disengagement between pinion 284 and gear 285.

When stem 275 is depressed pawl 277 will rock the bell crank and by the coaction of a tail of the pawl with a fixed stud 291a the pawl will be rocked in its downward movement and will pass by the arm 278 after the pinion carrying frame is rocked to be latched by pawl 287. The engaging end of pawl 277 now being below the arm 278 it will be observed that repeated operations of the drive shaft 146 cannot be effected by holding the motor bar depressed. The provision of the above "non-repeat" device requires restoration of the motor bar and a subsequent depression for each operation of the drive shaft 146.

Secured to an extension 291 of plate 281b is a plate 292 the lower concentric edge 293 being adapted to be engaged by a pin 297 secured to the gear 285 rotatable with shaft 146. The passage of the pin 297 beneath the concentric edge retains initially the desired clutching engagement of the drive and driven pinions and this is maintained after the pin has cleared the edge 293 by the concentric edge 296 of disk 295 coacting with the lower edge 293. When the shaft 146 returns to its home position restoration of the frame 281a, 281b by the unlatching of lever 287 will cause the lower projecting portion of plate 291 to fit in and engage a cut out portion of the disk 295, the parts now being at normal.

Device for normalizing cam shaft

It is desirable that the shaft 146 be brought to its normal starting position if not so done by the drive mechanism and to this end there is loosely mounted on shaft 146 a spring urged bell crank 300 (Fig. 30) carrying a pawl 301 having an end adapted to hook over the pin 297. On shaft 132 there is secured a wiper cam 302 which wipes past one arm of the bell crank, and as the shaft 132 is constantly revolving pawl 301 will be constantly reciprocated. Towards the end of the driving movement of shaft 146 pawl 301 will hook over the pin 294 and give shaft 146 an extra movement bringing it to its home position at which time pin 297 will abut the end of plate 292.

Aligning devices for item wheels

It is desirable that the item wheels be aligned or locked against movement while the carriage is in its normal position. To carry out the above object there is secured to the side plate 203 a transversely extending bar 304 (Fig. 21) fitting within the interdental spaces of the series of item wheels. Such engagement is effected when the wheels 235 are shifted to the right as an incident to the restoration of the item wheel carriage when adding operations are completed.

As the item wheels are successively shifted they leave the bar 304 so that the teeth thereof pass into engagement with a movable locking bar 305 (Figs. 27 and 31) and such locking relationship is maintained until the item wheels differentially set are restored to zero to positively shift the racks 255. Bar 305 is carried by the upper end of an arm 306 (Figs. 25 and 31) loosely pivoted on shaft 223. Secured to the arm is another arm 307 having a roller in engagement with a profile cam contour of a disk 308. The high portion 309 of the cam maintains the locking bar 305 in its locking position but when adding operations commence the roller drops to a lower portion under the action of a spring 310 to shift the bar 305 out of engagement with the wheels. Such relationship is maintained during the time the item wheels are zeroized but immediately thereafter the high part 309 of the cam is effective to rock the bar 305 into engagement with the wheels, keeping them locked during the shifting of the item wheel carriage and until they pass under control of the fixed locking bar 304.

Device for unlocking operating racks

Referring to Figs. 21 and 29 loosely mounted on a rod 311 is a series of locking pawls 312 urged by gravity so that their lower engaging ends 313 normally fit in recesses formed in the upper edges of the forward ends of the series of racks 255. The pawls 312 prevent accidental movement of the racks but when the item wheel carriage is shifted the pawls are successively operated to unlock the various racks. For this reason a bar 314 secured to the cross plate of the item wheel carriage has a bevel cam portion 315 (Fig. 21a) which passes over the rearward ends of the pawls 312 so to shift them so as to unlock the racks 255. As a pawl 312 is shifted it is held in such position by a straight edge 316 forming a continuation of the bevel cam edge.

In this manner if four item wheels 235 are set to represent a number the corresponding number of racks 255 are unlocked for operation.

Drum position indicator

It is desirable that the operator know what compartment, and correspondingly which of a series of totalizers 375 (Fig. 4) are in position for check feeding and adding operations, respectively. To this end secured to the drum is a cam disk 321 (Fig. 4) engaging one end of one arm of a bell crank the other arm having teeth 322 in mesh with a pinion 323. Cam disk 321 is graduated so that different positions of the gear 323 are assumed for the various positions of the drum. The shaft 324 carrying the pinion 323 is also provided with a second pinion 325 (Fig. 37) in mesh with a rack 326 slidably mounted on the side plate 202. Extending from the same is a pin 327 (Fig. 25) engaging an arcuate slot in a plate 328. The upward teeth of the latter mesh with a pinion 329 attached to an indicator wheel 330 carrying characters corresponding to the compartment selecting keys 60 (Fig. 1). The indicia on the indicator wheel 330 is visible through a slot 331 (Fig. 1) to inform the operator which compartment and totalizer are in position.

Aligning devices for slides

For the purpose of aligning the slides 255 in different positions there is inserted in holes in a bar (Figs. 29 and 42) a series of resiliently urged balls 338 one for each slide and each coacting with a series of wedge-shaped notches 340 formed at the underside edge of the related slide.

Item printing devices for main record strip

It is desirable that a list of printed items be afforded by the machine to list in sequence the value of the items represented upon the records sorted by the operator.

The slides 255 are slidably mounted in a frame comprising a side plate 335 and a side plate 336 (Fig. 29, 29a and 33) both pivoted upon a fixed rod 337. The two plates are secured together by a plurality of cross members such as the bar 338a; guide rods 339 on which the series of racks is slidably mounted at their forward and rearward ends respectively and other members which act as supporting devices for various elements carried by the adding frame so formed.

The item printing wheels 341 (Fig. 29a) of which there are nine, one for each slide, are carried by a rod 342 fixedly held in upward extensions of the side plates 335 and 336 and, of course, moves with the adding frame as it is rocked about the pivot point 337 (Fig. 29).

Attention is directed to the fact that in the normal position of the item wheels (when the slides 255 are home) a blank space 345 of each wheel 341 (see Figs. 33 and 36) is at the printing line. Upon the resetting of an item wheel 235 from a "0" position to its blank position the corresponding slide 255 will rotate the related type wheel a unit movement from its blank position to present a "0" character to the printing line. If a "6" stands upon the item wheel 235, the seven steps of movement necessary to zeroize that wheel (from 6 to blank position) will adjust the related slide 255 the same number of steps and correspondingly the related type wheel will be moved seven steps from a blank position to represent a "6" numeral.

For the denominations in which no item wheels are utilized, for example, in representing 20.04 the remaining five higher order racks will not be adjusted and the related type carriers being normally at blank will not be shifted to cause any character to be printed to the left of "2". The above arrangement provides for a simple means for the proper elimination of zeroes in orders not utilized but their insertion to the right of any significant figure as required.

It will be observed from Fig. 37 that teeth 343 on the upper edge of rack slide 328 which is also slidably mounted on the side plate 335 meshes with a pinion secured to a special character printing wheel 344 in alignment with item wheels 341. This wheel 344 sets up a character representing the compartment key 60 depressed and is printed in conjunction with the amount of the item.

For the purpose of effecting printing when the type wheels are differentially adjusted by the slides 255 there is provided a frame comprising a pair of arms 346 and 347 (Figs. 2 and 36) each pivoted at 348 to a base plate 349. Between the forward extremities of the arms is journalled a roller platen 350. Rocking of the platen at the proper time effects printing from the adjusted type wheels 341.

For the present considering that a stud 351 (Fig. 37) is movable with the arm 346 it will be observed that the stud is received by a bifurcation of an arm 352 pivoted at 353 by an extension at its mid-extremity. The lower end of the arm has a pin and slot connection to a link 354 (Fig. 45) articulated to the upper end of an arm 355 carying a roller engaging the race 356 of the cam disk 308 secured to shaft 146.

The cam 356 is effective to rock the platen 350 downwardly through the connections just described at the porper time to effect the print, restoration of the platen and frame being assisted by the action of a compression spring 357 (Fig. 36). While the rearward end of the adding frame 335, 336 is rocked downwardly after this time (for reasons to be explained hereinafter) the platen roller 355 contacts the type carriers 341 before this operation and sufficiently to effect the desired print.

The record strip upon which printing is effected is drawn from a supply roll 360 (Fig. 36) pivoted upon a stud 361 supported by upward extensions 362 of the base plate 349. The record strip 363 passes around the platen roller 350 and thence upwardly between a pair of feeding rollers 364 and 365 both of which are carried by upward extensions 366 of the pivoted frame 346, 347. The rollers 364 and 365 being resilient seize the record strip frictionally.

Secured to roller 364 is a ratchet wheel 367 the teeth of which are in cooperation with a resiliently urged pawl 368 pivoted by a stud 369 to one end of a lever arm 370 pivoted by a stud 371 secured to the base plate 349. The forward end of the lever arm 370 carries a stud 372 passing through the side plate 346 and received by an inclined slot 373 of a plate 374 slidably mounted at its rearward end by the pivot stud 348.

When the printer frame is rocked downwardly to effect an imprint the arm 352 coacting with stud 351 which is secured to the plate 374 will rock the same and through stud 372 will rock arm 346 and the lever arm 370 about fixed pivot 371. This will elevate pawl 368 so that it will engage the next higher tooth of ratchet 367 and will when the frame is elevated after the printing operation turn the roller 364 to thus space the paper strip 363. Retrograde movement of the platen roller 350 is prevented by a retrograde pawl 370a.

When the items have been all enumerated or listed the printed sheet is simply detached from the rest of the roll.

*Individual record strip printing devices*

Secured to the side plate 36 of the drum is a series of frames, each of which comprises a totalizer 375 and a record strip printing device 376 (Fig. 1). In general each totalizer 375 is related to a particular compartment so that when the totalizer is in position to receive an entry designated upon the check to be fed, that check is fed to the compartment. In the same machine cycle that check feeding is performed the amount represented on the check is printed upon the record strip associated with the totalizer receiving the entry.

Each combination totalizer and record device is mounted upon its own plate 377 (Fig. 38) which is secured by screws 378 to the side plate 36.

Pivotally mounted on a stud 379 which supports a supply roll 380 is the platen supporting plate 381 suitably bent as shown in Fig. 39 so as to support by a rod 382 a platen roller 383. Urged in contact with the roller 383 is a spring urged roller 384. The record strip passes from the supply roller 380 over platen roller 383 and between the latter roller and the roller 384.

The item printing type elements that are adapted to print upon the record strip selected for operation comprises a series of elements 390 (Fig. 29a) identical in character arrangement as the type carries 341, that is each has its blank space normally at the printing line of the record strip at printing position.

The series of item printing type carriers 390 (Fig. 29) are loosely mounted on a rod 391 carried by a yoke shaped frame 392 pivoted on a rod 393 secured in the side plates 335 and 336. By this arrangement the type carriers are shifted to print upon the selected record strip when the frame 335 and 336 is first moved downwardly but at the termination of such printing the yoke shaped frame 392 is elevated independently of and before the frame 335, 336 is restored upwardly for a purpose to be given later.

To differentially adjust the type carriers 390 each slide 255 has slidably mounted thereon by pins 398 a rack 399 having rack teeth 400 in engagement with the totalizer actuating pinions 401 loosely mounted on shaft 393 but constantly in mesh with a related type carrier 390. Extending between and secured to lugs integral with each rack 399 and the related slide 255 is a normally tensioned spring 402 the tendency of which is to shift the rack 399 to the left independently of the slide 255 but in the relatched position of the rack 399 such movement is prevented by the engagement of a hooked extension of a spring urged latch lever 404 normally engaging a notch in the rack 399. When in normal position (as shown in Fig. 29a) the rack 399 and related slide 255 move to the right as a unit under control of the resetting of the related type carrier 235 imparting a like amount of movement to the type carriers 390 through the actuating gears 401.

When the type elements 390 are differentially adjusted by resetting of the item representing elements 235 the adding frame 335, 336 is shifted downwardly to effect the printing on the selected record strip but prior to such movement the platen roller 350 is shifted downwardly to effect printing from the upper series of item printing type elements 341 as previously stated.

To depress the frame 335, 336 the following devices are preferably employed. Pivoted to an arm 405 carrying a roller in engagement with a race of a box cam 406 (Fig. 37) is a plate 407 having a cam slot 408 in engagement with a stud 410 secured to the frame plate 336 and a cam slot 409 in engagement with a stud 411 secured to the stationary frame plate 202.

When the cam plate 407 is shifted to the right (Fig. 37) under action of the cam 406 the adding frame 335, 336 will be depressed to effect printing upon the selected record strip. By a reverse action the frame is immediately restored to its uppermost position.

The means by which the type carriers 390 are shifted upwardly independently of the adding frame will now be described. The shaft 391 supporting the type carriers 390 (Fig. 44) engages a cam slot 394 of a cam plate 395 slidably mounted at one end by the pin 393 carried by the adding frame and which plate 395 is pivoted at 396 to the upper end of an arm 397 carrying a roller engaging the race of a box cam 398 secured to shaft 146.

The cam plate 395 is not shifted until after the frame 335, 336 is depressed so it will be observed that the type carriers partake of the same movement as the frame 335, 336 during the initial downward movement of the latter.

When the adding frame is being elevated cam 398 (Fig. 44) acting upon link 395 will cause cam slot 394 to shift the type carrying frame 392 upwardly a sufficient distance so that when frame 335, 336 is subsequently depressed the type carriers 390 will not again engage the record strip and accomplish a second imprint.

*Inking devices for item type carriers*

The imprint taken from the type carriers 341 is effected by an endless inking ribbon 403 (Fig. 35) which it will be observed also passes beneath the type elements 390. No further details of the inking ribbon device will be given as they are well known in the art.

*Paper feeding devices for individual record strips*

For the purpose of feeding the particular record strip printed upon to space the printed items there is pivoted at 412 to the stationary frame 203 (Figs. 32 and 33) an arm 413 to which is pivoted a spring urged pawl 414. The mid point of the arm 413 has a link connection 415 with the adding frame so that when it is depressed the pawl 414 engages a tooth of a ratchet wheel 417 and turns the platen roller 383 in position a single step. As was just suggested the adding frame is given a second movement of depression and elevation and when again elevated the pawl causes a second step of rotation of the platen roller 383. These two steps of movement in the adding cycle feeds the strip sufficiently to space the printed items on the selected record strip.

*Adding in individual compartment or sub-totalizers*

As previously suggested the machine also includes a plurality of sub-totalizers one for each sorting compartment the selected one of which is adapted to be actuated an amount commensurate with the value represented upon the check deposited in the related compartment. By this means each totalizer effects a summation of the amounts represented on all of the checks deposited in some particular compartment.

The detail construction of the totalizers is shown in Figs. 38, 39 and 40 wherein it will be noted that journalled in a plate 420 which is an extension of the plate 377 and in a plate 421 is a totalizer wheel supporting shaft 422 on which are loosely mounted a series of totalizer elements 424. Plate 420 and the extension 421 are suitably spaced apart by means of a pair of studs 423 to provide a rigid totalizer frame. The series of totalizer elements 424 corresponding to a particular totalizer, when brought to selecting and operating position are in alignment with the series of totalizer actuating gears 401 and are actuated thereby at a certain part in the adding cycle. The totalizer selected for operation is normally disengaged from the series of actuator pinions 401 (Fig. 29a) and an operating engagement is effected when the adding frame is in its lowered position but prior to such engagement it will be remembered that the adding slides 255 are first shifted rearwardly an amount commensurate with the values represented upon the adjusted item wheels.

At this point it should be observed that due to the provisions of a blank space for each of the series of type carriers 341 and 390 it is necessary to give the type carriers one extra step of movement over that imparted to the totalizer elements to be actuated. For example, if a 9 key is depressed the related items representing wheel 235 will be adjusted 10 units imparting to the related adding slide 255 a similar amount of movement thereby turning the type carriers 341 and 390 a corresponding amount or 10 units to bring the 9 type carrier to the printing line or ten steps from the blank space. Since the equivalent amount of movement is necessary to restore the adding slide 255 to normal, it will be observed that if no special provision were made that the corresponding extent of restoring movement (or ten steps) imparted to the totalizer element would add to the totalizer "10" instead of "9" which is the amount that should be entered since it is equivalent in value to the "9" key initially depressed. For this reason, a lost motion connection is effected between each slide 255 and the associated rack 399 (Fig. 29a). During the rearward movement of the slide 255 and the associated rack 399 it will be remembered that they both move as a unitary structure to thereby correctly set the related type carriers 341 and 390. It will also be remembered that when the type carriers are set, printing is effected upon the main and the selected record strip. Subsequent to this operation the type carrier supporting yoke 392 (Fig. 29) is elevated so as to prevent the second printing operation upon a selected strip when the adding frame is subsequently depressed. During the elevation of the yoke frame 392 it will be observed that a rod 425 carried by the side plates of the yoke frame 392 and underlying the series of latch levers 404 will shift the series of levers upwardly removing the hook extensions of the latch levers 404 from the notches in the racks 399.

It will be observed that when this operation is effected that the racks 399 and associated slides 255 are in various positions of adjustment depending upon the setting of the corresponding item wheel 235. For this reason, the underside 426 of each latch lever 404 is of sufficient length to coact with the rod 425 in any position of the rack 399.

When a disengagement is effected between the latch levers 404 and the series of racks 399 the tensioned springs 402 will be effective to shift the series of racks 399 to the left (Fig. 29) one unit independently of the related slide 255. When such operation is completed it will be observed that with respect to the initial starting position of the slide 255 that the rack 399 will be given a movement of restoration one unit less than the related slide 255.

Previous to the restoration of racks 399 the actuating gears 401 are dropped into engagement with the selected totalizer elements 424 so that it will be understood that all of the elements 424 will be actuated an amount commensurate with the value of the key depressed, or for example, in the case of the entry of a "9" the related totalizer element will be actuated nine steps while the associated slide returns to normal by ten steps of movement.

After the lost motion connection has been effected the cam 406 (Fig. 37) is subsequently effective to again lower the adding machine frame to engage the adding gears 401 with the selected totalizer after which operation the series of differentially adjusted slides 255 and racks 399 are restored or shifted to the left to their home positions.

In the preferred construction of the machine each of the slides 255 is provided with a downwardly extending projection 428 (Fig. 29) normally in contact with a bail 429 common to a series of projections 428. One arm 430 of the bail (Fig. 46) is provided with a roller engaging the race 431 of a cam disk 432 so proportioned that when the slides 255 are moved rearwardly to differential positions the bail will be shifted rearwardly the maximum extent of movement that can be imparted to any of the slides 255. When the differential positions of the slides have been determined by the item representing elements 235 the cam race 431 is effective to reverse the movement of the bail 429 so that by its coaction with the depending projections 428 of the series of slides 255 the latter will be positively shifted to the left or restored to their normal positions. During the restoration of the slides 255 the adding gears 401 are effective to turn the totalizer elements 424 the proper amount thereby adding to the selected totalizer the amount indicated on the item representing elements 235.

During the final operation of the machine the cam 406 (Fig. 37) is effective to restore the adding frame 335, 336 to its normal position, during which time the cam 398 (Fig. 44) is effective to shift the cam plate 395 to the left (Fig. 44) and through the shaft 391 shift the type carrier supporting frame 392 downwardly to the normal position shown in Fig. 29a.

*Transfer mechanism for individual or sub-totalizers*

A transfer mechanism common to the series of individual totalizers is provided to carry over a unit from a lower to a higher order wheel.

It will be observed in Fig. 29a that when a slide 255 is shifted forwardly to home position with its related rack 399 the number of steps equivalent to the key depressed that when such movement is effected the forward end of rack 399 will abut against a related transfer stop lever 435.

A series of such stop levers 435 are loosely pivoted on a rod 436 journalled in the side plates 335 and 336 and each lever 435 has a lug 437 urged by a spring 434 to normally engage a shoulder 438 of a transfer pawl 440. The pawl 440 is adapted to be actuated by a transfer pin 441 (see Fig. 38) of a lower order totalizer wheel 424 so that the stop lever 435 is released by unlatching of the lug 437 from the shoulder 438 when the lower order totalizer wheel passes through zero. The transfer lever 435 is positioned to abut the end of the rack 399 of the next higher order so that when such unlatching is effected as an incident to a wheel passing through zero by restoration of its rack 399 the latter will be permitted to move forwardly one extra step thereby turning the next higher order wheel an additional step to turn in a transfer. When a particular lever 435 is unlatched its lug 437 rests upon a shoulder 439 of the related transfer pawl 440.

By provision of the above arrangement transfers by transfers can also be effected since a higher order totalizer wheel may pass through zero under influence of the related rack 399 which is permitted to be given an additional step of movement by the transfer mechanism rendered operative by the lower order wheel.

When any rack 399 is permitted to move an additional step with its slide 255 it is relatched in the position shown in Fig. 29a by a cross rod 443 secured between arms 444 of a bail loosely pivoted on the rod 436.

Pivoted to one of said arms 444 (Fig. 29) is a link 445 (Fig. 29) connected to the upper end of an arm 446 actuated by a cam race 447 of the disk 406 secured to shaft 146. Preferably at the beginning of the next operation of the machine and before slides 255 are moved rearwardly differentially the cam race is effective to shift the rod 443 to restore to normal latched position all the transfer stop levers previously unlatched as well as the racks 399. When the racks 399 are so shifted they are relatched by the levers 404 engaging the notches in the slides.

It is also pointed out that if a rack 399 is not employed in a transferring operation that when its slide 255 is restored to its starting position, the end of the rack carried thereby will abut the latched stop transfer lever 435 and upon continued movement of the slide 255 the spring 402 will merely be tensioned and lever 404 will then engage the recess of the rack 399. During the units movement of slides 255 independent of the racks 399 the slides 255 will turn the associated type carriers 341 and 390 from a position indicating "0" to their blank positions.

*Locking devices for sub-totalizer adding elements*

For the purpose of locking the series of totalizer elements 424 constituting a sub-totalizer there is loosely mounted upon one of the spacing and supporting rods 423 a yoke shaped frame 450 (Figs. 38 and 40) between the side arms of which is journalled an aligning rod 451 normally urged by a coil spring 452 so that the aligning rod engages the interdental spaces of the series of totalizer elements 424.

Referring particularly to Fig. 32, it will be observed that secured between the side plates 335 and 336 is a cross bar 453, which, when the adding frame is depressed, is adapted to engage a projection 454 of one of the arms of the yoke shaped frame 450 thereby rocking the aligning rod 451 to free the totalizer wheels for actuation by the related actuating gears 401. It is only when the adding frame is depressed to effect a driving engagement between the series of gears 401 and the totalizer elements 424 that the aligning rod 451 is rocked to free the wheels for rotation and at other times the aligning rod locks the totalizer wheels to prevent any accidental rotation thereof.

*Aligning devices for the sub-totalizers*

It is also desirable to positively align the drum independently of the drum stopping devices to make more certain that the proper driving relationship is effected between the sub-totalizer elements and the actuating gears 401. To this end the side plate 336 has at its rearward end a semi-circular notch 455 (Fig. 29a) adapted when the adding frame is depressed to engage the termination of one of the shafts 44 and by such engagement rock the drum in either direction about its pivot the proper amount and direction to provide the proper relationship between the totalizer elements and the actuating gears and retain it while the selected totalizer is being actuated.

*Aligning device for adding frame*

Referring particularly to Figs. 32, 33 it will be observed that the rearward end of the side plate 336 is extended at 456 and is received by a notch 457 in a block 458 secured to the stationary frame 202. It will be observed that this construction guides the adding frame in its reciprocation and insures the proper lateral alignment between the series of actuating gears 401 and the selected series of sub-totalizer adding elements 424.

*Grand printing totalizer*

The machine also includes a grand totalizer which gives a summation of the items represented upon the checks segregated by the sorting compartments. When a group of checks are sorted and their represented amounts accumulated by this totalizer the total of such amounts are printed and the totalizer is then zeroized to provide for the adding of the amounts represented by a second group of checks. To differentiate from a supplemental grand totalizer which is not adapted to print since the characters are merely reading characters, the totalizer now to be considered will be designated as the grand printing totalizer and the supplemental grand totalizer to be hereinafter considered will be designated as a grand reading totalizer.

The printing totalizer as will be observed in Figs. 29a and 33 comprises a yoke shaped frame 459 which is pivoted by means of a pivot rod 460 journalled in the adding frame plates 335 and 336. Journalled in the totalizer frame 459 is a shaft 461 carrying a series of printing totalizer wheels 462, the wheels being in the form of pinions and carrying raised characters on the extremities of the pinion teeth from which printing may be performed.

The series of totalizer wheel pinions 462 when moved downwardly by a corresponding movement of the totalizer frame 459 are adapted to mesh with a supplemental series of racks 463 similar to the racks 399 previously mentioned. The spring 464 (corresponding to the previously mentioned spring 402) is tensioned previous to any differential movement of slide 255 and tends to shift the rack 463 to the left but such movement is prevented by engagement of a lug 464a integral with the end of the rack 463 with a stop portion 465 and which is formed as an extremity of a transfer controlling lever 466 (see also Fig. 29b).

With this arrangement, it will be observed that during the initial movement of the slides 255 (which brings the type elements from their blank to their zero positions) the slides will move independently of the series of racks 463 until the guide pins 467 abut the right ends of the slots in each of the racks 463. After a units movement is given to the slide 255 the rack 463 will be carried along with the slide so that it will receive at the final differential adjustment of the slide 255 a movement of one unit less than the slide receives or in other words, the rack 463 is always moved a distance commensurate with the value of the key depressed.

When the various racks 463 have been positioned differentially the totalizer frame 459 is then depressed to mesh the series of totalizer adding wheel pinions with the teeth formed on the upper edge of the racks. Bail 429 (Fig. 29) then positively restores the series of slides 255 together with their racks 463 resulting in entering in the totalizer 459 an amount represented by the item representing wheels 235.

The preferred form of mechanism provided for first depressing the totalizer frame and then positively restoring it when the adding operations are completed comprises a slide 468 (Fig. 41) slidably mounted on the side plate 366 and which has an aperture 469 (Fig. 32) received by the upper end of an arm 470 which carries a roller in engagement with the race 471 of the disk 431 secured to shaft 146. The slide 468 has a cam slot 472 (Fig. 41) receiving the totalizer wheel supporting shaft 461. When the plate 468 is shifted to the right under the action of the cam 471 the cam slot 472 will be effective to rock the totalizer frame about its fixed pivot 460 so that when the racks are subsequently restored the adding operation will be performed.

At the termination of the transfer operation (which will be next discussed in detail) the slide 468 is rocked in a reverse direction or to the left as viewed in Fig. 41 thereby positively elevating the totalizer frame and holding it in such position until the next adding operation is to be performed.

Transfer mechanism for grand printing totalizer

The principle of operation whereby transfers are effected for the series of totalizer elements 462 is quite similar to that employed in connection with the compartment sub-totalizers and there will only be explained certain parts of the mechanism which differ in detail of construction and operation. Secured to each adding wheel with the exception of the wheel of the highest order is a transfer pin 475 effective when the adding wheel passes through zero to shift a transfer arm 476 which has operative connection with the previously mentioned transfer lever 466 so that the transfer arm 476 will be rocked counterclockwise and the transfer lever 466 clockwise thereby raising the stop projection 465 out of the path of the lug 464a of the rack 463 associated with the next higher order adding wheel 462. Such disengagement is held by means of one of a series of spring tines 477 of a spring blade and being resilient by nature so that the extremity of each engages either one of a series of wedge shaped aligning notches 478 formed in the upper edge of a particular transfer arm 476. It will be further observed that when the stop projection 465 is elevated the rack 463 may move forwardly or to the left an additional step with the associated slide 255 to the normal starting position of the latter thereby effecting a transfer in the next higher order adding pinion.

In the case of transfers by transfers certain of the stop projections 465 may at the end of the forward movement of certain racks 463 be positioned to stop the movement of the corresponding rack 463 so that the spring 464 will be tensioned when the slide 255 approaches normal. In the event that a transfer in this order is to take place as controlled by a lower order wheel when such wheel passes through zero the stop projection 465 related to the next higher order wheel will be elevated permitting spring 464 to be effective to move the rack 463 independently of the slide 255 thereby turning in a transfer to the wheel of higher order.

For the purpose of restoring those racks which have been employed in a transferring operation the yoke shaped frame 444 is provided with a supplemental rod 480 (Fig. 29a) adapted when shifted by movement of frame 444 during the initial operation of the next adding cycle (as previously stated) to contact with depending projections 481 of the series of racks 463 shifting said racks rearwardly a step of movement and independent of the racks 255. During this operation the previously elevated projections 465 are depressed to hold the racks in latched position.

The means whereby the projections 465 are shifted downwardly to latching position comprises as shown in Fig. 29a a yoke shaped frame of which a rod 482 extends across the upper ends of the series of projections 465. The frame carrying the rod 482 has a downwardly extending arm 483 having a pin 484 in the path of a projection 485 constituting an upper extension of one of the side arms of the yoke shaped frame 444.

When the frame is rocked rearwardly to restore the racks 463, it will be apparent that the projection 485 contacting with the pin 484 will rock the rod 466 downwardly thereby moving the projections 465 in a similar direction to relatch the restored racks 463. This relatched condition of the racks is established at the initial operation of the next adding cycle and previous to the next differential positioning of the slides 255.

Grand reading totalizer

In addition to the grand totalizer from which printing may be effected there is also provided a grand reading totalizer 490 (Fig. 29) similar in details of construction to the grand printing totalizer just described. The extremities of the adding wheel pinions have characters pressed therein which are visible through an aperture formed in the cover plate and readable through a magnifying glass 491 (Fig. 1). For the purpose of rocking this totalizer into and out of mesh it will be observed that the slide 468 (Fig. 41) is also provided with a second cam slot 494 in engagement with the adding wheel supporting shaft 495 of the grand reading totalizer.

Transfer mechanism for grand reading totalizer

A similar type of transfer mechanism is also provided for the grand printing totalizer 490 but in order to relatch the adding racks 496 for the grand printing totalizer a comb plate 497 of a yoke slidably mounted by studs 492 in the side arms fitting in slots 493 in the side plates 335 and 336 is provided and which has a connection with the rod 480 carried by the yoke frame 444. When racks 496 are shifted for transferring operations the comb plate 497 is adapted to engage the projections 499 of the series of racks 496 to restore them to their normal position.

With the explanations just described the transferring operation of the grand reading totalizer 490 is precisely the same as described in connection with the grand printing totalizer. This totalizer is, however, adapted to be reset less frequently so that while the grand printing totalizer effects the summation of the amounts represented by a group of checks sorted, the grand reading totalizer will give the grand totals of several groups of checks the number depending upon the time the reading totalizer is zeroized.

For restoring the transfer levers 500 (Fig. 32) a bar 501 is provided and which is similar to the bar 482 of the grand printing totalizer. They are restored by the same mechanism arranged and operating as described in connection with the printing totalizer, the restoring bar 501 having a link connection 502 (Fig. 32) to lever 483 for a simultaneous operation.

Locking devices for adding elements comprising the grand printing and grand reading totalizers For the purpose of locking the totalizer elements at normal position and unlocking them when they are brought into operative engagement with their respective operating racks a locking device is provided for each of the grand totalizers but inasmuch as the construction of operation thereof is precisely the same for both only the mechanism associated with the grand reading totalizer will be described.

Journalled in the rearward extremities of the side arms of the totalizer 490 (Fig. 43) is a shaft 515 on which is journalled and secured to the shaft a bent flange or locking strip 516 the lower portion of which is curved to fit within the interdental spaces of the totalizer elements 462.

Secured to the shaft 515 is an arm 517 to which is connected a spring 518 for providing the locking engagement between the locking strip 516 and the series of totalizer elements.

Secured to one end of the shaft 515 is an arm 519 which is in the path of an edge 520 of the slide 468 which it will be remembered effects engagement of the totalizer pinions with their operating racks. When the totalizer frame is depressed to effect such an engagement by shifting of the slide 468 by an additional movement it will be understood that the edge 520 coacting with the arm 519 will rock shaft 515 disengaging the locking strip 516 from the pinion teeth of the totalizer elements after they are in mesh with their respective racks.

When the slide 468 is restored it will be observed that the spring 518 will again be effective to shift the strip 516 for locking engagement with the totalizer pinions.

Error key mechanism

In the event that any of the keys are depressed in error it is desirable that the item representing elements be restored to normal without transmitting the value incorrectly represented on them to the totalizers.

It will be remembered that it was previously stated that the rod 339 was the supporting means for the actuating slides at their forward ends as will be best seen in Figs. 29 and 42. This rod is carried by a pair of arms 500 and 501 fixed to a cross rod 502 supported in the side frames 203 and 202. The error key lever 503 is pivoted upon a stud shaft 504 and the handle portion thereof projects through a slot in the cover plate of the machine so as to be operable exteriorly by the operator of the machine (see Fig. 1).

Articulated to the mid-portion of the error key lever is a plate 505 (Fig. 42) having an elongated slot 506 receiving pin 507 secured to the side frame 336 of the adding frame. The plate 505 is also provided with a cam slot 508 receiving a reduced end of the slide supporting rod 339. When the parts are as shown in Fig. 29, it will be observed that the teeth formed at the upper forward ends of the slides 255 are in upward position to mesh with the pinion teeth of the item representing elements 235 when the latter are shifted laterally during item representing operations. If at the termination of such operations the operator observes that the amount represented is incorrect it is only necessary to shift the lever 503 rearwardly. During such operation, it will be seen that the action of the cam slot 508 upon the supporting shaft 339 is such that the shaft will be depressed thereby effecting a disengagement between the teeth of the slides 255 and the pinion teeth of the laterally shifted item representing wheels 235.

During the subsequent machine operation it will be observed that the restoring shaft 234 will be rocked to pick up and restore the previously set elements 235 but during such operation, it will be noted that no movement will be transmitted to the slides 255 and that they will merely remain in their normal position of adjustment. By the provision of such means, it will be observed that the adding machine goes through an idle cycle of operation and the only effective work that is accomplished is the feeding of the record strip associated with the printing mechanism selected for operation and the record strip receiving the items printed.

Since the respective groups of item printing wheels are in such position that blank portions are presented to the printing line no imprint will be effected with the exception, of course, printing from the special printing character elements representing the compartment and totalizer previously selected. The spacing mechanism will be operated giving an indication to the operator of the machine that if item keys 205 were operated that the error key device was employed.

For the purpose of defining the normal or zero position of the adding wheel elements when they are restored during the type of operation just described there is secured to the item wheel carriage 233 a plate 509 (Fig. 29) having a plurality of stop portions 510 against which pins 511 secured to the side faces of the elements 235 abut at their zero positions.

For the purpose of setting the adding and printing mechanism in operation by shifting of the error key when employed, the error key lever 503 has a curved extension 512 (Fig. 29) in the plane of the arm 276 and adapted to depress this arm and motor bar 267 when the lever is shifted rearwardly.

While the lever may be held in shifted position at the end of the adding cycle no second operation thereof will ensue for the reasons explained in connection with the operation of the motor bar described in the section designated—"Motor bar control".

*Printing totals from grand printing totalizer*

When a series of items comprising the amounts represented upon a group of checks have been listed it is desirable that the totals of such items be printed in conjunction with the listed items. To this end the platen roller 350 which effects the printing of items upon the record strip is shiftable under control of the operator to effect printing from the grand printing totalizer.

As best shown in Fig. 36, it will be noted that the base frame 349 is provided with grooves 521 (see Fig. 34 also) received by tongues in guide bars 522 secured to the cover plate of the machine. By provision of such an arrangement, it will be observed that the printer frame is slidably mounted so as to be capable of being shifted from a position in which items are printed directly to a position in which the platen roller 350 is directly over the total elements of the grand printing totalizer as shown by dotted lines in Fig. 29a. To effect such movement of the printer frame a link 523 (Fig. 37) connected to plate 374 is pivoted to the upper end of a lever 524 having a ball 525 at its upper end which may be grasped by the operator and brought forward to shift the printer frame. In view of the fact that the amount of pull required to tension spring 527 connected to plate 374 is greater than the amount required to shift the printer frame forwardly, it will be observed that when the link 523 is pulled forwardly by operation of lever 524 the printer frame will also be shifted in the same direction. When the printer frame is so positioned that the platen 350 is directly over the total printing elements the portion of the printer frame abuts a stationary stop 526 (Fig. 34) to thereby stop the forward movement of the frame. When so stopped an over or additional movement of link 523 under action of the manual operated lever 524 will draw plate 374 forwardly so that by the action of the inclined cam slot 373 upon pin 372 the pivoted printer frame will be depressed to effect a total print upon the record strip 363.

During such operation, it will be observed that the pawl 368 will be operated in precisely the same manner as when item printing operations are performed thereby subsequently spacing the printed total from the last printed item.

For the purpose of effecting an imprint from the grand printing totalizer elements 462 there is stretched above these type elements a strip of inking ribbon 530 (Fig. 34) preferably of a contrasting color with respect to the inking strip 403 associated with the two groups of item printing elements. By the provision of such means, it will be apparent that the totals will be printed in a different color than the items clearly designating by color the nature of such printed amounts.

*Printing from individual totalizers*

Upon the completion of sorting operations performed in connection with a group of checks, it is desirable that the totals accumulated upon the individual sub-totalizers be printed upon the record strip containing the items making up such totals. To this end an operating device is provided which is common to the individual totalizers, the operation of which is capable of performing a printing operation from the selected totalizer and subsequently zeroizing the same.

The various functions incidental to printing and resetting totalizers are performed under control of a manually operated crank handle 535 (Fig. 1) which is rigidly secured to a shaft 536 (Figs. 49 and 50). The operating parts of this printing unit are carried by a frame comprising spaced side plates 537 and 538 suitably spaced apart and held by a series of spacing sleeves 539 and attaching bolts 540. The assembled frame is secured to the frame 202 by fastening means 541.

The operating shaft 536 is journaled in the plates 537 and 538 and is given a complete rotation to perform the various functions now to be described. For the purpose of preliminarily inking the series of total printing elements 424, there is provided an inking roller 542 preferably of felt or other ink absorbent material. The roller 542 is journalled between a pair of depending arms 543 pivotally mounted by studs 544 on a pair of arms 545 and 546. The arms 543 have upwardly extending projections between which and the arms 545 and 546 are inserted compression springs 546a. By provision of this arrangement, it will observed that when the inking roller 542 is depressed it will pass over the printing elements which are at the printing line and being resiliently urged will roll over and ink the characters. The arm 545 is provided with a roller 546b engaging the race 547 of a box cam 548 secured to shaft 536. The cam race is so arranged that it will initially depress the ink roller to roll over the total printing elements and hold the same below the printing line until the printing and other operations have been performed at which time the cam will elevate the inking roller to its normal position.

For the purpose of rigidly holding the totalizer from which a total printing operation is to be effected by holding the drum upon which the series of individual totalizers are mounted, the arm 546 has secured thereto a block 549 provided with a recess 549a adapted when the inking roller supporting frame is depressed to engage one of the extensions of shaft 44 thereby holding the drum in aligned position in the same manner as previously explained in connection with item printing operations.

It will be remembered that it was previously stated that the roller platen 383 is pivotally mounted upon the frame 377 by the stud 379. This platen during total printing operations is adapted to be rocked about this stud as a pivot so as to force the record strip 376 against the printing characters at the printing line to effect the imprint. To rock the platen roller 383 there is provided a pair of levers arms 550 and 551 (Fig. 50) secured to a shaft 552. Hingedly mounted at 553 by arms 554 is a transverse plate 555 having a limited movement independent of arms 550, 551 by a clearance 556. One of the arms 554 strikes an extension 557 (Fig. 38) to thereby rock the platen against the total elements at the printing line. This operation is performed under the action of a cam race 558 in engagement with a roller 559 secured to the lever arm 551 the cam race being a groove in a cam 560a rigidly secured to the operating shaft 536. During such operation a profile cam 560b acting on a roller 561 of arm 562 elevates and then releases a hammer 563 and under action of a spring 564 strikes plate 555 to forcibly impress the platen against the printing elements.

It should be noted at this point that in connection with item and total printing operations that when a key 60 is depressed for selecting a particular record strip for item printing operations that the related totalizer is not the same totalizers from which a total printing operation can be performed. It will be observed in Fig. 32 that the platen roller in position for an item printing position is spaced apart by two sub-totalizer printing units from the platen roller in position for a total printing operation. For this reason, to select a particular record strip for a total printing operation the operator must not depress the same key utilized for item printing operations.

In order to inform the operator which keys to use the key caps may carry large indicia to designate which key should be depressed for normal item printing operations and smaller indicating marks or indicia to designate which key should be used for total printing operations. Verification as to which totalizer is in total printing position may be ascertained by reading the characters visible on the special indicator wheel 330.

Resetting of individual totalizers

Operation of the crank handle 535 (Fig. 1) is adapted not only to perform a total printing operation but also a resetting operation and is performed automatically and subsequent to total printing operations.

To this end the arm 550 has a segment portion 565 the teeth of which are adapted when the segment is moved downwardly to mesh with a pinion 566 (Fig. 39) secured to the shaft 422 upon which the totalizer elements 424 are mounted. The sub-totalizer elements 424 carry the usual resetting pawls 567 (Fig. 40) adapted to be engaged by a groove 568 in the periphery of shaft 422. When the resetting shaft 422 is rocked one way by lowering of the resetting segment 565 the shaft 422 will be merely rocked idly without engaging any of the resetting pawls 567 but when the shaft is reversely rocked after a total printing operation by the elevation of the resetting segment 565 the radial wall of the groove in the shaft will pick up the variously set pawls thereby turning the series of total printing elements 424 to normal or zero position.

To prevent the total printing elements from being rotated past their zero positions in resetting operations there is provided a bail member having a series of depending projections 569 which when in depressed position are adapted to act as stops for the series of transfer pins 441 (Fig. 38) carried by the series of total printing elements 424. The depending projections 569 are integral with a plate fastened to a yoke shaped frame having two side arms 569a one arm of which is provided with a roller engaging the race 569b also formed in one face of the cam 560a and active to shift the bail after a total printing operation.

Preliminarily to resetting operations but after the total printing operation it is necessary, of course, to shift the aligning bail 451 (Fig. 40) out of engagement with the interdental spaces of the total printing elements 424. To this end one of the arms 569a is provided with a lug 569c (Fig. 49) adapted to contact with the extension 454 of the locking bail frame to free the total printing elements for rotation in a resetting operation and after such operation permitting the coil spring 452 to shift the bail into the normal locking engagement with the total wheels.

Resetting grand printing totalizer

It is desirable that after a total has been printed from the grand printing totalizer 459 that the totalizer elements be zeroized. While this may be performed by a supplemental manual operation in the preferred form of the machine it is performed automatically and subsequent to total printing operations and is under the control of the same lever 524 (Fig. 37) which performs the total printing operation.

To this end there is slidably mounted by means of a pair of studs 570 and 571 (Fig. 47) secured to the side of the totalizer frame 459 a plate 572 to which is secured a rack 573. The teeth of the rack are in continuous mesh with a pinion 574 secured to the shaft 461 which it will be remembered is the totalizer wheel supporting shaft. Fitting within a recess 575 of the plate 572 is a depending arm 576 which is part of a clamp adjustably mounted upon but fixed at some position on the link 523. By this arrangement reciprocation of the link 523 by the total lever will effect corresponding movements of the rack plate 573 to rock the shaft 461. By movement of the total lever 524 (Fig. 37) to total printing position the shaft will be rocked in one direction without affecting the position of the differentially positioned totalizer elements 462, the printing operation being performed, as premised hereinbefore, at the extreme forward movement of the printing lever 524. When the lever is restored the rack 573 will rotate shaft 461 reversely and through the usual form of groove in shaft 467 will pick up the variously positioned pawls 577 (Fig. 29a) mounted on the series of totalizer elements, and thereby, bring them to their normal positions.

Disabling of totalizer locking devices for grand printing totalizer during resetting operations As has been previously mentioned the grand printing totalizer elements are normally locked by means of a locking strip 560 (Fig. 47) and it is necessary that this locking strip be shifted to unlocking position during zeroizing of the totalizer elements. It is preferable, however, that the elements be locked until the total is printed from the total elements and thereafter the strip shifted to unlocking position to permit free rotation of the elements. Mechanism for automatically performing this operation will now be described in detail.

The locking bail 560 for the total printing elements is normally in position to keep them locked during total printing operations and this position of the locking strip is maintained by means of a spring 567 (Fig. 51) connected to an arm secured to the shaft 568 to which the locking strip 560 is secured. Pivotally mounted at 569 to the slide 572 (see Fig. 47) is a spring urged arm 578. When the rack plate 572 is at its extreme leftward position in position for performing a total printing operation the right end of the arm 578 will be urged by a spring 579 so as to be positioned in front of an arm 586 secured to the shaft 568 (as shown in Fig. 51). At the commencement of the restoration of plate 572 the extremity of the arm 578 will through arm 586 rock shaft 568 and therefore the locking strip out of engagement with the total printing wheels after which resetting of these wheels will be effected. Maintaining of the locking strip out of locking engagement with respect to the totalizer printing elements is effected by a spring urged latch member 587 (Fig. 47) adapted when the shaft 568 is rocked in the manner just described to pass in front of a straight edge 588 of a disk 589 secured to the rock shaft 568. However, when the printer frame is restored to its normal position a pin 589a secured to the base plate of the printer will contact a hooked portion 589b of the latch lever 587 freeing the shaft 568 for rotation under action of the spring 567 thereby shifting the locking strip to again lock the totalizer elements.

Resetting grand reading totalizer

At the completion the operation of the machine for the period of a day, or any other arbitrary period, it is desirable that the grand reading totalizer 490 be zeroized.

For this purpose the series of totalizer elements of the grand reading elements 580 (Fig. 29) are loosely mounted upon the shaft 495 which has secured at its extremity a knurled knob 582 (Fig. 33) by means of which the shaft 495 may be turned to effect the restoring operations. The preferred form of mechanism for effecting this comprises the usual restoring pawls (Fig. 29) fixed to the series of totalizer elements 580 and cooperating with a groove in the shaft 495. As this particular form of mechanism is well known in the art and shown and described in many patents no further details of construction will be described herein.

Unlocking of grand reading totalizer elements during restoring operations

To shift the locking strip 516 for the grand reading totalizer (Fig. 43) to unlocking position the shaft 495 is provided with a disk 583 having a wedged shaped notch 584 received by a similar shaped extremity of the arm 517 secured to the end of shaft 515. An initial operation of the shaft 495 will through the disk 583 rock shaft 515 withdrawing the locking strip 516 out of cooperation with the interdental spaces of the totalizer pinions and retaining the strip in such position during resetting operations. Upon the completion of the resetting operation the disk 583 being at normal position will permit spring 518 to shift the locking strip 516 again into locking engagement with the totalizer elements which are now at their zero positions.

Interlocks

For the proper performance of the machine it is desirable that interlocks between the various independently manually operable parts and locks for certain parts of the machine controlled by the drive shaft be provided so that disarrangement of the machine will be prevented in the event that two or more of such parts are operated together, either accidently or intentionally. These will now be described.

Interlock between adding keys and error key lever

Movable with the error key lever 503 (Fig. 29) is a rearwardly extending arm 590 having its extreme edge 591 concentric with respect to its pivotal point 504. As previously mentioned the shaft 215 (see Fig. 24) is rocked during the reciprocation of any of the adding keys 205 by their operation on a bail 214 which causes reciprocation of an arm 593 (Fig. 29) fixed to shaft 215. The arm 593 has an edge 595 adapted to pass beneath the edge 596 of arm 590 to lock the error lever when any of the adding keys are being operated. This prevents shifting of the error lever while the adding keys are being operated to set up an amount.

Shifting of the error lever causes its edge 591 to pass in front of the concentric edge 594 of arm 593 to lock the shaft 215 and therefore the adding keys while the error lever is away from its normal position.

Lock for motor bar controlled by drum stopping arm

Another interlock, in the preferred form of the machine, is provided between the arm which stops the drum in its rotation and the motor bar which controls the adding and check feeding operations. The provision of this interlock prevents operation of the motor bar to perform the adding and the check feeding operations unless the drum is in such position that a totalizer is in position to be actuated and a compartment is in registration with the check feeding rollers to receive a check fed thereby.

Secured to the extremity of the arm 113 is a link 600 (Fig. 4) which is connected to the horizontal arm 601 of a bell crank, the other arm 602 thereof being connected thereto by a plate 603 (Fig. 29) its extremity having a notch 604 received by the shaft 215. The plate 603 is provided with a bayonet slot having horizontal and vertical portions 605 and 606, respectively. Loosely mounted upon the shaft 215 is a bail 607, one side of which has fastened thereto an arm 608 carrying a roller 609 at its extremity and which, in the lower or unlocking position of arm 113, is in registration with the horizontal slot 605 in plate 603. The other end of the bail has fastened thereto the arm 276 previously referred to. In the normal position of the parts shown in Figs. 4 and 29 in which the lock arm 113 is in its lowermost position (at which time the drum may be at any position depending upon how it is unbalanced) it will be observed that the engagement of the roller 609 with the horizontal slot 605 will effectively prevent a depression of the motor bar and its being locked against depression will inform the operator that it is necessary to depress a compartment selecting key to bring the drum to a selected position. When this is performed the arm 113 will be in its upward position resulting in shifting the plate 603 forwardly so that the roller 609 is now in registration with the vertical slot 606. The motor bar 267 is now unlocked for depression to control the various operations previously mentioned.

Lock for total print and reset handle controlled by drive shaft

It is desirable that when the main driving shaft is set into operation by depression of the motor bar that the total printing and resetting devices for the individual totalizers be locked against operation. In order to carry out this object there is secured to the drive shaft 146 (Fig. 10) a gear 611 in continuous engagement with a pinion 612 rotatably mounted on a stub shaft 613. Secured to the pinion 612 is a disk 614 (Fig. 48) having a wedge shaped notch 615 receiving a similar shaped extremity of a depending vertical arm of a bell crank 616. The upper arm of the bell crank is connected at 617 to a link 618 connected to the vertical arm 619 of a bell crank, the horizontal arm 620 of which when elevated is adapted to pass in front of the flattened side of a stud 621 carried by a disk 622 secured to the aforementioned shaft 536 which is turned by the handle 535 (Fig. 1).

It will be obvious from what has been said that when the shaft 146 is rotated the notch 615 in the disk 614 will rock the bell crank 616 counterclockwise shifting the link 618 to the left resulting in moving the arm 620 in front of stud 621 holding it in this position until the final operation of the machine. While the arm is retained in shifted position, operation of the total printing and resetting handle will be effectively prevented.

It is pointed out that the ratio of the gear 611 and the pinion 612 is such that a single rotation of the gear 611 by drive shaft 146 will effect two revolutions of the gear 612 and disk 614. There will be, of course, a short time at the termination of the first revolution of disk 614 when the arm 616 will be shifted by means of a connected spring 623 to engage notch 616 to unlock the shaft 536. The period in which this unlocking action takes place is a relatively small one so that the operator has but little time to start manual operation of handle 535 if attempted during operation of the drive shaft 146.

*Lock for compartment selecting keys controlled by total print and reset handle*

The disk 622 (Fig. 48) is also provided with a wedge shaped notch 629 receiving a similar shaped extremity of the rearwardly extending arm 630 of a bell crank, the vertical arm 631 of which is connected by a link 632 to an arm 633 secured to a shaft 634. The rock shaft 634 has a depending arm 635 having an abutment extension 636 in the plane of the previously mentioned arm 171. It will be remembered that the function of this arm when rocked is to shift the detent plate 72 to release the previously depressed keys. A depression of one of the compartment keys 60 will shift the detent plate and correspondingly the arm 171.

By provision of this arrangement turning of the handle will through the wedge shaped notch 629 cause the bell crank 630, 631 to be turned in a counterclockwise direction and by shifting of the link 632 to the left (Fig. 48) the abutment 636 will be placed directly against the arm 171. Since the arm will be retained in such position during the total printing and resetting operation, it will not be possible to depress any of the compartment selecting keys 60 until the handle 535 is again at its normal position.

*Lock for unoperated compartment selecting keys controlled by the main drive shaft*

Secured to the shaft 146 (Fig. 10) is the disk 173 previously mentioned having a wedge shaped notch 641 normally engaged by a similar shaped extremity of an arm 642 movable with the arm 171. It will be remembered that the upward extremity of arm 171 is so positioned in the slot 170 that a free movement of the detent plate 72 may be effected. When, however, shaft 146 is set into operation the wedge shaped extremity 641 will shift the arm 642 upwardly and the arm 171 to the right as viewed in Fig. 10 bringing one edge thereof against the wall of the slot 170 thereby locking the detent plate 72 to prevent depression of any of the unoperated keys 60 as well as to prevent release of any previously depressed key by a partial depression of another key.

*Modification of error key mechanism*

As has been stated hereinbefore restoration of the differentially set item wheels without entry to the totalizers was performed by preliminarily lowering the adding rack slides and holding them in their lowered position during the time that other parts of the machine are set into operation to zeroize the item wheels. This principle of operation required the shifting of the rod 339 (Fig. 29) which functions as the guide for the forward ends of the adding slides 255. Another construction by which errors made in setting up the wheels 235 may be taken care of is as follows: In this arrangement the shaft 339 supporting the forward ends of the rack slides is fixed in the side frames. The other changes required in the machine are shown in detail in Fig. 52 wherein it will be observed that movable with the error key lever 503 is an arm 645 having pivotally mounted at its extremity by pivot pin 646 a by-pass pawl 647 the rearward extremity of which is adapted to coact with a shoulder 648 of an arm 649 which is integral with the escapement lever. Between the forward ends of the pawl 647 and a lug 650 integral with the arm 645 is a compression spring 651. At this point it should be explained that previous to shifting of the error key lever 503 a series of item wheels 235 have already been differentially adjusted and in the plane of their respective adding slides 255. If, however, the error key lever 503 is now shifted rearwardly the rocking of the escapement lever by pawl 647 striking the shoulder 648 will cause the hooked end 246 to be moved out of engagement with one of the teeth of the escapement wheel 245 which will then rotate slightly, as previously described, until one of the teeth engages the top of the hook portion 253 of the escapement lever. This permits a step of rotation of the item wheel carriage to bring the series of item wheels 235 out of mesh with their respective rack slides and between each of them.

The arm 645 has integral therewith a lever arm 652 which has a link connection 653 to an irregular shaped member 654 pivotally mounted on a stud 655. The link 653 is connected to the member 654 by means of a pin 656 attached to member 654 fitting within an elongated slot 657 in the extreme end of link 653. Under action of a spring 658 connected to an upward extremity of a member 654 it will be observed that when the link 653 is shifted rearwardly by a corresponding movement of the error key lever 503 that a hook 659 will catch over a pin 660 secured to the escapement lever thereby holding the latter in its shifted position which was caused by the depression of an arm 648. After the initial step of rotation of the escapement pawl 245 has been effected the arm 512 which is integral with the error key lever 503 will contact the arm 276 (Fig. 29) associated with the motor bar 267 resulting, as previously described, the commencement of the adding operation. During such operation the item wheels 235 will be returned to their normal position and the item wheel carriage shifted to the right. During the restoration of the item wheel carriage it will be remembered that during this operation the ratchet wheel 245 is turned in a counterclockwise direction. For the purpose of releasing the escapement lever so as to permit rotation of the escapement wheel in this direction the member 654 is provided with a pin 661 which, when the member 654 is in position to latch the escapement lever, is in the path of one of the teeth of the escapement wheel and by its engagement with the inclined wall of one of the teeth the wheel will cam the plate 654 in a clockwise direction against the tension of the spring 658. Since at this time the pin 656 still occupies the rearward end of the slot 657 it will be observed that the elongated slot 657 permits a free and uninterrupted rotation of the ratchet wheel 245 in a counterclockwise direction.

Since the error key 503 is still in its shifted position it will be observed that the extremity of the pawl 647 is considerably below the forward extremity of arm 649. By means of the by-pass pawl 647 the error key lever may be restored to its normal position without affecting the position of the arm 649.

General summary of operation

It is thought that the operation of the machine is apparent from the preceding description but in order to better understand the coordination of the parts structurally and functionally as well as the preferred application of the machine a recapitulation will now be given.

It will be assumed that the operator has shifted the switch 85 (Fig. 1) to set the prime mover into operation and has a group of checks with various classifications and representing items of different amounts to be sorted according to their classification numbers. It will be further assumed that the first check of the group bears a classification number "22" and the value of the item represented is $76.50.

It will be remembered that at the termination of the adding and printing operations the keys 60 (Fig. 1) are released permitting the drum to turn in a direction depending upon its unbalanced condition. To select the proper compartment, totalizer, and record strip it is necessary to depress the key 60 bearing the classification number "22". When such key is depressed the related contacts 79 (Fig. 10) are closed resulting, as shown in Fig. 14, in the energization of the relay 89 and by the closing of contacts 91 clutch magnet 92 will be energized.

Referring to Fig. 9 this will result in a driving engagement of companion clutch elements 15 and 16 driving wheel 52 and by means of the belt 53 (Fig. 4) turning the sorting drum about its axis. During such rotation it will be apparent from Fig. 13 that the brush 105 will serially contact the concentrically arranged contacts 96 until it strikes the particular one which is rendered effective by the closure of the contacts 80 associated with the depressed compartment selecting key 60. When such engagement is effected, relay magnet 103 will be energized resulting in opening contacts 91 and the deenergization of clutch magnet 92 with a subsequent separation of the companion clutch elements thereby stopping the drive of the sorting drum by the prime mover. At this time the magnet 109 will also be energized causing the drum stopping arm 113 (Fig. 4) to be elevated, bringing the stop portion 122 in front of the end of one of the shafts 44. When an engagement is effected between these elements the momentum of the drum will tend to shift the arm 113 against the resiliency of the spring 116. When the drum is stopped in its rotation the spring will be effective to restore arm 113, turning the drum oppositely until the projection 117 of the arm strikes the stationary projection 118 holding the drum in aligned position in which position it cannot move in either direction by reason of the engagement of the stud 44 between the upstanding projection 122 and the retrograde pawl 124.

During such differential rotation of the drum it will be apparent that cam 321 (Fig. 4) will, through the train of connections previously described, differentially set the indicating wheel 330 (Fig. 21) and the character printing wheel 344 so that by means of the former the operator may know whether the proper compartment is in position for receiving a check.

When the compartment selecting key 60 (Fig. 10) is depressed it will be observed that by shifting of the detent plate 72 the key is held in locked position and further the shifting of the related slide 175 caused a units movement of the related count wheel 180.

Referring to Fig. 29, when the drum stopping arm is elevated the plate 603 will be shifted to the left causing the pin 609 to register with the horizontal slot 606 thereby unlocking the motor bar 267 for operation but prior to such operation it is necessary to depress the adding keys to determine the amount to be entered upon the totalizers and printed upon the record strips.

By provision of the ten key controlling mechanism it is only necessary for the operator to depress the proper keys seriatim setting up the item wheels correspondingly so that by visual inspection thereof the operator may know whether the proper amount has been set up prior to the accumulating and printing functions.

Since the value to be entered is $76.50, the operator first depresses the adding key 205 bearing the numeral "7" (Fig. 21). Upon depression of this key, bail 214 (Fig. 20) will be depressed resulting in shifting the lock member 213 away from the stop finger 212 (Fig. 22) to unlock the shaft 200. The friction drive 224, 225 (Fig. 25) is now effective to turn the shaft 200 until the stop finger 204 related to the "7" key coacts the stop shoulder 210 of the related arm 209 stopping the rotation of the shaft 200 and measuring the differential rotation of the master wheel 222 (Fig. 25) which turns the first item wheel 235 a movement of eight steps or a unit greater than the value of the key depressed.

When the key is elevated rod 249a (Fig. 24) will be moved upwardly shifting the escapement lever so that an initial movement of a half step of the item wheel carriage 233 may be effected, bringing the item wheel just set up out of engagement with the master wheel. When such disengagement is effected it will be apparent that the separation between the stop shoulder 210 and the "7" stop finger 204 will now permit the shaft 200 to be released for further turning movement in the same direction as the differential setting movement bringing the shaft 200 and the fingers carried thereby to their normal positions. At the termination of such rotation the arm 254 (Fig. 24) striking the pin 254a will shift the escapement lever permitting the remaining half step of movement of the item wheel carriage to be performed bringing the item wheel just set, into engagement with the first slide 255 and bringing the second wheel of the item wheel carriage into engagement with the master wheel 222. The wheel differentially set now passes into engagement with the locking bar 305 (Fig. 31) and the wheel next to be set out of engagement with the stationary locking bar 304 (Fig. 21) and in engagement with the master wheel.

To successively set up on the item wheels the amounts the keys "6", "5" and "0" are depressed in their corresponding order and by precisely the same operation just described the wheels 235 will be adjusted to indicate the keys depressed. At the termination of the setting up operation the reading of the wheels is ascertained by visual inspection through the window 256 and magnifying glass 257 (Fig. 1) and if correct, the operator depresses the motor bar 267 to effect the adding, printing, sorting and endorsing operations.

In the event that the operator finds that the reading of the set up wheels 235 corresponds to the amount to be entered the motor bar 267 is depressed. By the depression of the motor bar the constantly rotating shaft 132 (Fig. 20) is clutched for a driving operation of the cam shaft 146. Upon an initial operation of the shaft 146 the frame 158 (Fig. 7) is depressed so that the constantly rotating pinion 51 will drive in opposite directions the feeding rollers 47 and 48 associated with the compartment in selected position. During initial operation of the shaft 146 the feeding roller 130 with its companion feeding roller 131 feeds downwardly the check previously inserted therebetween. The check is thereby conveyed to the feeding rollers 47 and 48 and transmitted to the proper sorting compartment.

Upon initial operation of the shaft 146 the cam race 447 is effective to restore those racks 496, 463 and 399 (Figs. 29 and 29a) which were utilized in accomplishing transfers in the previous entering operation. The cam 308 (Fig. 31) will be effective to unlock the item wheels by shifting the lock bar 305 and cam race 265 (Fig. 23) will then turn the reset shaft 234 (Fig. 23) associated with the item wheels thereby picking up the wheels in their various positions of adjustment (Fig. 28) and since they are directly in driving engagement with the slides 255 (Fig. 29) the latter will be shifted rearwardly and to an amount commensurate with that indicated on the related setting up wheel. The slides, of course, are previously unlocked by shifting of the bars 312 (Fig. 29) by the item wheel carriage. When the slides are differentially set the item wheel carriage 233 (Fig. 21) is shifted to the right to its normal position as shown in Fig. 21.

During the initial movement of the slides 255 with respect to the racks 496 and 463 (Figs. 29, 29a) the racks will lose one step of movement with respect to the slides.

The same number of steps of movement imparted to the slides 255 will be transmitted to the set of item type carriers 341 (Fig. 29a) and, similarly, the racks 399 will, through the intermediate gears 401, turn the printing wheels 390 correspondingly, thereby setting up on both sets of type carriers an amount commensurate with the keys depressed. When the type carriers 341 have been set to represent an amount the platen 350 (Fig. 29a) is depressed to effect printing upon the record strip 363 (Fig. 29a) common to the series of compartments.

Subsequent to such action the adding frame is shifted downwardly about its pivotal point 337 (Fig. 29) so that while the type carriers 390 are in differentially adjusted positions they may be impressed against the record strip selected by positioning of the drum (see Fig. 32).

Thereafter the item type carriers 390 are shifted upwardly out of engagement with the selected record strip effected by a rocking movement of the type carrier supporting bail 392 (Fig. 29a) and which action is caused by the cam 398 (Fig. 44) and is performed independently of the means that effects restoration of the adding frame. During the rocking movement of the frame 392 the rod 425 elevates the latches 404 so that the series of racks 399 move to the left independently of the slides 255. Shortly after such operation the adding frame is again depressed so that the gears 401 are enmeshed with the pinions 424 (Fig. 40) of the selected one of the series of totalizers carried by the drum but the type carries 390 being higher than normal are unable to strike the record strip to accomplish a second imprint.

At this time the totalizer engaging slide 468 (Fig. 41) is effective to rock both the grand printing and grand reading totalizers into mesh with their related racks. Bail 429 is now shifted to the left (Fig. 29) by action of its related cam race 431 (Fig. 46) positively restoring the slides 255 and connected racks to normal position, during which action the selected totalizer and grand totalizers are operated an amount corresponding to the value of the keys depressed.

It should also be stated that previous to the entering operation the grand printing and grand reading totalizer elements are unlocked for operation by shifting of their related locking bails 516 (Fig. 29a) and 560 (Fig. 29) which is effected by the engagement of the edges 520 (Fig. 41) of the totalizer engaging slide 468. The totalizer elements of the selected totalizer are released for operation by the coaction of the bar 453 (Fig. 32) with the extension 454 to withdraw the locking bar 451 (Fig. 40) from cooperation with the pinions 424.

In the event that a transfer is to take place in either of the grand totalizers, the corresponding transfer levers 500 and 466 (Figs. 29, 29a) will be shifted upwardly to such a position that the rack of the next higher order may move with the slide the same distance to its normal position effecting a transfer to the next higher order wheel. In the event that a transfer is to take place in one of the wheels of the selected totalizer the stop abutment 435 (Fig. 29a) is shifted so that it will permit an extra step of movement of a particular rack 399 with the related slide 255 during the restoring movement.

The paper feeding operation for the selected record strip (Fig. 32) is accomplished by the double reciprocation of the paper feeding pawl 414 during the successive reciprocations of the adding frame. Paper feeding in connection with the record strip printing mechanism shown in Fig. 36 is effected by reciprocation of the pawl 368 thereby spacing the items printed upon the record strip 363.

At the termination of the adding operation the compartment selecting keys 60 are released by the shifting of the detent plate 72 (Fig. 10) and since the contacts 79 and 80 (Fig. 14) are now opened the relay 89 will be deenergized, contacts 91a opened, and contacts 111 closed to deenergize the magnet 109 which controls the position of the stop arm.

In the event that the operator discovers previous to an adding operation that the items represented by the setting up wheels are in error, the error lever 503 is shifted rearwardly and by the employment of the mechanism shown in Fig. 29 the rod 339 is depressed effecting a disconnection between the differentially set item wheels 235 and the slides 255. The curved extension 512 coacting with the arm 276 will set the machine for operation just as if the motor bar 267 was simultaneously operated. The various mechanisms will perform their operations but idly with respect to their intended functions, there being but one indication made that the error key has been employed and which constitutes printing from the symbol type carrier 344 (Fig. 29a) upon the record strip 363 and a paper spacing operation of both the record strip 363 and selected record strip carried by the drum.

From Fig. 29 it will be noted that when the error key 503 is shifted to the right the passage of the edge 591 in front of the edge 594 locks the arm 593, and therefore, the adding keys against operation. Conversely, depression of any of the adding keys cause the edge 595 to pass in front of the edge 596 thereby locking the error key against operation while the adding keys are operated.

Referring further to Fig. 10 it is observed that when the shaft 146 commences its rotation arm 642 will be shifted upwardly and by means of arm 171 the detent plate 72 will be held, preventing the depression of any of the unoperated keys 60 during the adding cycle.

In the manner thus described a series of checks are sorted by depositing them in their related compartments and the amounts represented thereon will be printed upon the record strip 363 in the same sequence as the checks are sorted. Each of the individual record strips will also have printed thereon the value of the items of all the checks deposited in the related compartment. The associated totalizer will also have entered therein the amounts of the checks, deposited in the compartments and the grand printing and grand reading totalizer will totalize the sums entered in the selected totalizers.

At the termination of a sorting operation performed in connection with a group of variously classified checks the proper compartment key 60 is depressed which will bring the totalizer from which a total is to be printed in registration with the common total printing and resetting mechanism operated by turning of the handle 535. Turning of this handle a complete rotation will force the platen 383 (Fig. 38) against the related totalizer effecting an impression therefrom and by a subsequent movement of the resetting rack 565 the totalizer reset shaft 422 will be turned to bring the series of total elements to zero. The strip which now bears the series of printed items and accumulated total is then detached.

In the above manner total printing and resetting is performed from each of the combined record strip and printing totalizers.

Printing of the grand total from the grand printing totalizer 459 (Fig. 29a) is effected by moving the lever 525 toward the operator shifting the platen 350 to the dotted line position (Fig. 29a) forcing the platen against the total type carriers to print upon the record strip 363 the total registered thereon. Upon the restoration of the total lever the rack 573 (Fig. 47) will turn the resetting shaft 461 so as to reset the total elements after the printing operation.

It will be observed from Fig. 48 that when shaft 146 commences its rotation the disk 614 will shift the link 618 to bring arm 620 in front of stud 621 locking the total printing and resetting lever 535 (Fig. 1). When the lever 535 is turned, disk 622 will cause link 632 to be shifted to the left, bringing the abutment 636 in direct contact with the arm 171, preventing depression of a compartment selecting key during the total printing and resetting operation.

If during the check sorting operation a compartment has deposited therein the number of checks it is limited to receive, the counting element 180 related to such compartment will force the locking bail 189 (Fig. 10) upwardly, preventing release of the associated key at the final termination of the adding cycle and preventing depression of any of the unoperated keys. This automatically informs the operator which compartment has received its complement of checks. Depression of the key 195 will condition the machine so the operator may restore the previously locked key and bring the counting element to its normal position. At the termination of a sorting operation the checks are withdrawn and the handle 199 (Fig. 6) is turned so that by means of the resetting shaft 181 the series of counting elements will be brought to their starting positions.

At the termination of any arbitrary period, such as a days work, the total represented upon the grand reading totalizer 490 (Fig. 29) will be visibly ascertained and jotted down upon a memorandum sheet after which the reset knob 582 (Fig. 32) is turned to zeroize the total reading elements 590.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed as new is as follows:—

1. In a machine of the class described the combination with item entering devices for totalizers, a carrier having a plurality of totalizers for receiving the items entered, a series of correlated sorting compartments in said carrier for receiving slips representing the items received by the totalizers, a plurality of selecting keys and means whereby the same keys select the totalizer to be operated and select the correlated slip receiving compartment by controlling the differential positioning of said carrier.

2. In a machine of the class described the combination with item entering differential mechanism of a plurality of totalizers adapted to be selectively actuated thereby, a series of correlated sorting compartments for receiving slips representing the items entered in the totalizers, a carrier carrying said totalizers and compartments, manually controlled means, and means whereby the same manually controlled means selects a desired totalizer and corresponding sorting compartment.

3. In a machine of the class described in combination, item entering differential mechanism, a plurality of totalizers adapted to be selectively actuated thereby, a plurality of compartments for receiving slips representing the items entered in the totalizers, a carrier for said totalizers and compartments, a main operating mechanism, and means whereby said main operating mechanism brings a desired totalizer into position for actuation and a related compartment for receiving the slip representing the amount entered in the selected totalizer.

4. In a machine of the class described, in combination, a plurality of totalizers adapted to be selectively actuated, a plurality of compartments related to the totalizers for receiving the items represented by slips to be sorted, totalizer operating devices, feeding means for feeding slips to the compartments, a carrier for the totalizers and compartments, and common key controlled means for shifting said carrier to bring a desired totalizer in operative relation with the operating devices and an associated compartment with the record feeding devices.

5. In a machine of the class described, item entering differential mechanism, a carrier carrying a plurality of totalizers adapted to be selectively actuated according to the adjustment of the differential mechanism, sorting compartments in said carrier for receiving slips representing the adjustment of the differential mechanism, and common key controlled means for shifting the carrier for selecting a totalizer for actuation and associated sorting compartment for receiving the slip representing the items entered in the totalizer.

6. In a machine of the class described, item entering mechanism, a carrier carrying both a plurality of totalizers adapted to be selectively actuated according to the item entering mechanism and sorting compartments for receiving the slips representing the items entered, means for shifting said carrier, and a single set of keys for controlling the shifting means for selecting a totalizer to receive an item and associated sorting compartment to receive the slip representing the item entered in the selected totalizer.

7. In a machine of the class described, in combination, a set of item printing wheels, a totalizer frame carrying a plurality of total printing wheels, a printing frame carrying a platen normally in operative relation with said item printing wheels, means for effecting operation of said platen to print upon the item printing wheels, a lever for shifting the printing frame to cause the platen to take a print from the total printing wheels, a resetting rack slidably mounted on the totalizer frame, and means whereby said lever reciprocates said rack to effect resetting of the total printing wheels after a total imprint is taken.

8. In a machine of the class described, in combination, a set of item printing wheels, a totalizer frame carrying a plurality of total printing wheels, a printing frame carrying a platen normally in operative relation with said item printing wheels, means for effecting operation of said platen to print upon the item printing wheels, a lever shifting the printing frame to cause the platen to take a print from the total printing wheels, a resetting rack slidably mounted on the totalizer frame, a resetting shaft for the total wheels having a connection to the rack, and means whereby said lever reciprocates said rack and shaft to effect resetting of the total printing wheels after a total imprint is taken.

9. In a machine of the class described, in combination, a set of item printing wheels, a totalizer frame carrying a plurality of total printing wheels, a printing frame carrying a platen normally in operative relation with said item printing wheels, means for effecting operation of said platen to print upon the item printing wheels, a lever for shifting the printing frame to cause the platen to take a print from the total printing wheels, a resetting shaft, pawls carried by the total printing wheels, and means whereby said lever after a total printing operation effects a restoration of the rack and by said shaft and resetting pawls zeroize said total printing wheels.

10. In a machine of the class described, totalizer elements, in combination a frame carrying a platen movable from an item printing position over the totalizer elements to effect a total imprint, a transverse locking element normally locking said totalizer elements, resetting devices for said totalizer elements, and a manually operated lever for shifting said frame for causing a total imprint, disabling said locking element and effecting operation of said resetting devices.

11. In a machine of the class described, totalizer elements, in combination a frame carrying a platen movable from an item printing position over the totalizer elements to effect a total imprint, a transverse locking element normally locking said totalizer elements, and a manually operated lever for shifting said frame to cause the platen to effect an imprint from said totalizer elements and thereafter disabling said locking element.

12. In a machine of the class described, totalizer elements, a frame carrying a platen movable from a normal position to a total printing position over the totalizer elements to effect a total imprint therefrom, a transverse locking element common to all of the totalizer elements and normally locking said totalizer elements, resetting devices for said totalizer elements, a manually operated lever for shifting the frame to cause an imprint by said platen, means under control of said lever for shifting said locking element after a total imprint and means under control of the frame as the latter is restored to normal for thereafter causing the restoration of the locking element to normal to again lock the totalizer elements.

13. In a machine of the class described, in combination, a movable carrier carrying a plurality of printing totalizers from any of which a total imprint may be effected, a printing operating device common to said totalizers, and means comprising individual devices, one for each totalizer for causing said carrier to be moved to a predetermined extent for selecting a totalizer for an operative association with said printing operating device.

14. In a machine of the class described, in combination a plurality of record strip devices, a carrier carrying a plurality of printing totalizers and said record strip devices, each totalizer capable of effecting an imprint upon a record strip of its related record strip device, means for effecting a total printing operation from each of said totalizers, and manually controlled devices for bringing the totalizers selectively into position for printing a total therefrom.

15. In a machine of the class described, in combination, a carrier carrying a plurality of printing totalizers each capable of effecting a total imprint, means for selecting the totalizers for a printing operation by shifting said carrier to bring the selected totalizer to a predetermined total printing position, and a manually operated device common to said printing totalizers and including means operable by said device for effecting a total imprint from the selected totalizer and subsequently resetting the same.

16. In a machine of the class described, in combination, a plurality of printing totalizers each capable of effecting a total imprint, means for selectively bringing a totalizer into a common total printing position, and a manually operated device common to said totalizers and including means operable by said device for effecting an imprint from the totalizer in total printing position.

17. In a machine of the class described, in combination, a plurality of printing totalizers, each capable of effecting a total imprint, means for selectively bringing a totalizer into a common total printing position, and a manually operated device common to said totalizers and including means operable by said device for effecting an imprint from the totalizer in total printing position and subsequently zeroizing the same.

18. In a machine of the class described, a plurality of totalizers, a drum carrying said totalizers, a plurality of keys for controlling the rotation of the drum to select a totalizer, a shaft turnable to effect a total imprint from a selected totalizer, a disk carried by the shaft, and connections whereby turning of said disk by the shaft locks said keys.

19. In an accounting machine, a carrier carrying a plurality of totalizers and rotatable in a single direction, a power drive, a keyboard, totalizer actuating devices including an item entering keyboard, means whereby the keys of the first named keyboard determine the extent of rotation of the carrier uni-directionally by said power drive, and means to cause the holding of the drum in a position where a selected totalizer is operatively associated with the actuating devices to receive the entry of an item determined by said item entering keyboard.

20. In an accounting machine, a drum, a power drive, a clutch device between said drum and power drive, a plurality of totalizers carried by the drum, totalizer operating devices, a keyboard, means whereby the keys of said keyboard cause a connection by said clutch device between said drum and said power drive to cause said drum to be turned, a drum stopping device, and means under control of the keys for causing an actuation of the latter when a selected totalizer is correlated with the operating devices.

21. In a combined sorting and accounting machine, a carrier carrying a plurality of sorting compartments and a plurality of totalizers, compartment and totalizer selecting circuits, selecting means including electrical circuit controlling devices for causing the shifting of said carrier and for causing the selecting circuits to bring a compartment in readiness to receive the record and to concomitantly position a related totalizer for actuation, and entry determining means operable during the feeding of a record to the selected compartment concomitantly with the actuation of the selected totalizer by the entry determining means.

22. In a combined sorting and accounting machine, a carrier having a series of sorting compartments in each of which records of the same class are deposited, a series of totalizers in each of which values represented by records of the same class are entered, selecting means for causing the shifting of the carrier to a predetermined position to cause the selected compartment to be in position to receive the record and for selecting concomitantly a corresponding totalizer for actuation and keys for controlling the entry of values in the totalizers and capable of being operated after the operation of the selecting means and during the shifting of the carrier.

23. In a combined sorting and accounting machine, a rotatable sorting drum provided with a plurality of sorting compartments and carrying a corresponding number of totalizers, totalizer actuating means, record feeding means, a constantly turning drive shaft, and common selecting means for causing a selection of one of the totalizers and a corresponding compartment by the rotation of said drum by said shaft to associate said record feeding means and totalizer actuating means with the selected compartment and selected totalizer, respectively.

24. In a combined sorting and accounting machine, a rotatable carrier provided with a series of record sorting compartments, record feeding means, a constantly turning drive shaft, selecting means for causing said carrier to be rotated by said drive shaft to bring a selected compartment in association with the record feeding means, a plurality of totalizers each of which is selected for actuation by said selecting means correspondingly to the compartment selected means for actuating the selected totalizer, and means for causing an operation of the feeding means by said drive shaft concomitant with the actuation of the selected totalizer by said actuating means.

25. In combination, a plurality of item representing elements settable prior to a machine operation and each settable an amount dependent upon the numerical value represented, a series of slides, a series of type carriers, means for resetting said elements to determine the differential actuation of the slides, means whereby said slides have operating connections with the type carriers, and totalizer operating racks carried by the slides and each having a lost motion connection with the related slide.

26. The invention according to the preceding claim in which said resetting means comprises a shaft having a groove engageable in the rotation of the shaft at different times with resetting pawls carried by the previously positioned elements.

27. In an accounting machine, a series of slides, racks for operating totalizer elements and having normal lost motion connections with said slides, a series of item representing wheels geared to the slides and adapted to be reset from their item representing position to positively shift said slides differentially, and means for positively restoring the shifted slides to normal.

28. The invention according to the preceding claim and including, devices controlled by the elements of the totalizer for causing said racks to be restored to normal with the slides when transfers are to be effected, and means for restoring the racks used in transfer operations to their normal positions, each then having the normal lost motion connection specified.

29. In a machine of the class described, a series of printing totalizers carried by a common carrier, a set of manipulative devices, means including a device common to all of said printing totalizers and operable for taking a total impression from a selected totalizer, entering means common to all of said totalizers for determining the actuation of said totalizers, and means whereby said manipulative devices select the totalizers for association with either said device or the entering means by causing a predetermined movement of the carrier.

30. In combination, a shiftable carrier, a printing totalizer carried by a frame secured to the carrier, means for printing a total from said totalizer, and an aligning means for said carrier effective during a total printing operation for shifting said carrier to a predetermined position if out of alignment to bring the printing totalizer to a predetermined position.

31. In an accounting machine, in combination, printing devices, totalizer operating devices, a rotatable drum driven uni-directionally and carrying a plurality of totalizers and a corresponding number of record strip devices, a main operating mechanism, means whereby said main operating mechanism drives the drum in a single direction, and means for bringing a selected record strip device into operative association with the printing devices and the related totalizer into operative association with the totalizer operating devices.

32. In an accounting machine, in combination, printing devices, totalizer operating devices, a rotatable drum carrying a plurality of totalizers and a corresponding number of record strip devices, a main operating mechanism, means under control of manually set-devices and operated by the main operating mechanism for causing the selection of a totalizer for operation and a related record strip device for printing, and means rendered effective at the will of the operator after the positioning of a selected record strip device and totalizer and operated by said main operating mechanism to cause the concomitant operation of the printing devices and totalizer operating devices.

33. In a machine of the class described utilizing a series of record strips, in combination, item entering mechanism, printing mechanism, a plurality of totalizers, a carrier driven uni-directionally for said record strips and totalizers, means for differentially shifting said carrier always in a single direction to select a particular totalizer for actuation by said item entering mechanism and the related record strip for printing by said printing mechanism, and means whereby said operating mechanisms is rendered effective at the will of the operator to cause after the selecting operation the concomitant operation of the printing mechanism and the item entering mechanism.

34. In an accounting machine, the combination with a series of record strip devices, of a plurality of totalizers each for adding items represented by records of the same classification, a plurality of sorting compartments for segregating into groups records of the same classification, printing mechanism for printing on record strips of said record strip devices the items corresponding to the records in groups of the same classification, item entering and record feeding mechanism, and manually controlled common means for selecting a record strip device, a related totalizer and a sorting compartment for association with the printing mechanism, item entering mechanism and the record feeding mechanism, respectively, according to the classification of the record.

35. In a machine for printing items upon a plurality of record strips, the combination with a plurality of record strip devices, of sorting compartments for sorting records into groups, a plurality of totalizers, one for each record strip device and sorting compartment, common manually controlled means for selecting in accordance with the classification of a record, a related compartment, totalizer and record strip device, and means for entering in the selected totalizer and printing upon a record strip of the related selected record strip device the value of the item represented upon the record deposited in a related sorting compartment.

36. In a machine for printing items, sorting records, and adding items in groups of the same classifications, the combination with a plurality of sorting compartments for sorting records of different classifications into groups of the same classification, of a printing mechanism for printing items in classified groups, a plurality of totalizers, one for each sorting compartment, common manually controlled means for selecting in accordance with the classification of a record, a related compartment, totalizer, and for determining in which group the item will be printed, and means for entering in the selected totalizer and printing in the related group by said printing mechanism the item represented by the record as the record corresponding to the item is deposited in the related sorting compartment.

37. In a machine for printing items, totalizing items and sorting records, the combination with a plurality of sorting compartments for sorting records of different classifications into groups of the same classification, of a plurality of totalizers, one for each sorting compartment, a series of record strip printing devices, common manual control means for selecting in accordance with the classification of a record, a related compartment, totalizer and record strip printing device, means for entering in the selected totalizer and printing the item represented by the record as the record is deposited in the compartment related to the record strip printing device selected and the totalizer in which the item is entered, and means for listing the items of the records in the sequence they are sorted.

38. In an adding machine, in combination, a totalizer comprising totalizer elements, a locking strip normally locking said totalizer elements, latching means for said locking strip, means for causing said strip to be latched by said latching means in an unlocking position prior to a setting of said elements, and totalizer element setting means for disabling said latching means subsequent to a setting of said elements.

39. In an adding machine, in combination, a printing totalizer, means for printing a total from said totalizer, means for thereafter resetting said totalizer, a locking strip normally locking said totalizer, means operated by said resetting means for causing the strip to be positioned and retained in an unlocking position after a total printing operation, and means whereby said total printing means thereafter causes the strip to be moved to its normal locking position.

40. In an adding machine, in combination, a plurality of totalizers adapted to be individually selected for operation, a movable frame, common totalizer operating devices carried by said frame, locking strips each for normally locking its related totalizer, and means common to said locking strips and carried by said frame for shifting the locking strip of the selected totalizer engaged with the operating devices when said frame is moved to effect such engagement.

41. In an adding machine the combination with a printing totalizer, of a series of item printing wheels, means for setting up an amount in said item printing wheels and entering said amount in the totalizer, a movable and reciprocable frame, a platen mounted in said frame and normally in cooperative relationship with said item printing wheels to take an impression therefrom, a plate having a normal pin and cam slot connection to said frame, and means effective upon either an item or total printing operation for actuating said plate whereby in either operation said connection reciprocates said frame and platen and effects either an item imprint or a total imprint dependent upon the position of the frame.

42. In an adding machine, in combination, item printing wheels, total printing wheels, a pivoted frame carrying a platen normally in cooperative relationship with said item printing wheels, a plate having a pin and cam slot connection to said frame, means effective upon item printing operations for rocking said plate and thereby said frame by means of said pin and cam slot connection, and means effective upon printing a total for shifting said plate and by said pin and cam slot rock the platen when said platen and total printing wheels are correlated.

43. In an adding machine, in combination, item printing wheels, total printing wheels, a frame carrying a platen normally in cooperative relationship with said item printing wheels, a shiftable plate having a pin and cam slot connection with said frame, means whereby said plate by said pin and slot connection shifts said platen against the item printing wheels, a total printing lever, and connections from the latter for shifting the platen in cooperative relationship with the total printing wheels and then shifting said plate whereby said cam slot moves said platen to effect a total imprint from said total printing wheels.

44. In a machine for printing on a record strip, in combination, a totalizer, a plurality of differentially set totalizer operating devices, type carriers set thereby, a frame carrying both the operating devices and type carriers, means for moving said frame to operatively engage the set operating devices with said totalizer, and said type carriers with said record strip to print thereon, means for subsequently displacing said type carriers on said frame relative to said operating devices, said first named means thereafter moving said frame to engage the operating devices with said totalizer to actuate the latter.

45. In a machine for printing on a record strip, in combination, a frame carrying a set of differentially set type carriers, means for repeatedly shifting said frame towards said record strip after the type carriers have been differentially set, and means for shifting said type carriers relative to the frame whereby said type carriers contact with said record strip only once during the repeated shifting of the frame.

46. In a machine for printing on a record strip, in combination, a totalizer, a set of totalizer operating devices differentially set from normal and then restored, a set of type carriers interconnected with said operating devices for adjustment by the latter, means for shifting said type carriers after having been differentially set by the operating devices to contact with and print upon the record strip, means for causing the type carriers to be shifted out of contact with said record strip and for causing the differentially set operating devices to engage with the totalizer, and means operative during the engagement of the totalizer and said operating devices for restoring the latter to normal to actuate said totalizer.

47. In a machine for printing on a record strip, in combination a totalizer, a set of totalizer operating devices differentially set and then restored, a set of type carriers intergeared with the operating devices, means for shifting the totalizer operating devices after a differential setting thereof for engagement with said totalizer and for shifting said type carriers to contact with and thus print upon said record strip, and means for shifting said type carriers relative to said totalizer operating devices to prevent further contact thereof with said record strip prior to the actuation of the totalizer by the restoration of the operating devices from their differentially set positions.

48. In a machine of the class described, in combination, a single set of type carriers, a plurality of selectable record strip devices, a plurality of selectable totalizers including totalizer elements, totalizer operating devices comprising toothed members, each for actuating its related totalizer element and type carrier, manipulative devices operable preliminarily to a machine operation for controlling the setting of the totalizer operating devices, a main operating mechanism, means operated by said main operating mechanism for concomitantly shifting all of said totalizers and all of said record strip devices, and selecting means effective during the shifting of all the totalizers and record strip devices for bringing a totalizer into operative relationship with the operating devices and for causing the printing relationship between a record strip of a related record strip device and the single set of type carriers.

49. In a machine of the class described, in combination, a printing totalizer, a platen for taking a print directly from said totalizer a shaft operable when an item is entered in said totalizer, means including a shaft manually operable for printing by said platen a total from said totalizer, a disk secured to the last named shaft, an arm shiftable to lock said disk, and connections whereby the first named shaft shifts said arm to prevent total printing operations of said platen during item entering operations.

50. In an accounting machine, in combination, an adding machine including totalizer actuators, a rotatable carrier carrying a series of totalizers, a totalizer selecting keyboard, a power drive, means whereby said power drive under control of the totalizer selecting keyboard shifts said carrier and positions a selected totalizer for actuation by said actuators, a keyboard of the adding machine operable after the selected totalizer has been positioned for determining the extent of movement of said actuators, and means whereby said power drive causes the subsequent operation of the actuators of said adding machine.

51. In a combined sorting, accounting and group printing machine, in combination, a pair of keyboards, a plurality of totalizers and sorting compartments, printing mechanism for printing items in classified groups, means whereby one keyboard controls the selection of a sorting compartment and related totalizer, and means under control of the other keyboard operable at the will of the operator and at a time different than the operation of the means controlled by the first mentioned keyboard for effecting the disposition of a record in a selected sorting compartment and the concurrent entry of an item in the related totalizer as the item is printed by said printing mechanism in the selected and related group.

52. In a combined sorting and accounting machine, in combination, a pair of keyboards, a series of sorting compartments, and totalizers, a carrier carrying both of the latter, a record feeding means, means under control of one keyboard for effecting movement of the carrier to bring the latter into position for receiving a record by the selected compartment and the related totalizer for actuation, and means operable under control of the other keyboard, at the will of the operator and only when the carrier is at rest for causing the actuation of the selected totalizer and the operation of the record feeding means.

53. In a combined sorting and accounting machine, a main operating mechanism, a plurality of sorting compartments, a plurality of totalizers, means for feeding a record to a selected compartment, means for actuating a selected totalizer, common selecting means, means under control of said selecting means and operable by said main operating mechanism for concomitantly positioning said totalizers and compartments for selection of a totalizer and related compartment, means operable by said main operating mechanism at the will of the operator and after the positioning of the totalizer and compartment for causing the operation of the record feeding means and the totalizer actuating means.

54. In a combined sorting and accounting machine, a sorting compartment, a main operating mechanism, a totalizer, a carrier carrying said compartment and totalizer, record feeding means and totalizer actuating means, means operated by said operating mechanism and effective during the same machine operation for shifting the carrier to associate the compartment with the record feeding means, and the totalizer with the actuating means, and means operated by the main operating mechanism at the will of the operator and after the shifting of said carrier to cause the operation of the record feeding means and the operation of the totalizer actuating means.

55. In an accounting machine, the combination with a keyboard, of item printing devices and totalizer operating devices, a plurality of totalizers, a corresponding number of record strip devices, a main operating mechanism under control of the keyboard for correlating a selected record strip device with the item printing devices and for correlating a selected and related totalizer with the totalizer operating devices and a supplemental keyboard operable after the selection of the totalizer and the record strip device for determining the adjustment of the item printing devices and the totalizer operating devices.

56. In an accounting machine, in combination, a carrier comprising a drum driven uni-directionally and carrying both a plurality of record strip devices and a corresponding number of totalizers, a power shaft for driving said drum uni-directionally, a keyboard, and control mechanism under control of keys of the keyboard for initiating rotation of said drum by the power shaft and stopping said drum in its uni-directional rotation at a position for operation on a selected record strip device and a related totalizer.

57. In an accounting machine, in combination, a movable frame, totalizer operating devices, a series of record strip devices, a single set of printing devices in the plane of all of said record strip devices, a plurality of totalizers corresponding in number to said record strip devices, said record strip devices and said totalizers being carried by said movable frame, a keyboard with connections from each of the keys thereof for causing a movement of said frame to effect an operative relationship between a selected totalizer and the totalizer operating devices and between a selected record strip device and the single set of printing devices while maintaining the latter and said record strip devices in the same plane, and means for shifting said printing devices to print upon the selected record strip and for causing an operative relationship between the totalizer operating devices and the selected totalizer.

58. In an accounting machine, in combination, a plurality of totalizers, a plurality of record strip devices interspersed with the totalizers, a movable member carrying said totalizers and record strip devices, totalizer operating devices, printing devices, a keyboard and means whereby each key of said keyboard controls the correlation of a totalizer and related record strip device with the totalizer operating devices and the printing devices, respectively.

59. In an accounting machine, in combination, a plurality of totalizers, a corresponding number of record strip devices, a rotatable drum carrying said totalizers and record strip devices and driven uni-directionally, power means for rotating said drum uni-directionally, keys of a keyboard, and means whereby each of the keys of said keyboard causes the rotation of the drum by said rotating means uni-directionally and determines the extent of its rotation to select a totalizer and record strip device.

60. In a machine of the class described, the combination with an adding machine including totalizer operating devices, a printing mechanism, a plurality of totalizers and a correspondng number of record strip devices, of a power drive, a keyboard including keys each depressible prior to an operation of the adding machine for causing said power drive to bring a desired totalizer and related record strip device into cooperative relationship with the totalizer operating devices and the printing mechanism, respectively, and a keyboard of said adding machine operable after a selection of a totalizer and related record strip device for determining the entry in the selected totalizer and the printing on a record strip of the selected record strip device.

61. In a machine of the class described, in combination, an adding machine including a keyboard for controlling an item entering and printing mechanism for one of a plurality of totalizers and record strip devices which are selectable in related pairs, keys of a supplemental keyboard, one key for each related record strip device and totalizer comprising a pair and each depressible to locked position for selecting a totalizer and record strip device of a pair, common means operable at a time different than an operation of the adding machine for selecting under control of the supplemental keyboard, a totalizer and related record strip device, a manually controlled means for causing the operation of the adding machine to enter an item in the selected totalizer and print the item on a strip of related record strip device, and means operable during the operation of said adding machine for causing a release of a depressed locked key.

62. In a machine of the class described, in combination, a plurality of totalizers, a plurality of record strip devices, a drum rotatable about a fixed shaft and carrying said totalizers and said record strip devices, a pivoted frame carrying totalizer operating devices and printing elements, a power drive for rotating said drum to select a totalizer and related record strip device, and means whereby said power drive causes said frame to be rocked to engage the totalizer operating devices with the selected totalizer and to impress said printing elements against a record strip of the selected record strip device.

63. In a machine of the class described, in combination, actuating racks, printing elements, a series of record strip devices, a plurality of totalizers interspersed with said record strip devices, selecting means to cause said totalizers and record strip devices to be selected in related pairs, totalizer operating gears rotatable by the actuating racks, said operating gears adapted to differentially set said printing elements, and means for shifting said printing elements when differentially set to print on a record strip of a selected record strip device and then out of printing position, said racks being thereafter shifted towards normal so that said totalizer operating gears actuate the selected totalizer.

64. In a machine of the class described, in combination, a plurality of compartments for sorting records into groups of the same classification, a corresponding number of record strip devices, and a corresponding number of totalizers, a printing mechanism for printing items in classified groups upon record strips carried by said record strip devices, common manipulative devices for selecting a compartment, a related totalizer and a corresponding record strip device, means for causing the item corresponding to the record to be entered in the selected totalizer and the record to be deposited into the related sorting compartment and for causing the printing of the item on a record strip of the selected record strip device, and means for causing the items corresponding to said records to be printed upon a main record strip in the sequence the records are deposited in the sorting compartments.

65. In a combined sorting, printing and accounting machine, in combination, a plurality of totalizers, a corresponding number of compartments, a corresponding number of record strip devices, means for entering items in the totalizers, printing items on record strips of the record strip devices, and feeding records in the compartments, common selecting means for selecting before the operation of said means a totalizer, related compartment and record strip device, key controlled means for controlling the item entering and printing means and operable after said selecting means, and a manually operated means for causing an operation of the machine by the first named means to enter an item in the selected totalizer, and concomitantly print the item on the record strip of the selected record strip device and feed the record involved in the operation into the selected compartment.

66. In a combined sorting, printing and accounting machine, a sorting compartment, means for effecting a disposition of a record to said sorting compartment, a totalizer, item entering means for the totalizer, a common carrier for said sorting compartment and said totalizer, means for shifting said carrier to bring the compartment into a record receiving position and the totalizer in operative relationship with said item entering means, a record strip device, printing means for printing on a record strip of said device, and a manually controlled means for concomitantly entering an item in the totalizer and printing the item on the record strip as the record involved in the operation and corresponding to the item is deposited in the sorting compartment.

67. In a combined sorting, printing, and accounting machine, a series of totalizers, a series of record strip devices, a series of record receiving compartments, selecting means operable during one machine operation to select; a compartment, a related totalizer and a corresponding record strip device, and means effective at the will of the operator and during a subsequent operation after the selection for causing the entry of an item in the selected totalizer and the printing of the same item on a record strip of the related record strip device concomitantly with a feeding of the record involved in the operation into the related compartment.

68. In a combined printing, sorting, and accounting machine, a carrier provided with a series of record receiving compartments and a corresponding number of totalizers, record feeding means, common totalizer actuating means, a series of record strip devices, item printing means for said record strip devices, selecting means for causing the shifting of the carrier to associate a selected compartment with said record feeding means, and a corresponding totalizer with the common totalizer actuating means, and selecting a corresponding record strip device for association with the item printing means, and means effective after a selecting operation for causing the actuation of the totalizer actuating means to enter an item in the selected totalizer and the printing of the item on a record strip of the selected record strip device together with the operation of the record feeding means to cause the selected compartment to receive the record corresponding to the item entered and printed.

69. In a combined sorting, printing and accounting machine, in combination, a plurality of totalizers, a corresponding number of record strip devices, a corresponding number of record sorting compartments, common selecting means including electrical control devices for determining the selection of a totalizer, a related record strip device and record sorting compartment, means for feeding the record to a sorting compartment, and means for entering an item in the selected totalizer and printing the item on a record strip of the selected record device when the record corresponding to the item is fed to the selected and related compartment by said feeding means.

70. In a combined sorting, printing and accounting machine, in combination, a series of totalizers, a series of sorting compartments, a series of record strip devices, a plurality of depressible selecting keys, each one having a related totalizer, a sorting compartment and record strip device, means effective when each key is depressed for effecting a selection of a totalizer, sorting compartment and record strip device, a manually operated keyboard operable after the first named keys for determining the entry in the selected totalizer and printing on a record strip of the selected record strip device, record feeding means, and means effective after the operation of the keyboard for causing the actuation of the selected totalizer and the printing of the item on the record strip of the selected record strip device concomitantly with the feeding by said record feeding means of a record which corresponds to the item, in the related sorting compartment.

71. In a machine for printing items, sorting records, and adding items in groups of the same classifications, the combination with a plurality of sorting compartments for sorting records into groups of the same classification, of a printing mechanism for printing items in classified groups, a plurality of totalizers, one for each sorting compartment, manually controlled means for selecting a sorting compartment, a related totalizer and for determining in which group the item will be printed, means for entering in the selected totalizer, and printing in the related group by said printing mechanism the item corresponding to the record which is deposited in the related sorting compartment, and means for printing upon a main record strip the items corresponding to the records in the sequence that the records are deposited in the sorting compartments.

72. In a machine of the class described, in combination, two sets of item type carriers, a totalizer, totalizer operating devices intermeshed with one of the sets of type carriers, a plurality of record strip devices, means for selecting a record strip device for a printing operation, common manipulative means for controlling the differential adjustment of both sets of type carriers, and means for causing one of the sets of type carriers to print upon a record strip of the selected record strip device and the remaining set of type carriers to print upon another record strip, and for causing the totalizer operating devices to engage said totalizer for a subsequent operation of the latter.

73. In an adding machine, the combination of item printing wheels, total printing wheels, movable actuators for both sets of wheels, manipulative amount determining devices controlling the movement of said actuators, a slidably mounted frame, a platen pivotally mounted in said frame and normally in cooperative relationship with the item printing wheels, means for rocking the platen in a given direction to effect a printing impression from the item printing wheels, a manually operated lever for shifting the frame to bring the platen in cooperative relationship with the total printing wheels, and means operable by said lever to thereafter cause said platen to be moved in the same direction as in the item printing operation to effect an imprint from the total printing wheels, said means being adapted to cause a positive retraction of the platen about its pivotal point after being moved to effect the total print.

74. In an adding machine, the combination of item printing wheels, total printing wheels, movable actuators for both sets of wheels, manipulative amount determining devices controlling the movement of said actuators, a slidably mounted frame, a platen pivotally mounted in said frame and normally in cooperative relationship with the item printing wheels, means for rocking the platen to effect a printing impression from the item printing wheels, a manually operated lever for shifting the frame to bring the platen in cooperative relationship with the total printing wheels, means for stopping said frame in total printing position, and means rendered effective by the stoppage of said frame and functioning subsequent thereto to cause the platen to take an impression from the total printing wheels.

75. In an adding machine, the combination of item printing wheels, total printing wheels, movable actuators for both sets of wheels, manipulative amount determining devices controlling the movement of said actuators, a slidably mounted frame, a platen pivotally mounted in said frame and normally in cooperative relationship with the item printing wheels, means for rocking the platen to effect a printing impression from the item printing wheels, a manually operated member for shifting the frame to bring the platen in cooperative relationship with the total printing wheels, and means including a cam slot in said member to cause said platen to effect as said member is being moved in one direction a printing impression from the total printing wheels, and thereafter to retract said platen about its pivotal point by a movement of the member in another direction.

76. In a machine of the class described, in combination, item printing wheels, total printing wheels, a platen normally in cooperative relationship with the item printing wheels, a frame in which said platen is mounted, means for rocking the platen to effect an impression from the item printing wheels, a manually operated member including a resilient connection between the member and said frame for shifting said frame when the member is moved to bring the platen in cooperative relationship with the total printing wheels, a stop member for stopping the frame in a total printing position, and means rendered effective by a movement of the first named member against the action of the resilient connection and when said frame is stopped for causing the platen to effect an impression from the total printing wheels.

77. In a machine of the class described, in combination, item printing wheels, total printing wheels, a platen carried by a reciprocable pivoted frame, said platen being normally in operative relationship with the item printing wheels, a slidable frame carrying said reciprocable frame and carrying a paper strip supply, the strip passing over said platen, a pawl operated by a reciprocation of the reciprocable frame for feeding the paper strip, and a manually operated lever for first shifting the sliding frame and then rocking the pivoted frame to cause the platen to effect an impression from the total printing wheels and for causing the reciprocation of the pawl by the rocking of said frame to effect a paper feeding operation.

78. In a machine of the class described, in combination, item printing wheels, total printing wheels, a pivoted frame supporting record material and a platen normally in cooperative relationship with the item printing wheels, a base plate, a frame carrying the pivoted frame and slidably mounted in the base plate, and a manually operated lever arranged to first shift the slidable frame and then enabling a means to positively reciprocate the pivoted frame after the slidable frame has been shifted whereby the platen effects an impression from the total printing wheels.

79. In a machine of the class described, in combination, a drum carrying a plurality of selectable totalizers and a plurality of selectable record strip devices, a main operating shaft, means including said shaft for effecting adding operations in a selected one of said totalizers and printing upon a record strip of a selected record strip device, means for effecting a total imprint from a selected one of said totalizers and resetting the same, a disk operable with said total printing and resetting means, a stud on said disk, and an arm shiftable by the operation of the shaft for engagement with said stud.

80. In a machine of the class described, in combination, a series of printing totalizers, a series of selectable record strip devices, the latter being correlated with said printing totalizers, means common to all of said printing totalizers for bringing a record strip of a selected record strip device into printing contact with a selected printing totalizer, and selecting means for determining the printing totalizer to be used to effect an imprint.

81. In combination, a printing platen, a printing totalizer, a frame pivoted about a pivot of a supply roll of paper and carrying said printing platen, item type carriers, means for impressing said type carriers against a part of the paper strip surrounding said platen, and means for rocking said frame thereby forcing said platen against the printing totalizer to take a total print on said paper.

82. In a machine of the class described in combination, a plurality of printing totalizers, a corresponding number of record strip devices, a set of differentially movable actuators for operating said printing totalizers, means for printing an item upon a selected record strip device upon entry of the same item in the related printing totalizer, individually operated devices, each for selecting a printing totalizer to receive an item and to select a related record strip device for item printing, said devices adapted to select for total printing operations the record strip devices and printing totalizers in correlated pairs, and means for effecting the total imprint by contact of the selected printing totalizer with a paper strip of a correlated record strip device.

83. The invention according to the preceding claim and including further, a carrier for carrying said printing totalizers and record strip devices in a correlated relationship with each other, and means controlled by the individually operated devices for determining the extent of movement of said carrier to select a printing totalizer and record strip device of a correlated pair.

84. In an accounting machine, in combination, a uni-directionally rotatable carrier for a series of totalizers, totalizer actuators therefor, a power drive, a series of keys, one for each totalizer, and means under control of said keys for causing said power drive to rotate said carrier unidirectionally to bring a selected totalizer to a position for actuation by said actuators.

85. In an accounting machine, means for totalizing and recording items including, item printing devices, a plurality of record strip devices, means for printing each item of items of different classifications upon a record sheet and the same items upon one of a plurality of record mediums of said record strip devices, means for totalizing all of said items irrespective of their classifications, means for totalizing the items of the same classification together, means for printing the total of all the items of different classifications upon the record sheet, and for printing totals of items of the same classification upon the record mediums bearing the related items, and means for selecting the record strip devices for item and total printing operations.

86. In a combined accumulating, printing and sorting machine, a plurality of record receiving compartments for receiving differently classified records in groups of the same class, means including a grand totalizer for totalizing items corresponding to records of all classes, means including group totalizers for totalizing items separately in accordance with records of each different group, printing means co-operating with said grand totalizer operable for printing a total of the items corresponding to all the records received by said compartments, means co-operating with the group totalizers for printing totals of the items corresponding to the several groups of records in the compartments, and means for entering items corresponding to the records sorted in said totalizers.

87. In a combined printing, accumulating and sorting machine, a series of separate compartments for receiving differently classified records in groups of the same class, means for totalizing and recording items including means for accumulating items corresponding to all records in said compartments, means for printing the items corresponding to all records in said compartments, means for printing the total of the items corresponding to all of the records in said compartments, means for printing lists of items corresponding to the records in each separate compartment, means for accumulating items corresponding to the records in each separate compartment, means for printing totals thereof, and means for entering items corresponding to the records sorted in said accumulating means.

88. In a combined record sorting, and accounting machine, a carrier for carrying paper for securing printing in different groups, a plurality of totalizers for accumulating items of each group, a plurality of record receiving compartments one for each group, manipulative means for predetermining in which one of the groups an item will be printed, for selecting a related compartment to receive the record corresponding to the item, and for selecting a related totalizer, means including said manipulative means for selecting said totalizers for the printing of totals of items of said groups on said paper, means including a grand totalizer for accumulating items corresponding to all records, means for printing items corresponding to all records and for printing a total thereof upon a single record medium, and means for entering items corresponding to the records sorted in said totalizers.

FREDERICK LINCOLN FULLER.